US012811751B2

(12) United States Patent
Park et al.

(10) Patent No.: US 12,811,751 B2
(45) Date of Patent: Nov. 24, 2026

(54) METHOD AND APPARATUS FOR SETTING BEAM IN WIRELESS COMMUNICATION SYSTEM

(71) Applicant: SAMSUNG ELECTRONICS CO., LTD., Suwon-si (KR)

(72) Inventors: Kyoungmin Park, Suwon-si (KR); Seongmok Lim, Suwon-si (KR); Youngrok Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 147 days.

(21) Appl. No.: 18/845,823

(22) PCT Filed: Mar. 8, 2023

(86) PCT No.: PCT/KR2023/003183

§ 371 (c)(1),
(2) Date: Sep. 10, 2024

(87) PCT Pub. No.: WO2023/172067

PCT Pub. Date: Sep. 14, 2023

(65) Prior Publication Data

US 2025/0219791 A1 Jul. 3, 2025

(30) Foreign Application Priority Data

Mar. 11, 2022 (KR) ........................ 10-2022-0031020

(51) Int. Cl.

*H04W 72/23* (2023.01)
*H04L 5/00* (2006.01)
*H04W 72/1273* (2023.01)

(52) U.S. Cl.

CPC ....... *H04L 5/0053* (2013.01); *H04W 72/1273* (2013.01); *H04W 72/23* (2023.01)

(58) Field of Classification Search

CPC . H04W 72/23; H04W 72/046; H04W 72/231; H04W 72/232

See application file for complete search history.

(56) References Cited

U.S. PATENT DOCUMENTS

2021/0360602 A1 11/2021 Zhou et al.
2021/0385807 A1 12/2021 Rahman et al.
(Continued)

FOREIGN PATENT DOCUMENTS

KR 10-2023-0115685 A 8/2023
WO 2021253055 A2 12/2021
(Continued)

OTHER PUBLICATIONS

International Search Report and Written Opinion of the International Searching Authority dated May 31, 2023, in connection with International Application No. PCT/KR2023/003183, 10 pages.

*Primary Examiner* — Sam Bhattacharya

(57) ABSTRACT

The present disclosure relates to a 5G or 6G communication system for supporting higher data transmission rates. The present disclosure relates to a method performed by a terminal in a communication system, the method comprising: receiving, from a base station, first downlink control information including first TCI state information on a first CORESET; determining whether to apply the first TCI state information to PDCCH reception on the basis of the first CORESET; and when it is determined to apply the first TCI state information to the PDCCH reception, receiving, from the base station, DCI on the PDCCH on the basis of the first TCI state information, wherein the first TCI state information corresponds to a common TCI state.

16 Claims, 31 Drawing Sheets

(56) References Cited

U.S. PATENT DOCUMENTS

| | | | | |
|---|---|---|---|---|
| 2022/0361219 | A1* | 11/2022 | Khoshnevisan | H04L 5/0053 |
| 2023/0284221 | A1* | 9/2023 | Gao | H04B 7/06952 370/329 |

FOREIGN PATENT DOCUMENTS

| | | | |
|---|---|---|---|
| WO | 2022021426 | A1 | 2/2022 |
| WO | 2022029747 | A1 | 2/2022 |

* cited by examiner

METHOD AND APPARATUS FOR SETTING BEAM IN WIRELESS COMMUNICATION SYSTEM

TECHNICAL FIELD

The disclosure relates to a method and a device for configuring a beam in a wireless communication system.

BACKGROUND ART 5G mobile communication technologies define broad frequency bands such that high transmission rates and new services are possible, and can be implemented not only in "Sub 6 GHz" bands such as 3.5 GHZ, but also in "Above 6 GHz" bands referred to as mmWave including 28 GHz and 39 GHz. In addition, it has been considered to implement 6G mobile communication technologies (referred to as Beyond 5G systems) in terahertz bands (e.g., 95 GHz to 3 THz bands) in order to accomplish transmission rates fifty times faster than 5G mobile communication technologies and ultra-low latencies one-tenth of 5G mobile communication technologies.

In the initial stage of 5G mobile communication technologies, in order to support services and to satisfy performance requirements in connection with enhanced Mobile BroadBand (eMBB), Ultra Reliable & Low Latency Communications (URLLC), and massive Machine-Type Communications (mMTC), there has been ongoing standardization regarding beamforming and massive MIMO for alleviating radio-wave path loss and increasing radio-wave transmission distances in mmWave, numerology (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large-capacity data transmission and a polar code for highly reliable transmission of control information, L2 pre-processing, and network slicing for providing a dedicated network customized to a specific service.

Currently, there are ongoing discussions regarding improvement and performance enhancement of initial 5G mobile communication technologies in view of services to be supported by 5G mobile communication technologies, and there has been physical layer standardization regarding technologies such as Vehicle-to-everything (V2X) for aiding driving determination by autonomous vehicles based on information regarding positions and states of vehicles transmitted by the vehicles and for enhancing user convenience, New Radio Unlicensed (NR-U) aimed at system operations conforming to various regulation-related requirements in unlicensed bands, NR UE Power Saving, Non-Terrestrial Network (NTN) which is UE-satellite direct communication for securing coverage in an area in which communication with terrestrial networks is unavailable, and positioning.

Moreover, there has been ongoing standardization in wireless interface architecture/protocol fields regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service fields regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

If such 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with extended Reality (XR) for efficiently supporting Augmented Reality (AR), Virtual Reality (VR), Mixed Reality (MR), etc., 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for securing coverage in terahertz bands of 6G mobile communication technologies, Full Dimensional MIMO (FD-MIMO), multi-antenna transmission technologies such as array antennas and large-scale antennas, metamaterial-based lenses and antennas for improving coverage of terahertz band signals, high-dimensional space multiplexing technology using Orbital Angular Momentum (OAM), and Reconfigurable Intelligent Surface (RIS), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

The 5G system is considering supports for more various services as compared to the conventional 4G system. For example, the most representative service may include a ultrawide band mobile communication service (enhanced mobile broad band (eMBB)), an ultrahigh reliable/low latency communication service (ultra-reliable and low latency communication (URLLC)), a massive device-to-device communication service (massive machine type communication (mMTC)), and a next-generation broadcast service (evolved multimedia broadcast/multicast service (eMBMS)). A system providing the URLLC service may be referred to as a URLLC system, and a system providing the eMBB service may be referred to as an eMBB system. The terms "service" and "system" may be interchangeably used.

Among these services, the URLLC service is a service that is newly considered in the 5G system, in contrast to the existing 4G system, and requires to meet ultrahigh reliability (e.g., packet error rate of about 10-5) and low latency (e.g., about 0.5 msec) conditions as compared to the other services. To meet these strict conditions required therefor, the URLLC service may need to apply a shorter transmission time interval (TTI) than the eMBB service, and various operating schemes employing the same are now under consideration.

A multiple transmission and reception point (hereinafter, referred to as an M-TRP) technique in which a terminal performs communication through multiple transmission and reception nodes has been standardized through 3GPP Rel-16 as a common technique capable of satisfying conflicting requirements between a URLLC service requiring high reliability and an eMBB service requiring a high transmission rate and, thereafter, a method of applying the technology to various channels, such as a PDCCH, a PDSCH, a PUSCH, and a PUCCH has been presented through Rel-17. The M-TRP technique is divided into two techniques, such as a single control information technique (single downlink control information, hereinafter, referred to as S-DCI) for controlling transmission and reception of multiple nodes through one piece of control information and a multiple control information technique (multiple downlink control information, hereinafter, referred to as M-DCI) for separately transmitting control information on respective nodes. The S-DCI technique is a technique suitable to be implemented in a network having a relatively simple structure in which only one of multiple nodes performs terminal control, and is also a technique suitable to be used by a cell and a base station responsible for performing communication in a small area. On the other hand, it is expected that the M-DCI technique used in a situation in which multiple nodes perform terminal control will be mainly used in a network which provides communication in a relatively wide area and in which a distance between the respective nodes is great.

As a terminal communication technique corresponding to a multiple transmission and reception node communication technique, standardization of a multi-panel-based communication technique has been partially carried out, and additional standardization is expected to proceed in the future. The multi-panel-based communication technique is a technique in which a terminal performs communication through multiple antenna arrays which can operate independently. In this case, the total transmission power can be increased through independent and cooperative operations between the respective arrays, or communication through a better beam can be achieved.

DISCLOSURE OF INVENTION

Technical Problem

The disclosure proposes a method for performing common beam-based beam control by a base station or a TRP on a terminal operating in a multi-TRP operation mode, and an operation of the terminal. The existing common beam-based beam control technique has an advantage of reducing operation complexity when performing beam control and beam conversion of a base station and a terminal. However, the existing common beam-based beam control technique cannot perform beam control when the terminal is connected to multiple TRPs, and there is a disadvantage that beam conversion is performed through beam update through acknowledgement (ACK), resulting in a significant beam control delay.

To solve the above problem, the disclosure proposes a common beam-based beam control technique applicable to both an s-DCI technique in which one TRP performs PDCCH transmission and an m-DCI technique in which multiple TRPs perform PDCCH transmission.

In addition, the disclosure proposes a beam control technique and an m-TRP operation technique which perform beam conversion or TRP conversion at a faster speed compared to the existing common beam-based beam control technique in which updating of a beam proceeds slowly.

The technical subjects pursued in the disclosure may not be limited to the above-mentioned technical subjects, and other technical subjects which are not mentioned may be clearly understood from the following descriptions by those skilled in the art to which the disclosure pertains.

Solution to Problem

To solve the above problems, the disclosure relates to a method performed by a terminal in a communication system, the method including: receiving, from a base station, first downlink control information (DCI) including first transmission configuration indicator (TCI) state information on a first control resource set (CORESET); determining whether to apply the first TCI state information to reception of a physical downlink control channel (PDCCH), based on the first CORESET; and in case of having determined to apply the first TCI state information to the reception of the PDCCH, receiving DCI on the PDCCH from the base station, based on the first TCI state information, wherein the first TCI state information corresponds to a common TCI state.

In addition, the disclosure relates to a method performed by a base station in a communication system, the method including: transmitting, to a terminal, first downlink control information (DCI) including first transmission configuration indicator (TCI) state information; and transmitting DCI on a physical downlink control channel (PDCCH) to the terminal, based on the first TCI state information, wherein whether the first TCI state information is applied to the PDCCH is related to a first control resource set (CORESET) through which the first DCI is transmitted, and the first TCI state information corresponds to a common TCI state.

In addition, the disclosure relates to a terminal in a communication system, the terminal including: a transceiver; and a controller configured to perform control to receive, from a base station, first downlink control information (DCI) including first transmission configuration indicator (TCI) state information on a first control resource set (CORESET), determine whether to apply the first TCI state information to reception of a physical downlink control channel (PDCCH), based on the first CORESET, and in case of having determined to apply the first TCI state information to the reception of the PDCCH, receive DCI on the PDCCH from the base station, based on the first TCI state information, wherein the first TCI state information corresponds to a common TCI state.

In addition, the disclosure relates to a base station in a communication system, the base station including: a transceiver; and a controller configured to perform control to transmit, to a terminal, first downlink control information (DCI) including first transmission configuration indicator (TCI) state information, and transmit DCI on a physical downlink control channel (PDCCH) to the terminal, based on the first TCI state information, wherein whether the first TCI state information is applied to the PDCCH is related to a first control resource set (CORESET) through which the first DCI is transmitted, and the first TCI state information corresponds to a common TCI state.

Advantageous Effects of Invention

A base station according to embodiments of the disclosure can configure two or more common beams for a terminal through the existing common beam-based beam control technique, and control communication between multiple TRPs and the terminal through the use and updating of the beams.

Advantageous effects obtainable from the disclosure may not be limited to the above-mentioned effects, and other effects which are not mentioned may be clearly understood from the following descriptions by those skilled in the art to which the disclosure pertains.

MODE FOR THE INVENTION

Figure 1:
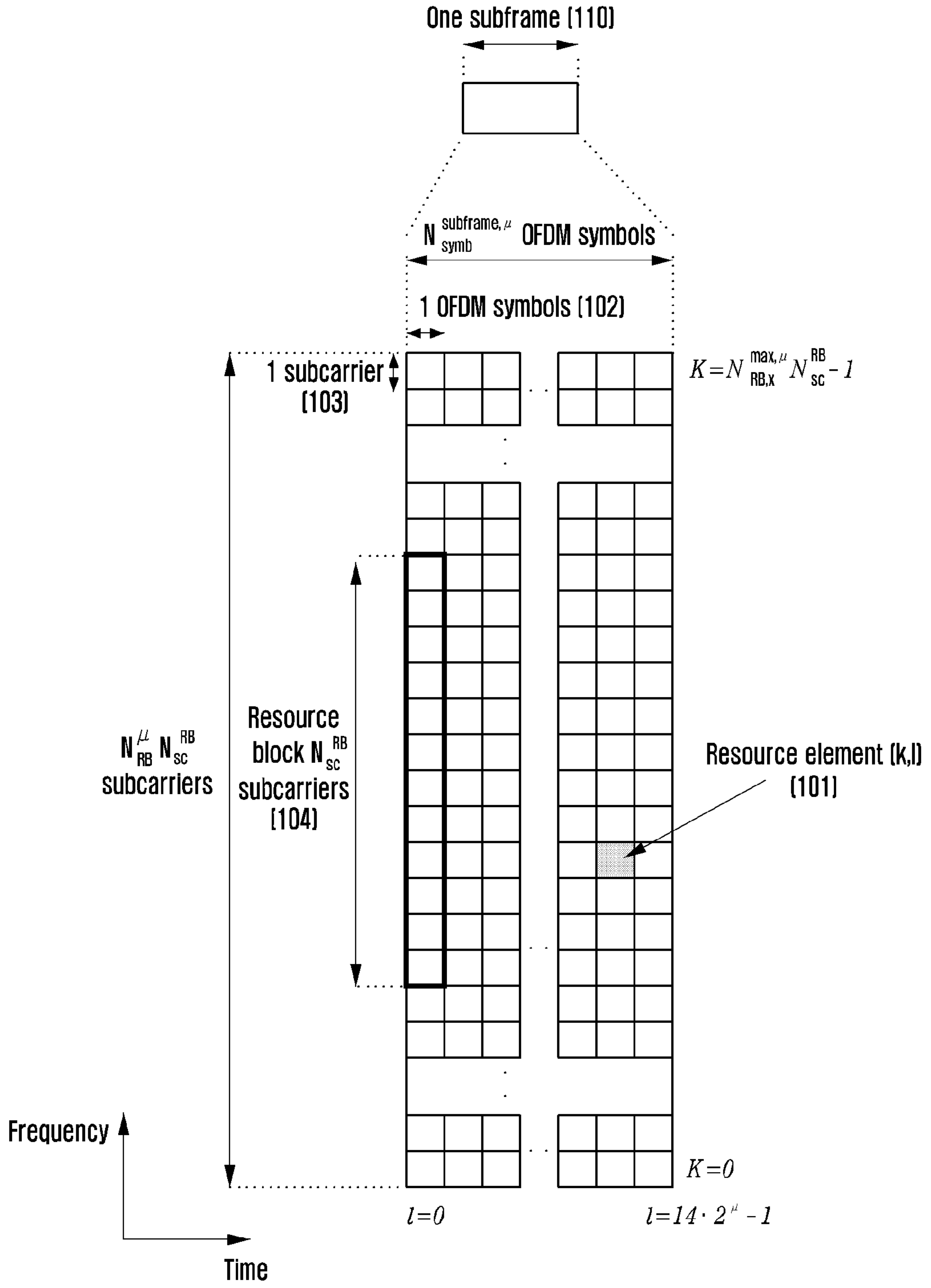
FIG. 1 illustrates an example of a basic structure of a time-frequency domain which is a radio resource domain used to transmit data or control channels in a 5G system.

Hereinafter, embodiments of the disclosure will be described in detail with reference to the accompanying drawings.

In describing the embodiments, descriptions related to technical contents well-known in the relevant art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Furthermore, the size of each element does not completely reflect the actual size. In the respective drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference signs indicate the same or like elements. Furthermore, in describing the disclosure, a detailed description of known functions or configurations incorporated herein will be omitted when it is determined that the description may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

In the following description, a base station is an entity that allocates resources to terminals, and may be at least one of a gNode B, an eNode B, a Node B, a base station (BS), a wireless access unit, a base station controller, and a node on a network. A terminal may include a user equipment (UE), a mobile station (MS), a cellular phone, a smartphone, a computer, or a multimedia system capable of performing a communication function. In the disclosure, a "downlink (DL)" refers to a radio link via which a base station transmits a signal to a terminal, and an "uplink (UL)" refers to a radio link via which a terminal transmits a signal to a base station. Furthermore, in the following description, LTE or LTE-A systems may be described by way of example, but the embodiments of the disclosure may also be applied to other communication systems having similar technical backgrounds or channel types. Examples of such communication systems may include 5th generation mobile communication technologies (5G, new radio, and NR) developed beyond LTE-A, and in the following description, the "5G" may be the concept that covers the exiting LTE, LTE-A, and other similar services. In addition, based on determinations by those skilled in the art, the disclosure may also be applied to other communication systems through some modifications without significantly departing from the scope of the disclosure.

Herein, it will be understood that each block of the flowchart illustrations, and combinations of blocks in the flowchart illustrations, can be implemented by computer program instructions. These computer program instructions can be provided to a processor of a general-purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Furthermore, each block in the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used in embodiments of the disclosure, the "unit" refers to a software element or a hardware element, such as a field programmable gate array (FPGA) or an application specific integrated circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" may be implemented to reproduce one or more CPUs within a device or a security multimedia card. Furthermore, the "unit" in embodiments may include one or more processors.

A wireless communication system is advancing to a broadband wireless communication system for providing high-speed and high-quality packet data services using communication standards, such as high-speed packet access (HSPA) of 3GPP, LTE (long-term evolution or evolved universal terrestrial radio access (E-UTRA)), LTE-Advanced (LTE-A), LTE-Pro, high-rate packet data (HRPD) of 3GPP2, ultra-mobile broadband (UMB), IEEE 802.16e, and the like, as well as typical voice-based services.

As a typical example of the broadband wireless communication system, an LTE system employs an orthogonal frequency division multiplexing (OFDM) scheme in a downlink (DL) and employs a single carrier frequency division multiple access (SC-FDMA) scheme in an uplink (UL). The uplink refers to a radio link via which a user equipment (UE) or a mobile station (MS) transmits data or control signals to a base station (BS) or eNode B, and the downlink refers to a radio link via which the base station transmits data or control signals to the UE. The above multiple access scheme may separate data or control information of respective users by allocating and operating time-frequency resources for transmitting the data or control information for each user so as to avoid overlapping each other, that is, so as to establish orthogonality.

Since a 5G communication system, which is a post-LTE communication system, must freely reflect various requirements of users, service providers, and the like, services satisfying various requirements must be supported. The services considered in the 5G communication system include enhanced mobile broadband (eMBB) communication, massive machine-type communication (mMTC), ultra-reliability low-latency communication (URLLC), and the like.

The three services in 5G, that is, eMBB, URLLC, and mMTC, may be multiplexed and transmitted in a single system. In this case, different transmission/reception techniques and transmission/reception parameters may be used between services in order to satisfy different requirements of the respective services. Of course, 5G is not limited to the three services described above.

Hereinafter, a frame structure of a 5G system will be described in more detail with reference to the accompanying drawings.

FIG. 1 illustrates an example of a basic structure of a time-frequency domain which is a radio resource domain used to transmit data or control channels in a 5G system.

In FIG. 1, the horizontal axis denotes a time domain, and the vertical axis denotes a frequency domain. The basic unit of resources in the time and frequency domains is a resource element (RE) 101, which may be defined as one orthogonal frequency division multiplexing (OFDM) symbol 102 along the time axis and one subcarrier 103 along the frequency axis. In the frequency domain, $N_{SC}^{RB}$ (for example, 12) consecutive REs may constitute one resource block (RB) 104.

Figure 2:
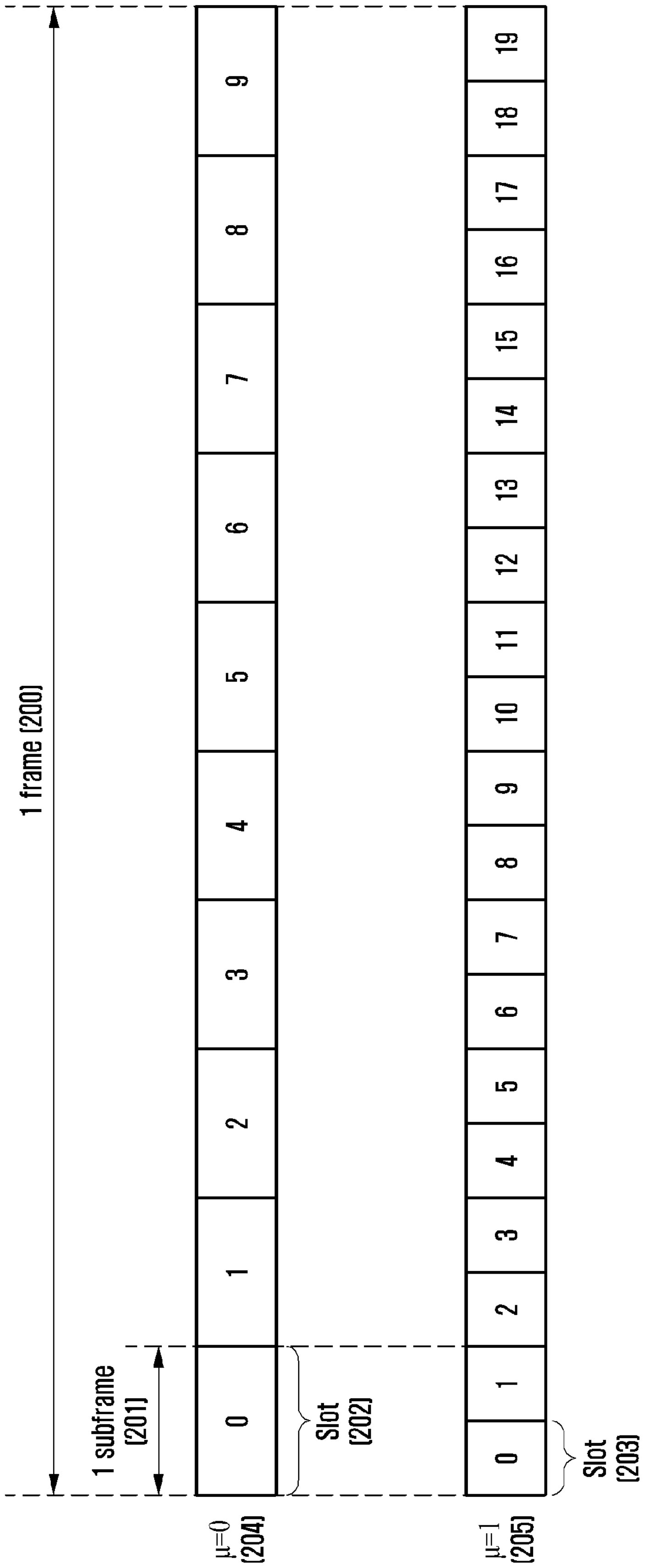
FIG. 2 illustrates a structure of a frame, a subframe, and a slot in a 5G system.

FIG. 2 illustrates a structure of a frame, a subframe, and a slot in a 5G system.

An example of a structure of a frame 200, a subframe 201, and a slot 202 is illustrated in FIG. 2. One frame 200 may be defined as 10 ms. One subframe 201 may be defined as 1 ms, and thus one frame 200 may include a total of ten subframes 201. One slot 202 or 203 may be defined as 14 OFDM symbols (that is, the number of symbols per one slot $N_{symb}^{slot} = 14$).

One subframe 201 may include one or multiple slots 202 and 203, and the number of slots 202 and 203 per one subframe 201 may vary depending on configuration values u for the subcarrier spacing 204 or 205. The example in FIG. 2 illustrates a case in which the subcarrier spacing configuration value is μ=0 (204), and a case in which μ=1 (205).

In the case of μ=0 (204), one subframe 201 may include one slot 202, and in the case of μ=1 (205), one subframe 201 may include two slots 203. That is, the number of slots per one subframe $N_{slot}^{sunframe,\mu}$ may differ depending on the subcarrier spacing configuration value u, and the number of slots per one frame $N_{slot}^{frame,\mu}$ may differ accordingly.

$N_{slot}^{sunframe,\mu}$ and $N_{slot}^{frame,\mu}$ may be defined according to each subcarrier spacing configuration u as in Table 1 below.

TABLE 1

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

Next, bandwidth part (BWP) configuration in a 5G communication system will be described in detail with reference to the accompanying drawings.

A base station may configure one or multiple bandwidth parts for a UE, and may configure the following pieces of information with regard to each bandwidth part as given in Table 2 below.

TABLE 2

```
BWP ::=                        SEQUENCE {
   bwp-Id                         BWP-Id,
   (bandwidth part identifier)
   locationAndBandwidth           INTEGER (1..65536),
   (bandwidth part location)
   subcarrierSpacing             ENUMERATED {n0, n1, n2, n3, n4,
n5},
   (subcarrier spacing)
   cyclicPrefix                   ENUMERATED { extended }
   (cyclic prefix)
}
```

Of course, the above example is not limiting, and in addition to the configuration information given above, various parameters related to the bandwidth part may be configured for the UE. The base station may transfer the above pieces of information to the UE through upper layer signaling. One configured bandwidth part or at least one bandwidth part among multiple configured bandwidth parts may be activated. Whether or not the configured bandwidth part is activated may be transferred from the base station to the UE semi-statically through RRC signaling, or dynamically through downlink control information (DCI).

According to some embodiments, before a radio resource control (RRC) connection, an initial bandwidth part (BWP) for initial access may be configured for the UE by the base station through a master information block (MIB). More specifically, the UE may receive configuration information regarding a control resource set (CORESET) and a search space which may be used to transmit a PDCCH for receiving system information (which may correspond to remaining system information (RMSI) or system information block 1 (SIB1) necessary for initial access through the MIB in the initial access step. Each of the control resource set and the search space configured through the MIB may be considered identity (ID) 0. The base station may notify the UE of configuration information, such as frequency allocation information, time allocation information, and numerology, regarding control resource region #0 through the MIB. In addition, the base station may notify the UE of configuration information regarding the monitoring cycle and occasion with regard to control resource set #0, that is, configuration information regarding search space #0, through the MIB. The UE may consider that a frequency domain configured by control resource set #0 acquired from the MIB is an initial bandwidth part for initial access. The ID of the initial bandwidth part may be considered to be 0.

The initial bandwidth part may be used not only for the purpose of receiving the SIB, but also for other system information (OSI), paging, random access, or the like.

Next, synchronization signal/physical broadcast channel (SS/PBCH) blocks in a 5G communication system will be described.

An SS/PBCH block may refer to a physical layer channel block including a primary synchronization signal (PSS), a secondary synchronization signal (SSS), and a PBCH. Details thereof are as follows.

PSS: a signal which becomes a reference of downlink time/frequency synchronization, and provides partial information of a cell ID.

SSS: becomes a reference of downlink time/frequency synchronization, and provides remaining cell ID information not provided by the PSS. Additionally, the SSS may serve as a reference signal for PBCH demodulation of a PBCH.

PBCH: provides essential system information necessary for the UE's data channel and control channel transmission/ reception. The essential system information may include search space-related control information indicating a control channel's radio resource mapping information, scheduling control information regarding a separate data channel for transmitting system information, and the like.

SS/PBCH block: the SS/PBCH block includes a combination of a PSS, an SSS, and a PBCH. One or multiple SS/PBCH blocks may be transmitted within a time period of 5 ms, and each transmitted SS/PBCH block may be distinguished by an index.

The UE may detect the PSS and the SSS in the initial access stage, and may decode the PBCH. The UE may acquire an MIB from the PBCH, and CORESET #0 may be configured for the UE from the MIB. The UE may monitor control resource set #0 by assuming that the demodulation reference signal (DMRS) transmitted in the selected SS/PBCH block and control resource set #0 are quasi-co-located (QCL). The UE may receive system information with downlink control information transmitted in control resource set #0, and may acquire configuration information related to a random access channel (RACH) necessary for initial access from the received system information. The UE may transmit a physical RACH (PRACH) to the base station in consideration of a selected SS/PBCH index, and the base station, upon receiving the PRACH, may acquire information regarding the SS/PBCH block index selected by the UE. The base station may know which block the UE has selected from respective SS/PBCH blocks, and the fact that control resource set #0 associated therewith is monitored.

Next, a PUSCH transmission method will be described.

In a 5G system, scheduling information regarding uplink data (or physical uplink shared channel (PUSCH)) or downlink data (or physical downlink shared channel (PDSCH)) is included in DCI and transferred from a base station to a UE through the DCI. The UE may monitor, with regard to the PUSCH or PDSCH, a fallback DCI format and a non-fallback DCI format. The fallback DCI format may include a fixed field predefined between the base station and the UE, and the non-fallback DCI format may include a configurable field.

According to an embodiment, the DCI may be subjected to channel coding and modulation processes and then transmitted through or on a physical downlink control channel (PDCCH). A cyclic redundancy check (CRC) may be attached to the DCI message payload, and the CRC may be scrambled by a radio network temporary identifier (RNTI) corresponding to the identity of the UE. Different RNTIs may be used according to the purpose of the DCI message, for example, UE-specific data transmission, power control command, or random access response. That is, the RNTI may not be explicitly transmitted, but may be transmitted while being included in a CRC calculation process. Upon receiving a DCI message transmitted through the PDCCH, the UE may identify the CRC by using the allocated RNTI, and if the CRC identification result is right, the UE may know that the corresponding message has been transmitted to the UE.

For example, DCI for scheduling a PDSCH regarding system information (SI) may be scrambled by an SI-RNTI. DCI for scheduling a PDSCH regarding a random access response (RAR) message may be scrambled by an RA-RNTI. DCI for scheduling a PDSCH regarding a paging message may be scrambled by a P-RNTI. DCI for notifying of a slot format indicator (SFI) may be scrambled by an SFI-RNTI. DCI for notifying of transmit power control (TPC) may be scrambled by a TPC-RNTI. DCI for scheduling a UE-specific PDSCH or PUSCH may be scrambled by a cell RNTI (C-RNTI).

DCI format 0_0 may be used as fallback DCI for scheduling a PUSCH, and in this case, the CRC may be scrambled by a C-RNTI. DCI format 0_0 in which the CRC is scrambled by a C-RNTI may include the following pieces of information given in Table 3 below, for example.

TABLE 3

- Identifier for DCI formats - [1] bit
- Frequency domain resource assignment - [ $\lceil \log_2(N_{RB}^{UL,BWP}(N_{RB}^{UL,BWP}+1)/2) \rceil$ ] bits
- Time domain resource assignment - X bits
- Frequency hopping flag - 1 bit.
- Modulation and coding scheme - 5 bits
- New data indicator - 1 bit
- Redundancy version - 2 bits
- HARQ process number - 4 bits
- Transmit power control (TPC) command for scheduled PUSCH - [2] bits
- Uplink/supplementary uplink (UL/SUL) indicator - 0 or 1 bit DCI format 0_1 may be used as non-fallback DCI for scheduling a PUSCH, and in this case, the CRC may be scrambled by a C-RNTI. DCI format 0_1 in which the CRC is scrambled by a C-RNTI may include the following pieces of information given in Table 4 below, for example.

TABLE 4

- Carrier indicator - 0 or 3 bits
- UL/SUL indicator - 0 or 1 bit
- Identifier for DCI formats - [1] bits
- Bandwidth part indicator - 0, 1 or 2 bits
- Frequency domain resource assignment
  • For resource allocation type 0, $\lceil N_{RB}^{UL,BWP}/P \rceil$ bits
  • For resource allocation type 1, $\lceil \log_2(N_{RB}^{UL,BWP}(N_{RB}^{UL,BWP}+1)/2) \rceil$ bits
- Time domain resource assignment - 1, 2, 3, or 4 bits
- Virtual resource block (VRB)-to-physical resource block (PRB) mapping - 0 or 1 bit, only for resource allocation type 1.
  • 0 bit if only resource allocation type 0 is configured;

TABLE 4-continued

- • 1 bit otherwise.
- Frequency hopping flag - 0 or 1 bit, only for resource allocation type 1.
  - • 0 bit if only resource allocation type 0 is configured;
  - • 1 bit otherwise.
- Modulation and coding scheme - 5 bits
- New data indicator - 1 bit
- Redundancy version - 2 bits
- HARQ process number - 4 bits
- 1st downlink assignment index - 1 or 2 bits
  - • 1 bit for semi-static HARQ-ACK codebook;
  - • 2 bits for dynamic HARQ-ACK codebook with single HARQ-ACK codebook.
- 2nd downlink assignment index - 0 or 2 bits
  - • 2 bits for dynamic HARQ-ACK codebook with two HARQ-ACK sub-codebooks;
  - • 0 bit otherwise.
- TPC command for scheduled PUSCH - 2 bits
- *SRS* resource indicator $-\left\lceil \log_2\left(\sum_{k=1}^{L_{max}} \binom{N_{SRS}}{k}\right)\right\rceil$ or $\lceil \log_2(N_{SRS})\rceil$ bits
  - • $\left\lceil \log_2\left(\sum_{k=1}^{L_{max}} \binom{N_{SRS}}{k}\right)\right\rceil$ bits for non-codebook based *PUSCH* transmission;
  - • $\lceil \log2(NSRS)\rceil$ bits for codebook based PUSCH transmission.
- Precoding information and number of layers - up to 6 bits
- Antenna ports - up to 5 bits
- SRS request - 2 bits
- CSI request - 0, 1, 2, 3, 4, 5, or 6 bits
- Code block group (CBG) transmission information - 0, 2, 4, 6, or 8 bits
- Phase tracking reference signal (PTRS)-demodulation reference signal (DMRS) association - 0 or 2 bits.
- beta_offset indicator - 0 or 2 bits
- DMRS sequence initialization - 0 or 1 bit DCI format 1_0 may be used as fallback DCI for scheduling a PDSCH, and in this case, the CRC may be scrambled by a C-RNTI. DCI format 1_0 in which the CRC is scrambled by a C-RNTI may include the following pieces of information given in Table 5 below, for example.

TABLE 5

- Identifier for DCI formats - [1] bit
- Frequency domain resource assignment -[$\lceil \log_2(N_{RB}^{DL,\ BWP}(N_{RB}^{DL,\ BWP}+1)/2\rceil$ ] bits
- Time domain resource assignment - X bits
- VRB-to-PRB mapping - 1 bit.
- Modulation and coding scheme - 5 bits
- New data indicator - 1 bit
- Redundancy version - 2 bits
- HARQ process number - 4 bits
- Downlink assignment index - 2 bits
- TPC command for scheduled PUCCH - [2] bits
- Physical uplink control channel (PUCCH) resource indicator - 3 bits
- PDSCH-to-HARQ feedback timing indicator - [3] bits DCI format 1_1 may be used as non-fallback DCI for scheduling a PDSCH, and in this case, the CRC may be scrambled by a C-RNTI. DCI format 1_1 in which the CRC is scrambled by a C-RNTI may include the following pieces of information given in Table 6 below, for example.

TABLE 6

- Carrier indicator - 0 or 3 bits
- Identifier for DCI formats - [1] bits
- Bandwidth part indicator - 0, 1 or 2 bits
- Frequency domain resource assignment
  - • For resource allocation type 0, $\lceil N_{RB}^{DL,\ BWP}/P\rceil$ bits
  - • For resource allocation type 1, $\lceil \log_2(N_{RB}^{DL,\ BWP}(N_{RB}^{DL,\ BWP}+1)/2)\rceil$ bits
- Time domain resource assignment -1, 2, 3, or 4 bits
- VRB-to-PRB mapping - 0 or 1 bit, only for resource allocation type 1.
  - • 0 bit if only resource allocation type 0 is configured;
  - • 1 bit otherwise.
- Physical resource block (PRB) bundling size indicator - 0 or 1 bit TABLE 6-continued

```
-        Rate matching indicator - 0, 1, or 2 bits
-        Zero power (ZP) channel state information (CSI)-reference signal (RS) trigger -
0, 1, or 2 bits
 For transport block 1:
-        Modulation and coding scheme - 5 bits
-        New data indicator - 1 bit
-        Redundancy version - 2 bits
 For transport block 2:
-        Modulation and coding scheme - 5 bits
-        New data indicator - 1 bit
-        Redundancy version - 2 bits
-        HARQ process number - 4 bits
-        Downlink assignment index - 0 or 2 or 4 bits
-        TPC command for scheduled PUCCH - 2 bits
-        PUCCH resource indicator - 3 bits
-        PDSCH-to-HARQ_feedback timing indicator - 3 bits
-        Antenna ports - 4, 5 or 6 bits
-        Transmission configuration indication - 0 or 3 bits
-        SRS request - 2 bits
-        Code block group (CBG) transmission information - 0, 2, 4, 6, or 8 bits
-        CBG flushing out information - 0 or 1 bit
-        DMRS sequence initialization - 1 bit
```

Hereinafter, a downlink control channel in a 5G system will be described in more detail with reference to the accompanying drawings.

Figure 3:
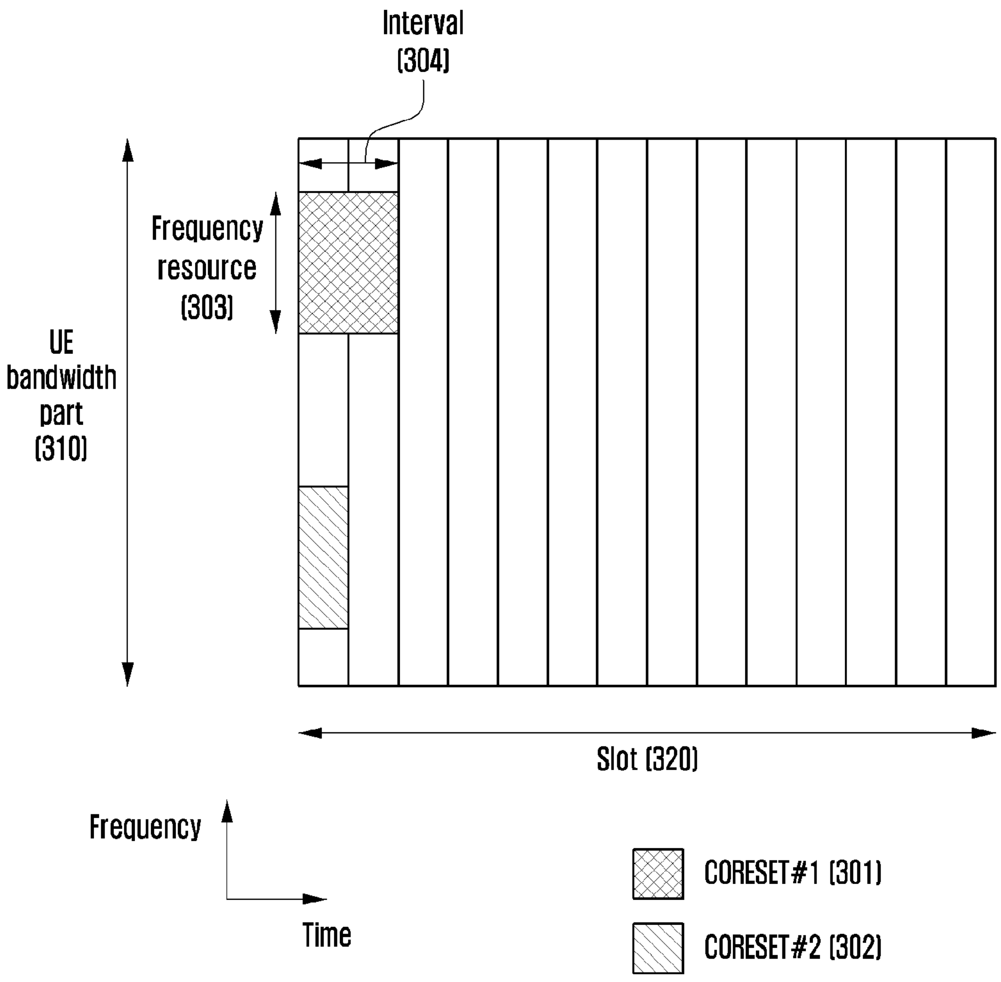
FIG. 3 illustrates an example of a CORESET used to transmit a downlink control channel in a 5G wireless communication system.

FIG. 3 illustrates an example of a CORESET used to transmit a downlink control channel in a 5G wireless communication system. FIG. 3 illustrates an example in which a UE bandwidth part 310 is configured along the frequency axis, and two CORESETs (CORESET #1 301 and CORESET #2 302 are configured within one slot 320 along the time axis. The CORESETs 301 and 302 may be configured in a specific frequency resource 303 within the entire UE bandwidth part 310 along the frequency axis. One or multiple OFDM symbols may be configured along the time axis, and this may be defined as a control resource set duration 304. Referring to the example illustrated in FIG. 3, CORESET #1 301 is configured to have a control resource set duration of two symbols, and CORESET #2 302 is configured to have a control resource set duration of one symbol.

A CORESET in 5G as described above may be configured for a UE by a base station through upper layer signaling. The description that a CORESET is configured for a UE means that information such as the identity of a CORESET, the frequency location of a CORESET, and the symbol duration of a CORESET is provided. For example, the CORESET may include the following pieces of information given in Table 7 below.

TABLE 7

```
   ControlResourceSet ::=
      SEQUENCE {
      -- Corresponds to L1 parameter 'CORESET-ID'
      controlResourceSetId
      ControlResourceSetId,
      (control resource set identity))
      frequencyDomainResources                    BIT STRING
(SIZE (45)),
      (frequency domain resource allocation information)
      duration                                  INTEGER
(1..maxCoReSetDuration),
      (time domain resource allocation information)
      cce-REG-MappingType
CHOICE {
      (CCE-to-REG mapping type)
        interleaved                               SEQUENCE {
        reg-BundleSize                            ENUMERATED
{n2, n3, n6},
              (REG bundle size)
```

TABLE 7-continued

```
        precoderGranularity                  ENUMERATED
{sameAsREG-bundle, allContiguousRBs},
        interleaverSize                      ENUMERATED
{n2, n3, n6}
     (interleaver size)
          shiftIndex
       INTEGER(0..maxNrofPhysicalResourceBlocks-1)
      OPTIONAL
       (interleaver shift)
          },
      nonInterleaved
      NULL
      },
      tci-StatesPDCCH                      SEQUENCE(SIZE
(1..maxNrofTCI-StatesPDCCH)) OF TCI-StateId
      OPTIONAL,
      (QCL configuration information)
      tci-PresentInDCI                     ENUMERATED
{enabled}
      OPTIONAL,   -- Need S
   }
```

In Table 7, tci-StatesPDCCH (simply referred to as transmission configuration indication (TCI) state) configuration information may include information of one or multiple SS/PBCH block indexes or channel state information reference signal (CSI-RS) indexes, which are quasi-co-located (QCLed) with a DMRS transmitted in a corresponding CORESET.

Figure 4:
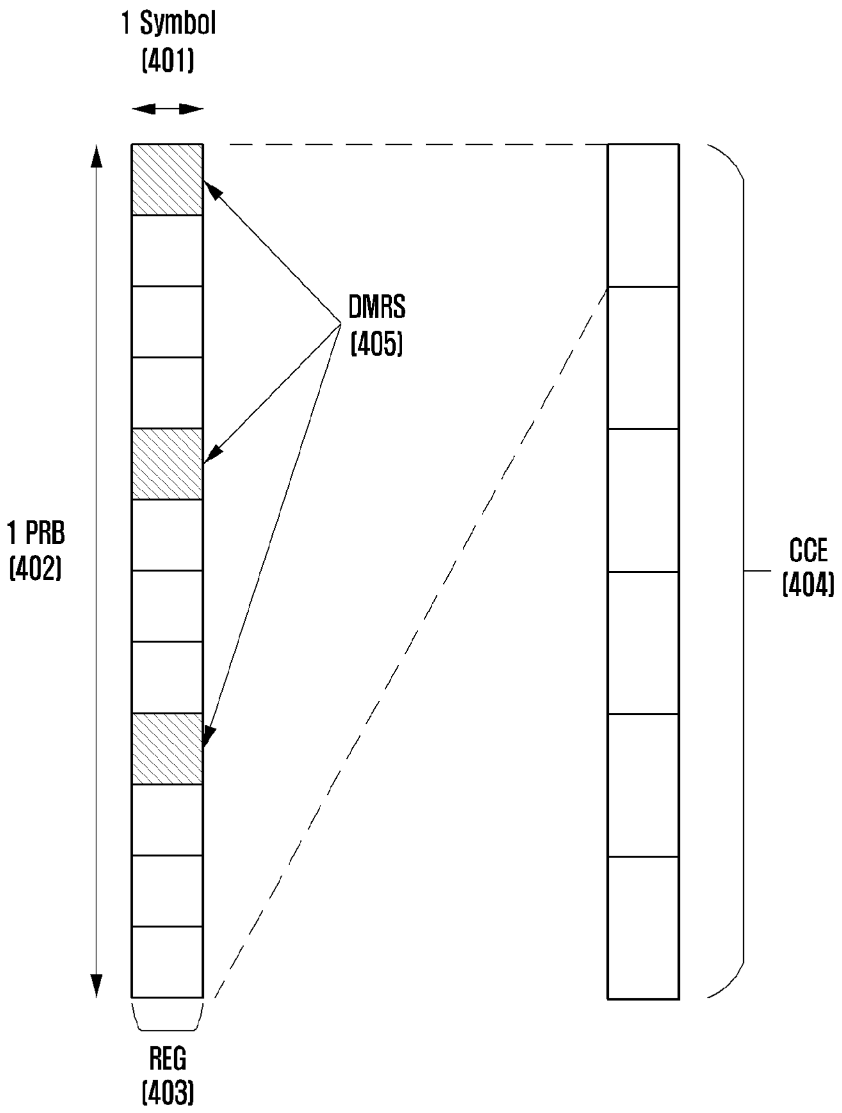
FIG. 4 illustrates an example of a basic unit of time and frequency resources constituting a downlink control channel available in a 5G system.

FIG. 4 illustrates an example of a basic unit of time and frequency resources constituting a downlink control channel available in a 5G system. According to FIG. 4, the basic unit of time and frequency resources constituting a control channel may be referred to as a resource element group (REG) 403, and the REG 403 may be defined by one OFDM symbol 401 along the time axis and one physical resource block (PRB) 402, that is, 12 subcarriers, along the frequency axis. The base station may configure a downlink control channel allocation unit by concatenating the REGs 403.

Provided that the basic unit of downlink control channel allocation in a 5G system is a control channel element (CCE) 404 as illustrated in FIG. 4, one CCE 404 may include multiple REGs 403. To describe the REG 403 illustrated in FIG. 4, for example, the REG 403 may include 12 REs, and if one CCE 404 includes six REGs 403, one CCE 404 may then include 72 REs. Once a CORESET is configured, the corresponding region may include multiple CCEs 404, and a specific downlink control channel may be mapped to one or multiple CCEs 404 and then transmitted according to the aggregation level (AL) in the CORESET. The CCEs 404 in the CORESET may be distinguished by numbers, and the numbers of CCEs 404 may be allocated according to a logical mapping scheme.

The basic unit of the downlink control channel illustrated in FIG. 4, that is, the REG 403, may include both REs to which DCI is mapped, and an area to which a reference signal, that is, DMRS 405, for decoding the same is mapped. As in FIG. 4, three DRMSs 403 may be transmitted inside one REG 405. The number of CCEs necessary to transmit a PDCCH may be 1, 2, 4, 8, or 16 according to the aggregation level (AL), and different number of CCEs may be used to implement link adaption of the downlink control channel. For example, in the case of AL=L, one downlink control channel may be transmitted through L CCEs.

The UE needs to detect a signal while being no information regarding the downlink control channel, and thus a search space indicating a set of CCEs has been defined for blind decoding. The search space is a set of downlink control channel candidates including CCEs which the UE needs to attempt to decode at a given AL, and since 1, 2, 4, 8, or 16 CCEs may constitute a bundle at various ALs, the UE may have multiple search spaces. A search space set may be defined as a set of search spaces at all configured aggregation levels.

Search spaces may be classified into common search spaces and UE-specific search spaces. A group of UEs or all UEs may search a common search space of the PDCCH in order to receive cell-common control information such as dynamic scheduling regarding system information or a paging message. For example, PDSCH scheduling allocation information for transmitting an SIB including a cell operator information or the like may be received by searching the common search space of the PDCCH. In the case of a common search space, a group of UEs or all UEs need to receive the PDCCH, and the same may thus be defined as a predetermined set of CCEs. Scheduling allocation information regarding a UE-specific PDSCH or PUSCH may be received by scanning the UE-specific search space of the PDCCH. The UE-specific search space may be defined UE-specifically as a function of various system parameters and the identity of the UE.

In 5G, a parameter regarding a search parameter regarding a PDCCH may be configured for the UE by the base station through upper layer signaling (for example, SIB, MIB, RRC signaling). For example, the base station may provide the UE with configurations such as the number of PDCCH candidates at each aggregation level L, the monitoring cycle regarding the search space, the monitoring occasion with regard to each symbol in a slot regarding the search space, the search space type (common search space or UE-specific search space), a combination of an RNTI and a DCI format to be monitored in the corresponding search space, a CORESET index for monitoring the search space, and the like. For example, the following pieces of information given in Table 8 below may be configured for the UE.

TABLE 8

```
SearchSpace ::=
    SEQUENCE {
    -- Identity of the search space. SearchSpaceId = 0 identifies the SearchSpace
configured via PBCH (MIB) or ServingCellConfigCommon.
    searchSpaceId
    SearchSpaceId,
    (search space identity)
    controlResourceSetId
    ControlResourceSetId,
    (control resource set identity)
    monitoringSlotPeriodicityAndOffset                CHOICE {
    (monitoring slot level perodicity)
        sl1
    NULL,
        sl2
    INTEGER (0..1),
        sl4
    INTEGER (0..3),
        sl5
    INTEGER (0..4),
        sl8
    INTEGER (0..7),
        sl10
    INTEGER (0..9),
        sl16
    INTEGER (0..15),
        sl20
    INTEGER (0..19)
    }
                                                              OPTIONAL,
    duration(monitoring duration)                     INTEGER (2..2559)
    monitoringSymbolsWithinSlot                              BIT
STRING (SIZE (14))
    OPTIONAL,
    (monitoring symbols within slot)
    nrofCandidates                                        SEQUENCE {
    (number of PDCCH candidate groups for each aggregation level)
        aggregationLevel1                             ENUMERATED {n0,
n1, n2, n3, n4, n5, n6, n8},
        aggregationLevel2                             ENUMERATED {n0,
n1, n2, n3, n4, n5, n6, n8},
        aggregationLevel4                             ENUMERATED {n0,
n1, n2, n3, n4, n5, n6, n8},
```

TABLE 8-continued

```
        aggregationLevel8                          ENUMERATED {n0,
n1, n2, n3, n4, n5, n6, n8},
        aggregationLevel16
ENUMERATED {n0, n1, n2, n3, n4, n5, n6, n8}
    },
    searchSpaceType                    CHOICE {
    (search space type)
        -- Configures this search space as common search space (CSS) and
DCI formats to monitor.
    common                          SEQUENCE {
    (common search space)
      }
    ue-Specific                        SEQUENCE {
    (UE-specific search space)
    -- Indicates whether the UE monitors in this USS for DCI formats 0-0 and 1-0
or for formats 0-1 and 1-1.
    formats                                  ENUMERATED
{formats0-0-And-1-0, formats0-1-And-1-1},
    ...
  }
```

According to configuration information, the base station may configure one or multiple search space sets for the UE. According to an embodiment, the base station may configure search space set 1 and search space set 2 for the UE, may configure DCI format A scrambled by an X-RNTI to be monitored in a common search space in search space set 1, and may configure DCI format B scrambled by a Y-RNTI to be monitored in a UE-specific search space in search space set 2.

According to configuration information, one or multiple search space sets may exist in a common search space or a UE-specific search space. For example, search space set #1 and search space set #2 may be configured as a common search space, and search space set #3 and search space set #4 may be configured as a UE-specific search space.

Combinations of DCI formats and RNTIs given below may be monitored in a common search space. Obviously, the example given below is not limiting.

- DCI format 0_0/1_0 with CRC scrambled by C-RNTI, CS-RNTI, SP-CSI-RNTI, RA-RNTI, TC-RNTI, P-RNTI, SI-RNTI
- DCI format 2_0 with CRC scrambled by SFI-RNTI
- DCI format 2_1 with CRC scrambled by INT-RNTI
- DCI format 2_2 with CRC scrambled by TPC-PUSCH-RNTI, TPC-PUCCH-RNTI
- DCI format 2_3 with CRC scrambled by TPC-SRS-RNTI Combinations of DCI formats and RNTIs given below may be monitored in a UE-specific search space. Obviously, the example given below is not limiting.

- DCI format 0_0/1_0 with CRC scrambled by C-RNTI, CS-RNTI, TC-RNTI
- DCI format 1_0/1_1 with CRC scrambled by C-RNTI, CS-RNTI, TC-RNTI Enumerated RNTIs may follow the definition and usage given below.

- C-RNTI: used to schedule a UE-specific PDSCH
- Temporary cell RNTI (TC-RNTI): used to schedule a UE-specific PDSCH
- Configured scheduling RNTI (CS-RNTI): used to schedule a semi-statically configured UE-specific PDSCH
- Random access RNTI (RA-RNTI): used to schedule a PDSCH in a random access step
- Paging RNTI (P-RNTI): used to schedule a PDSCH in which paging is transmitted
- System information RNTI (SI-RNTI): used to schedule a PDSCH in which system information is transmitted
- Interruption RNTI (INT-RNTI): used to indicate whether a PDSCH is punctured
- Transmit power control for PUSCH RNTI (TPC-PUSCH-RNTI): used to indicate a power control command regarding a PUSCH
- Transmit power control for PUCCH RNTI (TPC-PUCCH-RNTI): used to indicate a power control command regarding a PUCCH
- Transmit power control for SRS RNTI (TPC-SRS-RNTI): used to indicate a power control command regarding an SRS The DCI formats enumerated above may follow the definitions given in Table 9 below.

TABLE 9

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

In a 5G system, the search space at aggregation level L in connection with CORESET p and search space set s may be expressed by Equation 1 below.

$$L\cdot\left\{\left(Y_{p,n^{\mu}_{s,f}}+\left\lfloor\frac{m_{s,n_{CI}}\cdot N_{CCE,p}}{L\cdot M^{(L)}_{s,max}}\right\rfloor+n_{CI}\right)\bmod\left\lfloor\frac{N_{CCE,p}}{L}\right\rfloor\right\}+i \quad \text{[Equation 1]}$$

L: aggregation level $n_{CI}$: carrier index $N_{CCE,p}$: total number of CCEs existing in control resource set p $n^{\mu}_{s,f}$:

slot index $$M_{s,max}^{(L)}:$$

number of PDCCH candidates at aggregation level L $m_{s,n_{CI}}=0, \ldots, M$ $$M_{s,max}^{(L)}-1:$$

PDCCH candidate index at aggregation level L $$i=0, \ldots, L-1$$

$$Y_{p,n_{s,f}^{\mu}}=\left(A_p \cdot Y_{p,n_{s,f}^{\mu}-1}\right) \bmod D,\ Y_{p,-1}=n_{RNTI} \neq 0,$$
$$A_p=39827 \text{ for } p \bmod 3=0,\ A_p=39829 \text{ for } p \bmod 3=1,$$
$$A_p=39839 \text{ for } p \bmod 3=2,\ D=65537$$

$n_{RNTI}$: UE identity

The $$Y_{p,n_{s,f}^{\mu}}$$

value may correspond to 0 in the case of a common search space.

The $$Y_{p,n_{s,f}^{\mu}}$$

value may correspond to a value changed by the UE's identity (C-RNTI or ID configured for the UE by the base station) and the time index in the case of a UE-specific search space.

In a 5G system, multiple search space sets may be configured by different parameters (for example, parameters in Table 9), and the group of search space sets monitored by the UE at each timepoint may differ accordingly. For example, if search space set #1 is configured at by X-slot cycle, if search space set #2 is configured at by Y-slot cycle, and if X and Y are different, the UE may monitor search space set #1 and search space set #2 both in a specific slot, and may monitor one of search space set #1 and search space set #2 both in another specific slot.

Hereinafter, QCL and TCI states will be described.

In a wireless communication system, one or more different antenna ports (which may be replaced with one or more channels, signals, and combinations thereof, but in the following description of the disclosure, will be referred to as different antenna ports, as a whole, for the sake of convenience) may be associated with each other by a quasi-co-location (QCL) configuration as in Table 10 below. A TCI state is for announcing the QCL relation between a PDCCH (or a PDCCH DRMS) and another RS or channel, and the description that a reference antenna port A (reference RS #A) and another target antenna port B (target RS #B) are QCLed with each other means that the UE is allowed to apply some or all of large-scale channel parameters estimated in the antenna port A to channel measurement form the antenna port B. The QCL may need to be associated with different parameters according to the situation such as 1) time tracking influenced by average delay and delay spread, 2) frequency tracking influenced by Doppler shift and Doppler spread, 3) radio resource management (RRM) influenced by average gain, or 4) beam management (BM) influenced by a spatial parameter. Accordingly, four types of QCL relations are supported in NR as in Table 10 below.

TABLE 10

| QCL type | Large-scale characteristics |
|---|---|
| A | Doppler shift, Doppler spread, average delay, delay spread |
| B | Doppler shift, Doppler spread |
| C | Doppler shift, average delay |
| D | Spatial Rx parameter |

The spatial RX parameter may refer to some or all of various parameters as a whole, such as angle of arrival (AoA), power angular spectrum (PAS) of AoA, angle of departure (AoD), PAS of AoD, transmit/receive channel correlation, transmit/receive beamforming, and spatial channel correlation.

The QCL relations may be configured for the UE through RRC parameter TCI-state and QCL-info as in Table 11 below. Referring to Table 11, the base station may configure one or more TCI states for the UE, thereby informing of a maximum of two kinds of QCL relations (qcl-Type1, qcl-Type2) regarding the RS that refers to the ID of the TCI state, that is, the target RS. Each piece of QCL information (QCL-Info) included in each TCI state includes the serving cell index and the BWP index of the reference RS indicated by the corresponding QCL information, the type and ID of the reference BS, and a QCL type as in Table 10 above.

TABLE 11

```
TCI-State ::=                SEQUENCE {
   tci-StateId                  TCI-StateId,
   (ID of corresponding TCI state)
   qcl-Type1                    QCL-Info,
   (QCL information of first refernece RS of RS (target RS) referring to corresponding TCI state
ID)
   qcl-Type2                    QCL-Info                  OPTIONAL, --
Need R
   (QCL information of second refernece RS of RS (target RS) referring to corresponding TCI
state ID)
   ...
 }
 QCL-Info ::=                 SEQUENCE {
   cell                         ServCellIndex             OPTIONAL, --
Need R
```

TABLE 11-continued

```
    (serving cell index of reference RS indicated by corresponding QCL information)
    bwp-Id                    BWP-Id                    OPTIONAL, -- Cond CSI-RS-
Indicated
    (BWP index of reference RS indicated by corresponding QCL information)
    referenceSignal           CHOICE {
      csi-rs                    NZP-CSI-RS-ResourceId,
      ssb                       SSB-Index
      (one of CSI-RS ID or SSB ID indicated by corresponding QCL information)
    },
    qcl-Type                  ENUMERATED {typeA, typeB, typeC, typeD},
    ...
  }
```

Figure 5:
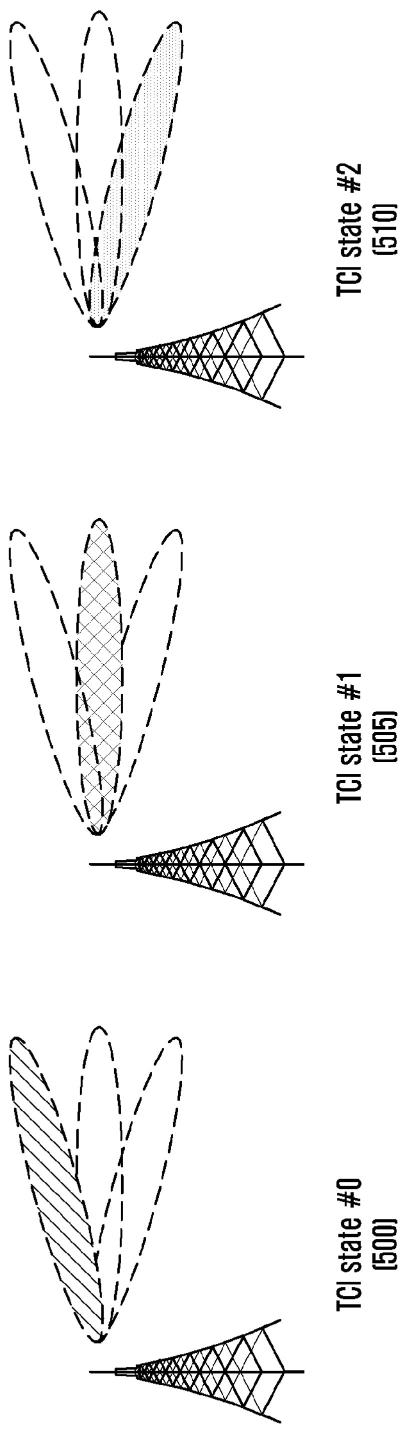
FIG. 5 illustrates an example of base station beam allocation according to TCI state configuration.

FIG. 5 illustrates an example of base station beam allocation according to TCI state configuration. Referring to FIG. 5, the base station may transfer information regarding N different beams to the UE through N different TCI states. For example, in the case of N=3 as in FIG. 5, the base station may configure qcl-Type2 parameters included in three TCI states 500, 505, and 510 in QCL type D while being associated with CSI-RSs or SSBs corresponding to different beams, thereby notifying that antenna ports referring to the different TCI states 500, 505, and 510 are associated with different spatial Rx parameters (that is, different beams).

Figure 6:
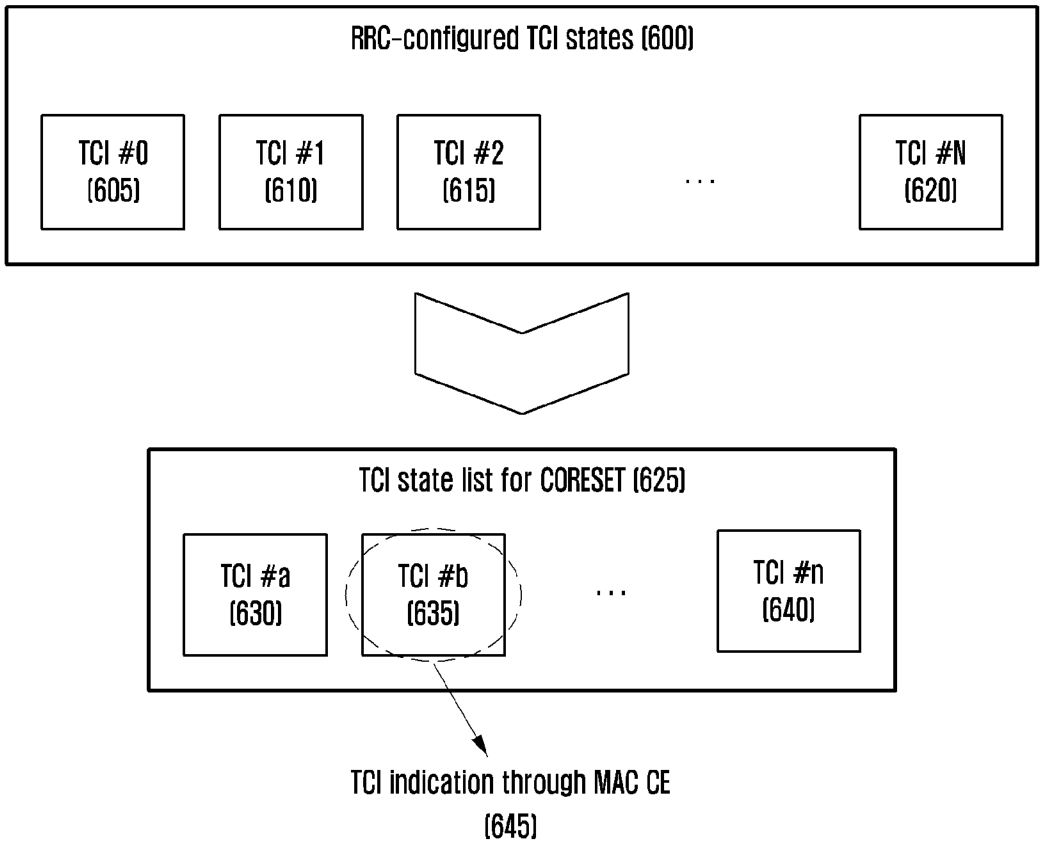
FIG. 6 illustrates an example of a PDCCH beam allocation method in an NR system.

FIG. 6 illustrates an example of a PDCCH beam allocation method in an NR system. In NR, a hierarchical signaling method as illustrated in FIG. 6 is supported for dynamic allocation regarding a PDCCH beam. Referring to FIG. 6, the base station may configure N TCI states 605, 610, 615, and 620 for the UE through RRC signaling 600, and may configure some thereof as TCI states for a CORESET (625). The base station may then indicate one of the TCI states 630, 635, and 640 for the CORESET to the UE through MAC CE signaling (645). The UE may then receive a PDCCH, based on beam information included in the TCI state indicated by the MAC CE signaling. That is, based on the activation command regarding the TCI state received through the MAC CE, the UE may correctly receive the DMRS of the corresponding CORESET, based on QCL information in the activated TCI state.

Figure 7:
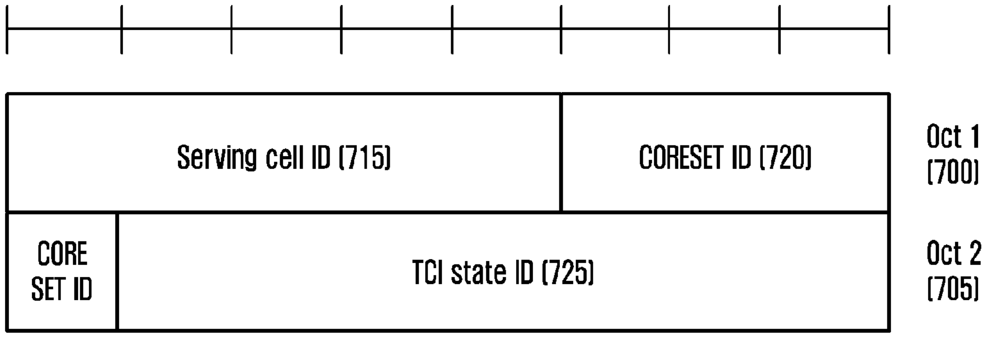
FIG. 7 illustrates a TCI indication MAC CE signaling structure for a PDCCH DMRS.

FIG. 7 illustrates a TCI indication MAC CE signaling structure for the PDCCH DMRS. Referring to FIG. 7, the TCI indication MAC CE signaling for the PDCCH DMRS may be configured by 2 bytes (16 bits) 700 and 705, and include a 5-bit serving cell ID 715, a 4-bit CORESET ID 720, and a 7-bit TCI state ID 725.

Figure 8:
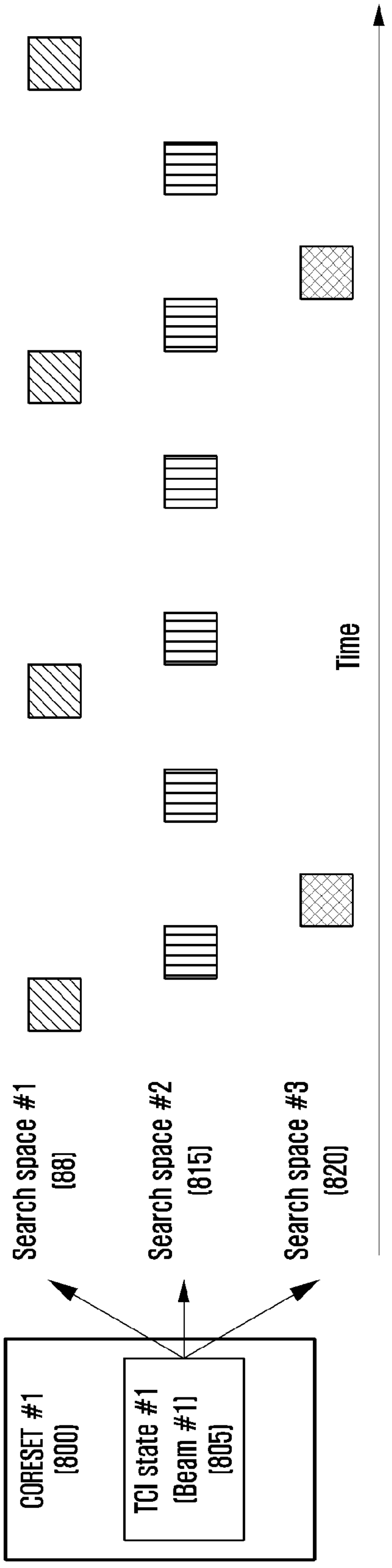
FIG. 8 illustrates an example of beam configuration with regard to a CORESET and a search space.

FIG. 8 illustrates an example of beam configuration with regard to a CORESET and a search space. Referring to FIG. 8, the base station may indicate one of TCI state lists included in CORESET 800 configuration through MAC CE signaling (805). Until a different TCI state is indicated for the corresponding CORESET through different MAC CE signaling, the UE may consider that identical QCL information (beam #1) 805 is all applied to one or more search spaces 810, 815, and 820 connected to the CORESET.

With regard to a CORESET having a configured index of 0 (CORESET #0), if the UE has failed to receive a MAC CE activation command regarding the TCI state of CORESET #0, the UE may assume that the DMRS transmitted in CORESET #0 has been QCL-ed with a SS/PBCH block identified in the initial access process, or in a non-contention-based random access process not triggered by a PDCCH command.

With regard to a CORESET having a configured index value other than 0 (CORESET #X), if the UE has no TCI state configured regarding CORESET #X, or if the UE has one or more TCI states configured therefor but has failed to receive a MAC CE activation command for activating one thereof, the UE may assume that the DMRS transmitted in CORESET #X has been QCL-ed with a SS/PBCH block identified in the initial access process.

Figure 9:
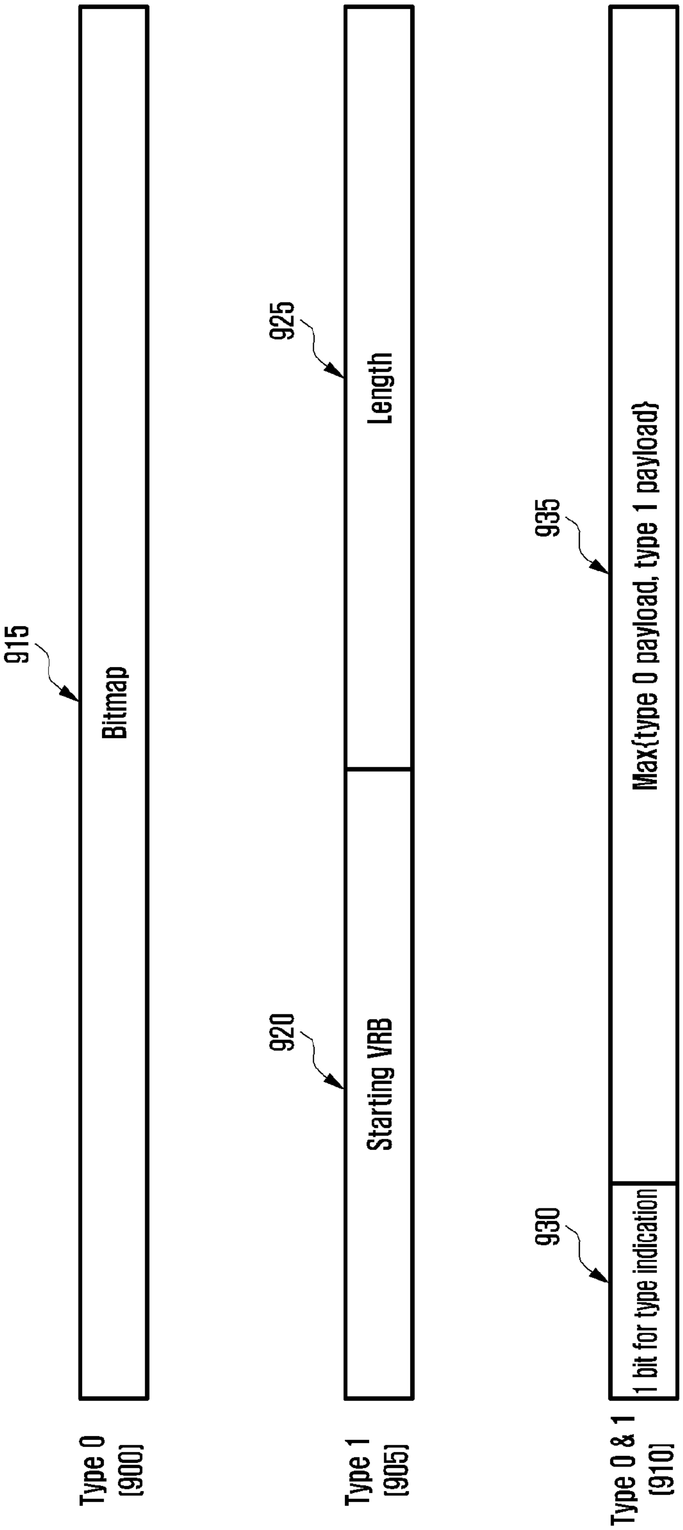
FIG. 9 illustrates an example of frequency domain resource allocation with regard to a PDSCH in a 5G system.

FIG. 9 illustrates an example of frequency domain resource allocation with regard to a PDSCH in a 5G system.

FIG. 9 illustrates three frequency domain resource allocation methods of type 0 900, type 1 905, and dynamic switch 910 which can be configured through an upper layer in an NR wireless communication system.

Referring to FIG. 9, in the case in which a UE is configured to use only resource type 0 through upper layer signaling (900), partial downlink control information (DCI) for allocating a PDSCH to the UE includes a bitmap including $N_{RBG}$ bits. $N_{RBG}$ refers to the number of resource block groups (RBGs) determined according to the BWP size allocated by a BWP indicator and upper layer parameter rbg-Size, as in Table 12 below, and data is transmitted in RBGs indicated as "1" by the bitmap.

TABLE 12

| Bandwidth Part Size | Configuration 1 | Configuration 2 |
|---|---|---|
| 1-36 | 3 | 4 |
| 37-72 | 4 | 8 |
| 73-144 | 8 | 16 |
| 145-275 | 16 | 16 |

In case that the UE is configured to use only resource type 1 through higher layer signaling (905), some DCI for allocating PDSCHs to the UE includes frequency domain resource allocation information including bits. The base station may thereby configure a starting virtual resource block (starting VRB) 920 and the length 925 of a frequency domain resource allocated continuously therefrom.

In the case in which the UE is configured to use both resource type 0 and resource type 1 through upper layer signaling (910), partial DCI for allocating a PDSCH to the corresponding UE includes frequency domain resource allocation information including as many bits as the larger value 935 between the payload 915 for configuring resource type 0 and the payload 920 and 925 for configuring resource type 1. One bit may be added to the foremost part (MSB) of the frequency domain resource allocation information inside the DCII, and if the bit has the value of "0", use of resource type 0 may be indicated, and if the bit has the value of "1", use of resource type 1 may be indicated.

Hereinafter, a time domain resource allocation method regarding a data channel in a 5G system will be described.

A base station may configure a table for time domain resource allocation information regarding a physical downlink shared channel (PDSCH) and a physical uplink shared channel (PUSCH) for a UE through upper layer signaling (for example, RRC signaling). A table including a maximum of maxNrofDL-Allocations=16 entries may be configured for the PDSCH, and a table including a maximum of maxNrofUL-Allocations=16 entries may be configured for the PUSCH. In an embodiment, the time domain resource allocation information may include PDCCH-to-PDSCH slot timing (for example, corresponding to a slot-unit time interval between a timepoint at which a PDCCH is received and a timepoint at which a PDSCH scheduled by the received PDCCH is transmitted; labeled K0), PDCCH-to-PUSCH slot timing (for example, corresponding to a slot-unit time interval between a timepoint at which a PDCCH is received and a timepoint at which a PUSCH scheduled by the received PDCCH is transmitted; hereinafter, labeled K2), information regarding the location and length of the start symbol by which a PDSCH or PUSCH is scheduled inside a slot, the mapping type of a PDSCH or PUSCH, and the like. For example, information such as in Table 13 or Table 14 below may be transmitted from the base station to the UE.

TABLE 13

| | |
|---|---|
| PDSCH-TimeDomainResourceAllocationList ::= | SEQUENCE (SIZE(1..maxNrofDL-Allocations)) OF |
| PDSCH-TimeDomainResourceAllocation | |
| PDSCH-TimeDomainResourceAllocation ::= | SEQUENCE { |
| k0 | |
| INTEGER(0..32) | |
| OPTIONAL, -- Need S | |
| (PDCCH-to-PDSCH timing, slot unit) | |
| mappingType | ENUMERATED {typeA, typeB}, |
| (PDSCH mapping type) | |
| startSymbolAndLength | INTEGER (0..127) |
| (start symbol and length of PDSCH) | |
| } | |

TABLE 14

| | |
|---|---|
| PUSCH-TimeDomainResourceAllocationList ::= | SEQUENCE (SIZE(1..maxNrofUL-Allocations)) OF |
| PUSCH-TimeDomainResourceAllocation | |
| PUSCH-TimeDomainResourceAllocation ::= | SEQUENCE { |
| k2 | INTEGER(0..32) |
| OPTIONAL, -- Need S | |
| (PDCCH-to-PUSCH timing, slot unit) | |
| mappingType | ENUMERATED {typeA, |
| typeB}, | |
| (PUSCH mapping type) | |
| startSymbolAndLength | INTEGER (0..127) |
| (start symbol and length of PUSCH) | |
| } | |

The base station may notify the UF of one of the entries of the table regarding time domain resource allocation information described above through L1 signaling (for example, DCI). For example, one of the entries may be indicated by "time domain resource allocation" field inside DCI. The UE may acquire time domain resource allocation information regarding a PDSCH or PUSCH, based on the DCI acquired from the base station.

Figure 10:
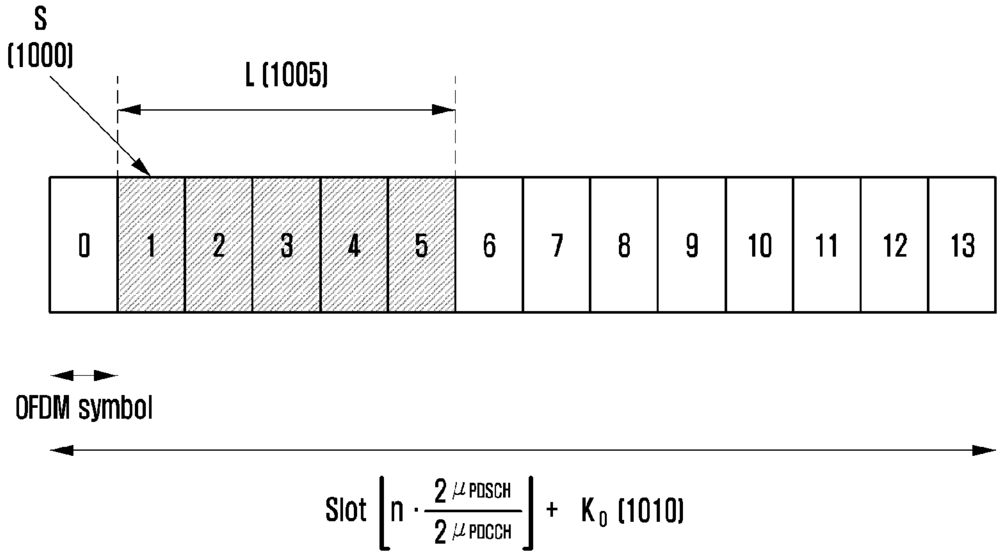
FIG. 10 illustrates an example of time domain resource allocation with regard to a PDSCH in a 5G system.

FIG. 10 illustrates an example of time domain resource allocation with regard to a PDSCH in a 5G system.

Referring to FIG. 10, the base station may indicate the time domain location of a PDSCH resource according to the subcarrier spacing (SCS) ($\mu_{PDSCH}$, $\mu_{PDCCH}$) of a data channel and a control channel configured by using an upper layer, the scheduling offset (K0) value, and the OFDM symbol start location 1000 and length 1005 within one slot dynamically indicated through DCI. The indicated PDSCH resource is located in a slot 1010.

Figure 11:
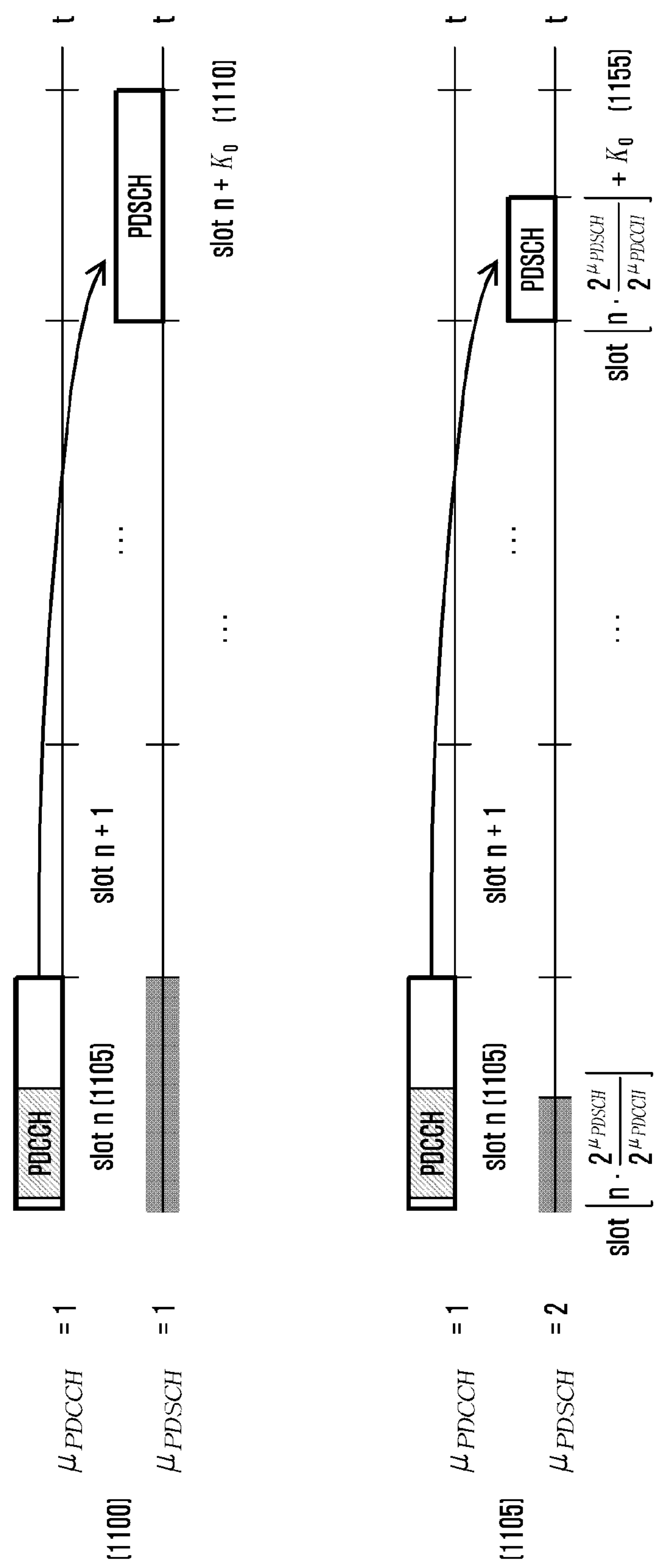
FIG. 11 illustrates an example of time domain resource allocation according to a subcarrier spacing with regard to a data channel and a control channel in a 5G system.

FIG. 11 illustrates an example of time domain resource allocation according to a subcarrier spacing with regard to a data channel and a control channel in a 5G system.

Referring to FIG. 11, if the data channel and the control channel have the same subcarrier spacing 1100 ($\mu_{PDSCH}=\mu_{PDCCH}$), the slot number for data and that for control are identical, and the base station and the UE may accordingly generate a scheduling offset in conformity with a predetermined slot offset K0. In this case, if the control channel is transmitted in slot n 1105, the data channel may be transmitted in slot n+K0 1110. On the other hand, if the data channel and the control channel have different subcarrier spacings 1150 ($_{PDSCH}\neq\mu_{PDCCH}$), the slot number for data and that for control are different, and the base station and the UE may accordingly generate a scheduling offset in conformity with a predetermined slot offset K0 with reference to the subcarrier spacing of the PDCCH. In this case, if the control channel is transmitted in slot n 1105, the data channel may be transmitted in slot $$\left\lfloor n \times \frac{2^{\mu_{PDSCH}}}{2^{\mu_{PDCCH}}} \right\rfloor + k0 \quad 1155.$$

Figure 12A:
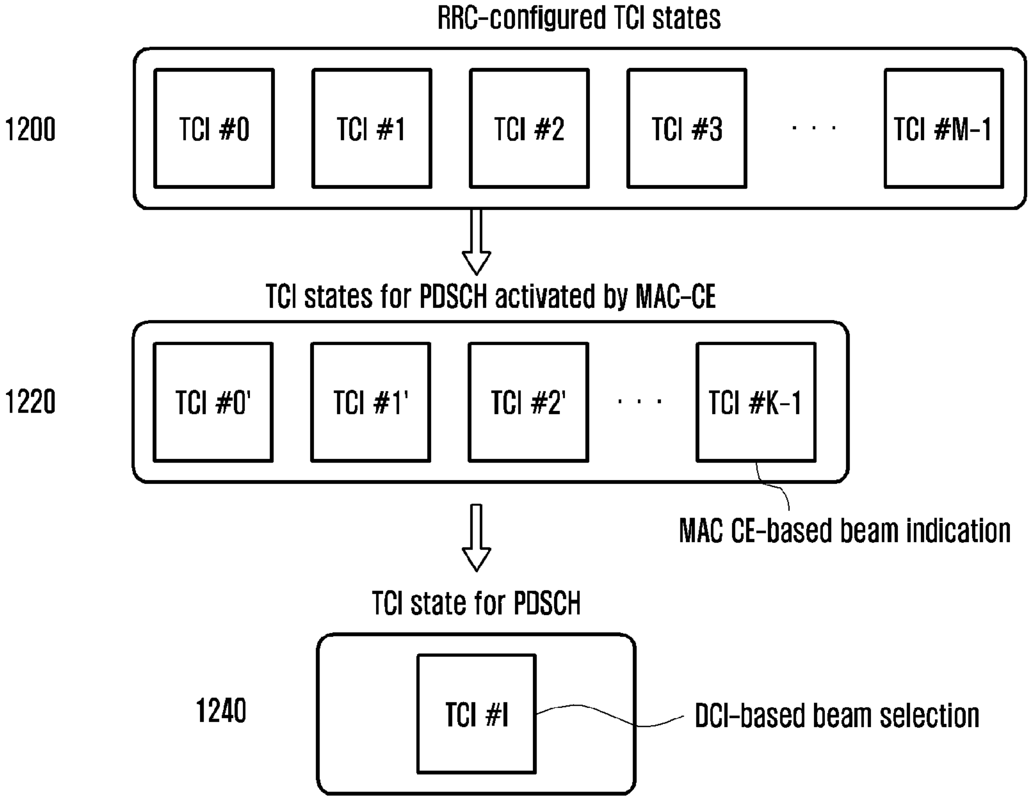
FIG. 12A illustrates an example of a process for beam configuration and activation with regard to a PDSCH.
Figure 12B:
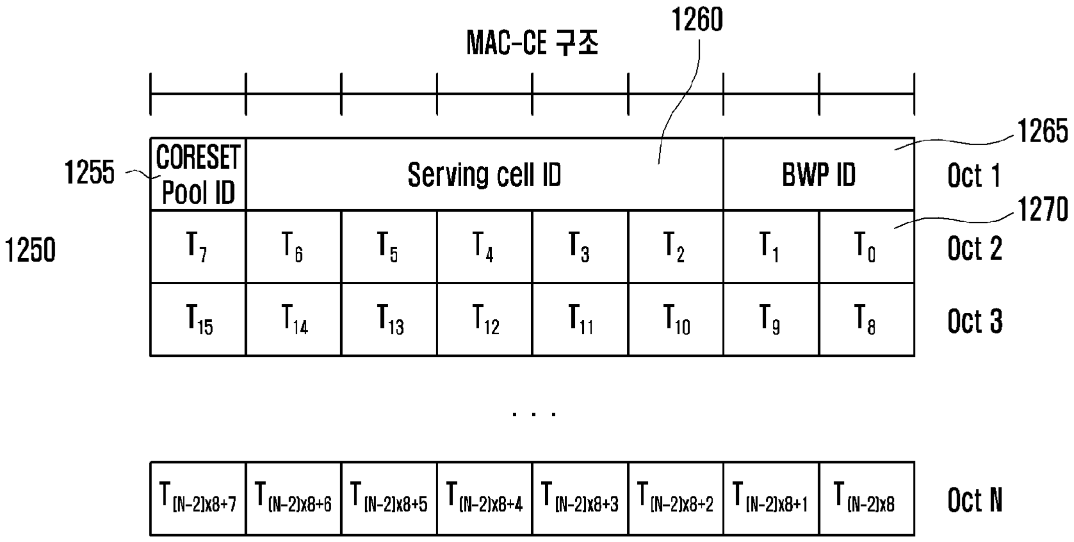
FIG. 12B illustrates an example of MAC-CE structure for PDSCH TCI state activation/deactivation.

Next, a method for beam configuration with regard to a PDSCH will be described. FIG. 12A illustrates an example of a process for beam configuration and activation with regard to a PDSCH. A list of TCI states regarding a PDSCH may be indicated through an upper layer list such as RRC (1200). The list of TCI states may be indicated by tci-StatesToAddModList and/or tci-StatesToReleaseList inside a BWP-specific PDSCH-Config IE, for example. Next, a part of the list of TCI states may be activated through a MAC-CE (1220). The maximum number of activated TCI states may be determined by the capability reported by the UE. FIG. 12B illustrates an example of MAC-CE structure for PDSCH TCI state activation/deactivation.

The MAC CE 1250 includes a CORESET pool ID 1255, a serving cell 1260, a BWP ID 1265, and a Ti 1270, and the meaning of each field and a value configurable for each field are as given in Table 15 below.

TABLE 15

| |
|---|
| - Serving Cell ID (serving cell identity): This field indicates the identity of the Serving Cell for which the MAC CE applies. The length of the field is 5 bits. If the indicated Serving Cell is configured as part of a simultaneousTCI-UpdateList1 or simultaneousTCI-UpdateList2 as specified in TS 38.331 [5], this MAC CE applies to all the Serving Cells configured in the set simultaneousTCI-UpdateList1 or simultaneousTCI-UpdateList2, respectively; |
| - BWP ID (bandwidth part identity): This field indicates a DL BWP for which the MAC CE applies as the codepoint of the DCI bandwidth part indicator field as specified in TS 38.212 [9]. The length of the BWP ID field is 2 bits. This field is ignored if this MAC CE applies to a set of Serving Cells; |
| - $T_i$ (TCI state identity): If there is a TCI state with TCI-StateId i as specified in TS 38.331 [5], this field indicates the activation/deactivation status of the TCI state with TCI-StateId i, otherwise MAC entity shall ignore the Ti field. The Ti field is set to 1 to indicate that the TCI state with TCI-StateId i shall be activated and mapped to the codepoint of the DCI Transmission Configuration Indication field, as specified in TS 38.214 [7]. The Ti field is set to 0 to indicate that the TCI state with TCI-StateId i shall be deactivated and is not mapped to the codepoint of the DCI Transmission Configuration Indication field. The codepoint to which the TCI State is mapped is determined by its ordinal position among all the TCI States with Ti field set to 1, i.e. the first TCI State with $T_i$ field set to 1 shall be mapped to the codepoint value 0, second TCI State with Ti field set to 1 shall be mapped to the codepoint value 1 and so on. The maximum number of activated TCI states is 8; |
| - CORESET Pool ID (CORESET Pool identity): This field indicates that mapping between the activated TCI states and the codepoint of the DCI Transmission Configuration Indication set by field Ti is specific to the ControlResourceSetId configured with CORESET Pool ID as specified in TS 38.331 [5]. This field set to 1 indicates that this MAC CE shall be applied for the DL transmission scheduled by CORESET with the CORESET pool ID equal to 1, otherwise, this MAC CE shall be applied for the DL transmission scheduled by CORESET pool ID equal to 0. If the coresetPoolIndex is not configured for any CORESET, MAC entity shall ignore the CORESET Pool ID field in this MAC CE when receiving the MAC CE. If the Serving Cell in the MAC CE is configured in a cell list that contains more than one Serving Cell, the CORESET Pool ID field shall be ignored when receiving the MAC CE. |

Next, an uplink channel estimation method using sounding reference signal (SRS) transmission of a UE will be described. The base station may configure at least one SRS configuration with regard to each uplink BWP in order to transfer configuration information for SRS transmission to the UE, and may also configure as least one SRS resource set with regard to each SRS configuration. As an example, the base station and the UE may exchange upper signaling information as follows, in order to transfer information regarding the SRS resource set.

srs-ResourceSetId: an SRS resource set index srs-ResourceIdList: a set of SRS resource indices referred to by SRS resource sets resourceType: time domain transmission configuration of SRS resources referred to by SRS resource sets, and may be configured as one of "periodic", "semi-persistent", and "aperiodic". If configured as "periodic" or "semi-persistent", associated CSI-RS information may be provided according to the place of use of SRS resource sets. If configured as "aperiodic", an aperiodic SRS resource trigger list/slot offset information may be provided, and associated CSI-RS information may be provided according to the place of use of SRS resource sets.

usage: configuration regarding the place of use of SRS resources referred to by SRS resource sets, and may be configured as one of "beamManagement", "codebook", "nonCodebook", and "antennaSwitching".

alpha, p0, pathlossReferenceRS, srs-PowerControlAdjustmentStates: provides a parameter configuration for adjusting the transmission power of SRS resources referred to by SRS resource sets.

The UE may understand that an SRS resource included in a set of SRS resource indices referred to by an SRS resource set follows the information configured for the SRS resource set.

The base station and the UE may transmit/receive upper layer signaling information in order to transfer individual configuration information regarding SRS resources. As an example, the individual configuration information regarding SRS resources may include time-frequency domain mapping information inside slots of the SRS resources, and this may include information regarding intra-slot or inter-slot frequency hopping of the SRS resources. The individual configuration information regarding SRS resources may include time domain transmission configuration of SRS resources, and may be configured as one of "periodic", "semi-persistent", and "aperiodic" The time domain transmission configuration of SRS resources may be limited to have the same time domain transmission configuration as the SRS resource set including the SRS resources. If the time domain transmission configuration of SRS resources is configured as "periodic" or "semi-persistent", the time domain transmission configuration may further include an SRS resource transmission cycle and a slot offset (for example, periodicityAndOffset).

The base station may activate or deactivate SRS transmission by the UE through upper layer signaling or L1 signaling. For example, the base station may activate or deactivate periodic SRS transmission for the UE through upper layer signaling. The base station may indicate activation of an SRS resource set having resourceType configured as "periodic" through upper layer signaling, and the UE may transmit the SRS resource referred to by the activated SRS resource set. Intra-slot time-frequency domain resource mapping of the transmitted SRS resource follows resource mapping information configured for the SRS resource, and slot mapping, including the transmission cycle and slot offset, follows periodicity AndOffset configured for the SRS resource. The spatial domain transmission filter applied to the transmitted SRS resource may refer to spatial relation info configured for the SRS resource, or may refer to associated CSI-RS information configured for the SRS resource set including the SRS resource. The UE may transmit the SRS resource inside the uplink BWP activated with regard to the periodic SRS resource activated through upper layer signaling.

For example, the base station may activate or deactivate periodic SRS transmission for the UE through upper layer signaling. The base station may indicate activation of an SRS resource set through MAC CE signaling, and the UE may transmit the SRS resource referred to by the activated SRS resource set. The SRS resource set activated through MAC CE signaling may be limited to an SRS resource set having resourceType configured as "semi-persistent". Intra-slot time-frequency domain resource mapping of the transmitted SRS resource follows resource mapping information configured for the SRS resource, and slot mapping, including the transmission cycle and slot offset, follows periodicityAndOffset configured for the SRS resource. The spatial domain transmission filter applied to the transmitted SRS resource may refer to spatial relation info configured for the SRS resource, or may refer to associated CSI-RS information configured for the SRS resource set including the SRS resource. If the SRS resource has spatial relation info configured therefor, the spatial domain transmission filter may be determined, without following the same, by referring to configuration information regarding spatial relation info transferred through MAC CE signaling that activates semi-persistent SRS transmission. The UE may transmit the SRS resource inside the uplink BWP activated with regard to the semi-persistent SRS resource activated through upper layer signaling.

For example, the base station may trigger aperiodic SRS transmission by the UE through DCI. The base station may indicate one of aperiodic SRS triggers (aperiodicSRS-ResourceTrigger) through the SRS request field of DCI. The UE may understand that the SRS resource set including the aperiodic SRS resource trigger indicated through DCI in the aperiodic SRS resource trigger list, among configuration information of the SRS resource set, has been triggered. The UE may transmit the SRS resource referred to by the triggered SRS resource set. Intra-slot time-frequency domain resource mapping of the transmitted SRS resource follows resource mapping information configured for the SRS resource. Slot mapping of the transmitted SRS resource may be determined by the slot offset between the SRS resource and a PDCCH including DCI, and this may refer to value(s) included in the slot offset set configured for the SRS resource set. Specifically, as the slot offset between the SRS resource and the PDCCH including DCI, a value indicated in the time domain resource assignment field of DCI, among offset value(s) included in the slot offset set configured for the SRS resource set, may be applied. The spatial domain transmission filter applied to the transmitted SRS resource may refer to spatial relation info configured for the SRS resource, or may refer to associated CSI-RS information configured for the SRS resource set including the SRS resource. The UE may transmit the SRS resource inside the uplink BWP activated with regard to the aperiodic SRS resource triggered through DCI.

If the base station triggers aperiodic SRS transmission by the UE through DCI, a minimum time interval may be necessary between the transmitted SRS and the PDCCH including the DCI that triggers aperiodic SRS transmission, in order for the UE to transmit the SRS by applying configuration information regarding the SRS resource. The time interval for SRS transmission by the UE may be defined as the number of symbols between the last symbol of the PDCCH including the DCI that triggers aperiodic SRS transmission and the first symbol mapped to the first transmitted SRS resource among transmitted SRS resource(s). The minimum time interval may be determined with reference to the PUSCH preparation procedure time needed by the UE to prepare PUSCH transmission.

In addition, the minimum time interval may have a different value depending on the place of use of the SRS resource set including the transmitted SRS resource. For example, the minimum time interval may be determined as N2 symbols defined in consideration of UE processing capability that follows the UE's capability with reference to the UE's PUSCH preparation procedure time. In addition, if the place of use of the SRS resource set is configured as "codebook" or "antennaSwitching" in consideration of the place of use of the SRS resource set including the transmitted SRS resource, the minimum time interval may be determined as N2 symbols, and if the place of use of the SRS resource set is configured as "nonCodebook" or ""beamManagement", the minimum time interval may be determined as N2+14 symbols. The UE may transmit an aperiodic SRS if the time interval for aperiodic SRS transmission is larger than or equal to the minimum time interval, and may ignore the DCI that triggers the aperiodic SRS if the time interval for aperiodic SRS transmission is smaller than the minimum time interval.

TABLE 16

```
SRS-Resource ::=                SEQUENCE {
   srs-ResourceId                  SRS-ResourceId,
   nrofSRS-Ports                   ENUMERATED {port1, ports2, ports4},
   ptrs-PortIndex                              ENUMERATED {n0, n1 }
OPTIONAL,    -- Need R
   transmissionComb                CHOICE {
      n2                                SEQUENCE {
         combOffset-n2                       INTEGER (0..1),
         cyclicShift-n2                   INTEGER (0..7)
      },
      n4                                SEQUENCE {
         combOffset-n4                       INTEGER (0..3),
         cyclicShift-n4                   INTEGER (0..11)
      }
   },
   resourceMapping                 SEQUENCE {
      startPosition                   INTEGER (0..5),
      nrofSymbols                          ENUMERATED {n1, n2, n4},
```

TABLE 16-continued

```
    repetitionFactor                ENUMERATED {n1, n2, n4}
  },
  freqDomainPosition              INTEGER (0..67),
  freqDomainShift                 INTEGER (0..268),
  freqHopping                     SEQUENCE {
    c-SRS                               INTEGER (0..63),
    b-SRS                               INTEGER (0..3),
    b-hop                               INTEGER (0..3)
  },
  groupOrSequenceHopping          ENUMERATED { neither, groupHopping,
sequenceHopping },
  resourceType                    CHOICE {
    aperiodic                         SEQUENCE {
      ...
    },
    semi-persistent                 SEQUENCE {
      periodicityAndOffset-sp                SRS-PeriodicityAndOffset,
      ...
    },
    periodic                          SEQUENCE {
      periodicityAndOffset-p                 SRS-PeriodicityAndOffset,
      ...
    }
  },
  sequenceId                      INTEGER (0..1023),
  spatialRelationInfo                          SRS-SpatialRelationInfo
OPTIONAL,   -- Need R
  ...
}
```

Configuration information spatialRelationInfo in Table 16 above may be applied, with reference to one reference signal, to a beam used for SRS transmission corresponding to beam information of the corresponding reference signal. For example, configuration of the spatialRelationInfo may include the following pieces of information as given in Table 17 below.

TABLE 17

```
  SRS-SpatialRelationInfo ::=   SEQUENCE {
    servingCellId                          ServCellIndex
  OPTIONAL,   -- Need S
    referenceSignal               CHOICE {
      ssb-Index                     SSB-Index,
      csi-RS-Index                  NZP-CSI-RS-ResourceId,
      srs                           SEQUENCE {
        resourceId                    SRS-ResourceId,
        uplinkBWP                     BWP-Id
      }
    }
  }
```

Referring to the configuration of the spatialRelationInfo, an SS/PBCH block index, CSI-RS index, or SRS index may be configured as the index of a reference signal to be referred to in order to use beam information of a specific reference signal. Upper signaling referenceSignal corresponds to configuration information indicating which reference signal's beam information is to be referred to for corresponding SRS transmission, ssb-Index refers to the index of an SS/PBCH block, csi-RS-Index refers to the index of a CSI-RS, and srs refers to the index of an SRS. If upper signaling referenceSignal has a configured value of "ssb-Index", the UE may apply the reception beam which was used to receive the SS/PBCH block corresponding to ssb-Index as the transmission beam for the corresponding SRS transmission. If upper signaling referenceSignal has a configured value of "'csi-RS-Index", the UE may apply the reception beam which was used to receive the CSI-RS corresponding to csi-RS-Index as the transmission beam for the corresponding SRS transmission. If upper signaling referenceSignal has a configured value of "'srs", the UE may apply the reception beam which was used to transmit the SRS corresponding to srs as the transmission beam for the corresponding SRS transmission.

Next, a PUSCH transmission scheduling scheme will be described. PUSCH transmission may be dynamically scheduled by a UL grant inside DCI, or operated by means of configured grant Type 1 or Type 2. Dynamic scheduling indication regarding PUSCH transmission may be made by DCI format 0_0 or 0_1.

Configured grant Type 1 PUSCH transmission may be configured semi-statically by receiving configuredGrantConfig including rrc-ConfiguredUplinkGrant in Table 16 through upper signaling, without receiving a UL grant inside DCI. Configured grant Type 2 PUSCH transmission may be scheduled semi-persistently by a UL grant inside DCI after receiving configuredGrantConfig not including rrc-ConfiguredUplinkGrant in Table 16 through upper signaling. If PUSCH transmission is operated by a configured grant, parameters applied to the PUSCH transmission are applied through configuredGrantConfig (upper signaling) in Table 18 except for dataScramblingIdentityPUSCH, txConfig, codebookSubset, maxRank, and scaling of UCI-OnPUSCH, which are provided by pusch-Config (upper signaling) in Table 19. If provided with transformPrecoder inside configuredGrantConfig (upper signaling) in Table 18, the UE applies tp-pi2BPSK inside pusch-Config in Table 19 to PUSCH transmission operated by a configured grant.

TABLE 18

```
ConfiguredGrantConfig ::=          SEQUENCE {
  frequencyHopping                         ENUMERATED {intraSlot, interSlot}
OPTIONAL,   -- Need S,
  cg-DMRS-Configuration                DMRS-UplinkConfig,
  mcs-Table                            ENUMERATED {qam256, qam64LowSE}
```

TABLE 18-continued

```
OPTIONAL,   -- Need S
   mcs-TableTransformPrecoder            ENUMERATED {qam256, qam64LowSE}
OPTIONAL,   -- Need S
   uci-OnPUSCH                           SetupRelease { CG-UCI-OnPUSCH }
OPTIONAL,   -- Need M
   resourceAllocation                    ENUMERATED { resourceAllocationType0,
resourceAllocationType1, dynamicSwitch },
   rbg-Size                              ENUMERATED {config2}
OPTIONAL,   -- Need S
   powerControlLoopToUse                 ENUMERATED {n0, n1},
   p0-PUSCH-Alpha                        P0-PUSCH-AlphaSetId,
   transformPrecoder                     ENUMERATED {enabled, disabled}
OPTIONAL,   -- Need S
   nrofHARQ-Processes                    INTEGER(1..16),
   repK                                  ENUMERATED {n1, n2, n4, n8},
   repK-RV                               ENUMERATED {s1-0231, s2-0303, s3-
0000}                                    OPTIONAL, -- Need R
   periodicity                           ENUMERATED {
                                         sym2, sym7, sym1x14, sym2x14,
sym4x14, sym5x14, sym8x14, sym10x14, sym16x14, sym20x14,
                                         sym32x14, sym40x14, sym64x14,
sym80x14, sym128x14, sym160x14, sym256x14, sym320x14, sym512x14,
                                         sym640x14, sym1024x14,
sym1280x14, sym2560x14, sym5120x14,
                                         sym6, sym1x12, sym2x12,
sym4x12, sym5x12, sym8x12, sym10x12, sym16x12, sym20x12, sym32x12,
                                         sym40x12, sym64x12, sym80x12,
sym128x12, sym160x12, sym256x12, sym320x12, sym512x12, sym640x12,
                                         sym1280x12, sym2560x12
   },
   configuredGrantTimer                  INTEGER (1..64)
OPTIONAL,   -- Need R
   rrc-ConfiguredUplinkGrant             SEQUENCE {
      timeDomainOffset                   INTEGER (0..5119),
      timeDomainAllocation               INTEGER (0..15),
      frequencyDomainAllocation          BIT STRING (SIZE(18)),
      antennaPort                        INTEGER (0..31),
      dmrs-SeqInitialization             INTEGER (0..1)
OPTIONAL,   -- Need R
      precodingAndNumberOfLayers         INTEGER (0..63),
      srs-ResourceIndicator              INTEGER (0..15)
OPTIONAL,   -- Need R
      mcsAndTBS                          INTEGER (0..31),
      frequencyHoppingOffset             INTEGER (1..
maxNrofPhysicalResourceBlocks-1)         OPTIONAL, -- Need R
      pathlossReferenceIndex             INTEGER (0..maxNrofPUSCH-
PathlossReferenceRSs-1),
      ...
   }
OPTIONAL,   -- Need R
   ...
}
```

Next, a PUSCH transmission method will be described. The DMRS antenna port for PUSCH transmission is identical to an antenna port for SRS transmission. PUSCH transmission may follow a codebook-based transmission method and a non-codebook-based transmission method according to whether the value of txConfig inside pusch-Config in Table 19, which is upper signaling, is “codebook” or “nonCodebook”.

As described above, PUSCH transmission may be dynamically scheduled through DCI format 0_0 or 0_1, and may be configured semi-statically by a configured grant. Upon receiving indication of scheduling regarding PUSCH transmission through DCI format 0_0, the UE performs beam configuration for PUSCH transmission by using pucch-spatialRelationInfoID corresponding to a UE-specific PUCCH resource corresponding to the minimum ID inside an activated uplink BWP inside a serving cell, and the PUSCH transmission is based on a single antenna port. The UE does not expect scheduling regarding PUSCH transmission through DCI format 0_0 inside a BWP having no configured PUCCH resource including pucch-spatialRelationInfo. If the UE has no configured txConfig inside pusch-Config in Table 19, the UE does not expect scheduling through DCI format 0_1.

TABLE 19

```
PUSCH-Config ::=                         SEQUENCE {
   dataScramblingIdentityPUSCH                 INTEGER (0..1023)
OPTIONAL,   -- Need S
   txConfig                                    ENUMERATED {codebook,
nonCodebook}                             OPTIONAL, -- Need S
   dmrs-UplinkForPUSCH-MappingTypeA            SetupRelease { DMRS-
UplinkConfig }                           OPTIONAL, -- Need M
```

TABLE 19-continued

```
  dmrs-UplinkForPUSCH-Mapping TypeB                 SetupRelease { DMRS-
UplinkConfig }                                  OPTIONAL, -- Need M
  pusch-PowerControl                                   PUSCH-PowerControl
OPTIONAL,   -- Need M
  frequencyHopping                              ENUMERATED {intraSlot, interSlot}
OPTIONAL,   -- Need S
  frequencyHoppingOffsetLists                 SEQUENCE (SIZE (1..4)) OF INTEGER
(1.. maxNrofPhysicalResourceBlocks-1)
OPTIONAL,   -- Need M
  resourceAllocation                                        ENUMERATED
{ resourceAllocationType0, resourceAllocationType1, dynamicSwitch},
  pusch-TimeDomainAllocationList                    SetupRelease { PUSCH-
TimeDomainResourceAllocationList }              OPTIONAL, -- Need M
  pusch-AggregationFactor                        ENUMERATED { n2, n4, n8 }
OPTIONAL,   -- Need S
  mcs-Table                                          ENUMERATED {qam256,
qam64LowSE}                                       OPTIONAL, -- Need S
  mcs-TableTransformPrecoder                         ENUMERATED {qam256,
qam64LowSE}                                       OPTIONAL, -- Need S
  transformPrecoder                             ENUMERATED {enabled, disabled}
OPTIONAL,   -- Need S
  codebookSubset                                            ENUMERATED
{fullyAndPartialAndNonCoherent, partialAndNonCoherent,nonCoherent}
OPTIONAL,   -- Cond codebookBased
  maxRank                                                   INTEGER (1..4)
OPTIONAL,   -- Cond codebookBased
  rbg-Size                                            ENUMERATED { config2}
OPTIONAL,   -- Need S
  uci-OnPUSCH                                   SetupRelease { UCI-OnPUSCH}
OPTIONAL,   -- Need M
  tp-pi2BPSK                                           ENUMERATED {enabled}
OPTIONAL,   -- Need S
  ...
}
```

Hereinafter, codebook-based PUSCH transmission will be described. The codebook-based PUSCH transmission may be dynamically scheduled through DCI format 0_0 or 0_1, and may be operated semi-statically by a configured grant. If a codebook-based PUSCH is dynamically scheduled through DCI format 0_1 or configured semi-statically by a configured grant, the UE determines a precoder for PUSCH transmission, based on an SRS resource indicator (SRI), a transmission precoding matrix indicator (TPMI), and a transmission rank (the number of PUSCH transmission layers).

The SRI may be given through the SRS resource indicator (a field inside DCI) or configured through srs-ResourceIndicator (upper signaling). During codebook-based PUSCH transmission, the UE has at least one SRS resource configured therefor, and may have a maximum of two SRS resources configured therefor. If the UE is provided with an SRI through DCI, the SRS resource indicated by the SRI refers to the SRS resource corresponding to the SRI among SRS resources transmitted prior to the PDCCH including the SRI. The TPMI and the transmission rank may be given through "precoding information and number of layers" (a field inside DCI) or configured through precodingAndNumberOfLayers (upper signaling). The TPMI is used to indicate a precoder to be applied to PUSCH transmission. If one SRS resource is configured for the UE, the TPMI is used to indicate a precoder to be applied in the configured SRS resource. If multiple SRS resources are configured for the UE, the TPMI is used to indicate a precoder to be applied in an SRS resource indicated through the SRI.

The precoder to be used for PUSCH transmission may be selected from an uplink codebook having the same number of antenna ports as the value of nrofSRS-Ports inside SRS-Config (upper signaling). In connection with codebook-based PUSCH transmission, the UE determines a codebook subset, based on codebookSubset inside pusch-Config (upper signaling) and TPMI. The codebookSubset inside pusch-Config (upper signaling) may be configured to be one of "fullyAndPartialAndNonCoherent", "partialAndNonCoherent", or "noncoherent", based on UE capability reported by the UE to the base station. If the UE reported "partialAndNonCoherent" as UE capability, the UE may not expect that the value of codebookSubset (upper signaling) will as be configured "fully AndPartialAndNonCoherent". In addition, if the UE reported "nonCoherent" as UE capability, UE does not expect that the value of codebookSubset (upper signaling) will be configured as "fully AndPartialAndNonCoherent" or "partialAndNonCoherent". If nrofSRS-Ports inside SRS-ResourceSet (upper signaling) indicates two SRS antenna ports, the UE does not expect that the value of codebookSubset (upper signaling) will be configured as "partialAndNonCoherent".

The UE may have one SRS resource set configured therefor, wherein the value of usage inside SRS-ResourceSet (upper signaling) is "codebook", and one SRS resource may be indicated through an SRI inside the corresponding SRS resource set. If multiple SRS resources are configured inside the SRS resource set wherein the value of usage inside SRS-ResourceSet (upper signaling) is "codebook", the UE expects that the value of nrofSRS-Ports inside SRS-Resource (upper signaling) is identical for all SRS resources.

The UE transmit, to the base station, one or multiple SRS resources included in the SRS resource set wherein the value of usage is configured as "codebook" according to upper signaling, and the base station selects one from the SRS resources transmitted by the UE and instructs the UE to transmit a PUSCH by using transmission beam information of the corresponding SRS resource. In connection with the codebook-based PUSCH transmission, the SRI is used as information for selecting the index of one SRS resource, and is included in DCI. Additionally, the base station adds information indicating the rank and TPMI to be used by the UE for PUSCH transmission to the DCI. Using the SRS resource indicated by the SRI, the UE applies, in performing PUSCH transmission, the precoder indicated by the rank and TPMI indicated based on the transmission beam of the corresponding SRS resource, thereby performing PUSCH transmission.

Next, non-codebook-based PUSCH transmission will be described. The non-codebook-based PUSCH transmission may be dynamically scheduled through DCI format 0_0 or 0_1, and may be operated semi-statically configured by a configured grant. If at least one SRS resource is configured inside an SRS resource set wherein the value of usage inside SRS-ResourceSet (upper signaling) is "nonCodebook", non-codebook-based PUSCH transmission may be scheduled for the UE through DCI format 0_1.

With regard to the SRS resource set wherein the value of usage inside SRS-ResourceSet (upper signaling) is "non-Codebook", one connected NZP CSI-RS resource (non-zero power CSI-RS) may be configured for the UE. The UE may calculate a precoder for SRS transmission by measuring the NZP CSI-RS resource connected to the SRS resource set. If the difference between the last received symbol of an aperiodic NZP CSI-RS resource connected to the SRS resource set and the first symbol of aperiodic SRS transmission in the UE is less than 42 symbols, the UE does not expect that information regarding the precoder for SRS transmission will be updated.

If the configured value of resourceType inside SRS-ResourceSet (upper signaling) is "aperiodic", the connected NZP CSI-RS may be indicated by an SRS request which is a field inside DCI format 0_1 or 1_1. If the connected NZP CSI-RS resource is an aperiodic NZP CSI-RS resource, the existence of the connected NZP CSI-RS is indicated with regard to the case in which the value of SRS request (a field inside DCI format 0_1 or 1_1) is not "00". The corresponding DCI should not indicate cross carrier or cross BWP scheduling. In addition, if the value of SRS request indicates the existence of a NZP CSI-RS, the NZP CSI-RS is positioned in the slot used to transmit the PDCCH including the SRS request field.

If there is a periodic or semi-persistent SRS resource set configured, the connected NZP CSI-RS may be indicated through associatedCSI-RS inside SRS-ResourceSet (upper signaling). With regard to non-codebook-based transmission, the UE does not expect that spatialRelationInfo, which is upper signaling regarding the SRS resource, and associatedCSI-RS inside SRS-ResourceSet, which is upper signaling, will be configured together.

If multiple SRS resources are configured for the UE, the UE may determine a precoder to be applied to PUSCH transmission and the transmission rank, based on an SRI indicated by the base station. The SRI may be indicated through the SRS resource indicator (a field inside DCI) or configured through srs-ResourceIndicator (upper signaling). Similarly to the above-described codebook-based PUSCH transmission, if the UE is provided with the SRI through DCI, the SRS resource indicated by the corresponding SRI refers to the SRS resource corresponding to the SRI, among SRS resources transmitted prior to the PDCCH including the corresponding SRI. The UE may use one or multiple SRS resources for SRS transmission, and the maximum number of SRS resources that can be transmitted simultaneously in the same symbol inside one SRS resource set and the maximum number of SRS resources are determined by UE capability reported to the base station by the UE. SRS resources simultaneously transmitted by the UE occupy the same RB. The UE configures one SRS port for each SRS resource. There may be only one configured SRS resource set wherein the value of usage inside SRS-ResourceSet (upper signaling) is "nonCodebook", and a maximum of four SRS resources may be configured for non-codebook-based PUSCH transmission.

The base station transmits one NZP-CSI-RS connected to the SRS resource set to the UE, and the UE calculates the precoder to be used when transmitting one or multiple SRS resources inside the corresponding SRS resource set, based on the result of measurement when the corresponding NZP-CSI-RS is received. The UE applies the calculated precoder when transmitting, to the base station, one or multiple SRS resources inside the SRS resource set wherein the configured usage is "nonCodebook", and the base station selects one or multiple SRS resources from the received one or multiple SRS resources. In connection with the non-codebook-based PUSCH transmission, the SRI indicates an index that may express one SRS resource or a combination of multiple SRS resources, and the SRI is included in DCI. The number of SRS resources indicated by the SRI transmitted by the base station may be the number of transmission layers of the PUSCH, and the UE transmits the PUSCH by applying the precoder applied to SRS resource transmission to each layer.

Next, a PUSCH preparation procedure time will be described. If a base station schedules a UE so as to transmit a PUSCH by using DCI format 0_0, 0_1, or 0_2, the UE may require a PUSCH preparation procedure time such that a PUSCH is transmitted by applying a transmission method (SRS resource transmission precoding method, the number of transmission layers, spatial domain transmission filter) indicated through DCI. The PUSCH preparation procedure time is defined in an NR system in consideration thereof. The PUSCH preparation procedure time of the UE may follow Equation 2 given below.

$$T_{proc,2} = \max\left((N_2 + d_{2,1} + d_2)(2048 + 144)\kappa 2^{-\mu} T_c + T_{ext} + T_{switch},\ d_{2,2}\right) \quad \text{[Equation 2]}$$

Each parameter in $T_{proc,2}$ described above in Equation 2 may have the following meaning.

$N_2$: the number of symbols determined according to UE processing capability 1 or 2, based on the UE's capability, and numerology μ. $N_2$ may have a value in Table 20 if UE processing capability 1 is reported according to the UE's capability report, and may have a value in Table 21 if UE processing capability 2 is reported, and if availability of UE processing capability 2 is configured through upper layer signaling.

TABLE 20

| μ | PUSCH preparation time $N_2$ [symbols] |
|---|---|
| 0 | 10 |
| 1 | 12 |
| 2 | 23 |
| 3 | 36 |

TABLE 21

| μ | PUSCH preparation time $N_2$ [symbols] |
|---|---|
| 0 | 5 |
| 1 | 5.5 |
| 2 | 11 for frequency range 1 |

$d_{2,1}$: the number of symbols determined to be 0 if all resource elements of the first OFDM symbol of PUSCH transmission include DM-RSs, and to be 1 otherwise.

κ: 64

μ: follows a value, among $\mu_{DL}$ and $\mu_{UL}$, which makes $T_{proc,2}$ larger. $\mu_{DL}$ refers to the numerology of a downlink used to transmit a PDCCH including DCI that schedules a PUSCH, and $\mu_{UL}$ refers to the numerology of an uplink used to transmit a PUSCH.

$$T_c\colon 1/(\Delta f_{max}\cdot N_f),\ \Delta f_{max}=480\cdot 10^3\text{ Hz},\ N_f=4096.$$

$d_{2,2}$: follows a BWP switching time if DCI that schedules a PUSCH indicates BWP switching, and has 0 otherwise.

$d_2$: if OFDM symbols overlap temporally between a PUSCH having a high priority index and a PUCCH having a low priority index, the $d_2$ value of the PUSCH having a high priority index is used. Otherwise, $d_2$ is 0.

$T_{ext}$: if the UE uses a shared spectrum channel access scheme, the UE may calculate $T_{ext}$ and apply the same to a PUSCH preparation procedure time. Otherwise, $T_{ext}$ is assumed to be 0.

$T_{switch}$: if an uplink switching spacing has been triggered, $T_{switch}$ is assumed to be the switching spacing time. Otherwise, $T_{switch}$ is assumed to be 0.

The base station and the UE determine that the PUSCH preparation procedure time is insufficient if the first symbol of a PUSCH starts earlier than the first uplink symbol in which a CP starts after $T_{proc,2}$ from the last symbol of a PDCCH including DCI that schedules the PUSCH, in view of the influence of timing advance between the uplink and the downlink and time domain resource mapping information of the PUSCH scheduled through the DCI. Otherwise, the base station and the UE determines that the PUSCH preparation procedure time is sufficient. The UE may transmit the PUSCH only if the PUSCH preparation procedure time is sufficient, and may ignore the DCI that schedules the PUSCH if the PUSCH preparation procedure time is insufficient.

According to an embodiment of the disclosure, non-coherent joint transmission (NC-JT) may be used for a UE to receive a PDSCH from multiple TRPs.

Unlike the existing communication system, a 5G wireless communication system may support not only a service requiring a high transfer rate, but also both a service having a very short transmission latency and a service requiring high connection density. Cooperative communication (coordinated transmission) between each cell, transmission and reception point (TRP), and/or beam in a wireless communication network including multiple cells, TRPs, or beams may satisfy various service requirements by increasing the strength of a signal received by the UE or by efficiently controlling interference between each cell, TRP, and/or beam.

Joint transmission (JT) is a representative transmission technology for the above-mentioned cooperative communication, and is a technology for transmitting a signal to one UE through multiple different cells, TRPs, and/or beams so as to increase the strength or throughput of a signal received by the UE. In this case, the characteristics of channels between each cell, TRP, and/or beam and the UE may significantly different, and in particular, in the case of NC-JT that supports non-coherent precoding between each cell, TRP, and/or beam, individual precoding, MCS, resource allocation, TCI indication, or the like may be necessary depending on the channel characteristics for each link between each cell, TRP, and/or beam and the UE.

The above-described NC-JT transmission may be applied to at least one channel among a PDSCH, a PDCCH, a PUSCH, and a PUCCH. During PDSCH transmission, transmission information, such as precoding, MCS, resource allocation, or TCI, is indicated through DL DCI, and for NC-JT transmission, the transmission information is required to be indicated independently for each cell, TRP, and/or beam. This is a main factor for increasing payload required for DL DCI transmission, and may adversely affect reception performance of a PDCCH for transmitting DCI. Accordingly, it is necessary to carefully design a tradeoff between a DCI amount and control information reception performance for JT support of a PDSCH.

Figure 13:
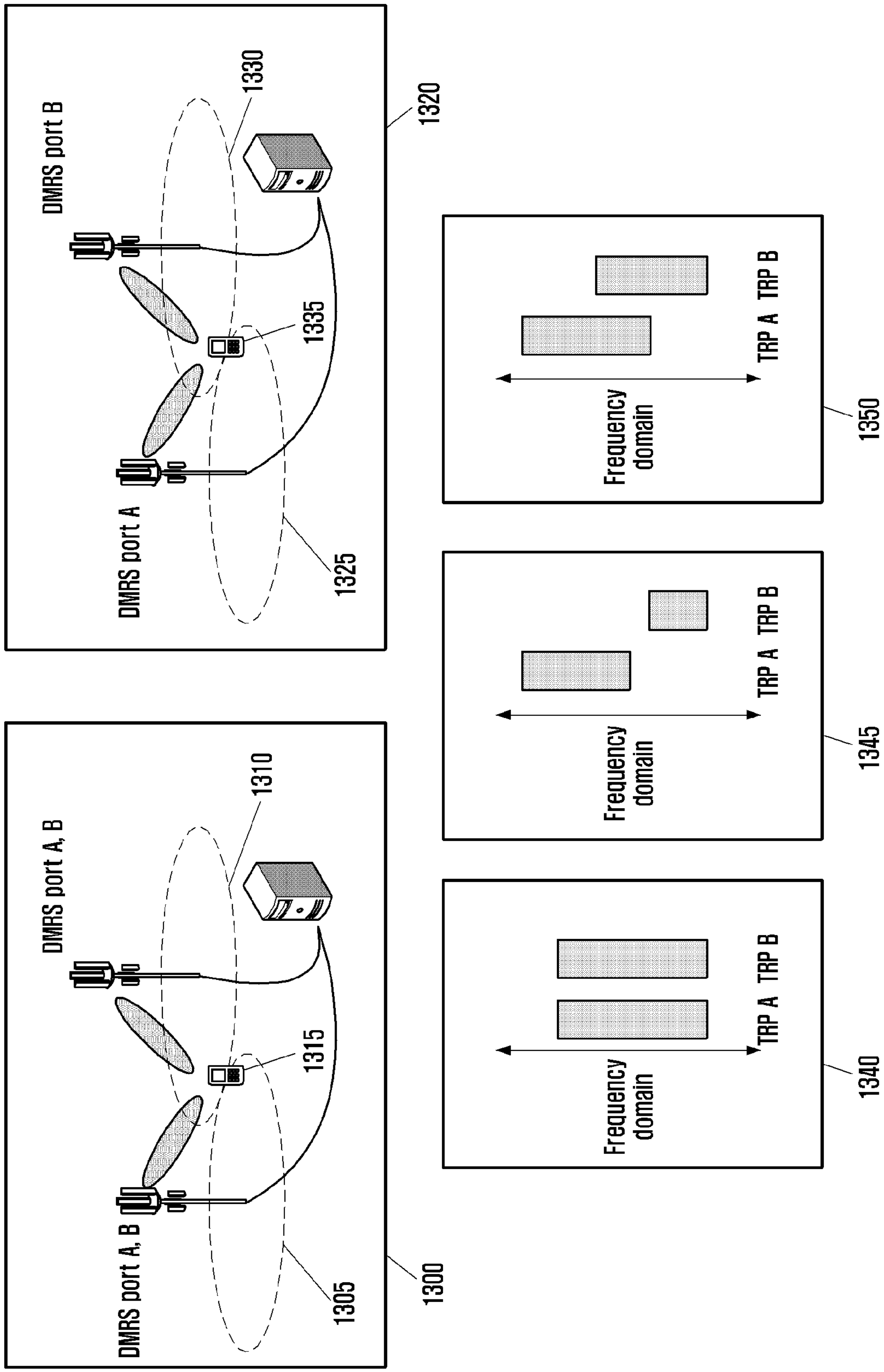
FIG. 13 illustrates an example of antenna port configuration and resource allocation for transmitting a PDSCH by using cooperative communication in a wireless communication system.

FIG. 13 illustrates an example of an antenna port configuration and resource allocation for transmitting a PDSCH by using cooperative communication in a wireless communication system.

Referring to FIG. 13, an example for PDSCH transmission is described for each technique of joint transmission (JT), and examples for allocating a radio resource for each TRP are illustrated.

An example 1300 of coherent joint transmission (C-JT) supporting coherent precoding between each cell, TRP, and/or beam is illustrated. In the case of C-JT, single piece of data (PDSCH) is transmitted from TRP A 1305 and TRP B 1310 to a UE 1315, and multiple TRPs may perform joint precoding. This may indicate that a DMRS is transmitted through the same DMRS port so that TRP A 1305 and TRP B 1310 transmit the same PDSCH. For example, each of TRP A 1305 and TRP B 1310 may transmit a DMRS to the UE through DMRS port A and DMRS port B. In this case, the UE may receive one piece of DCI for receiving one PDSCH demodulated based on the DMRS transmitted through DMRS port A and DMRS port B.

In addition, an example 1320 of NC-JT supporting non-coherent precoding between each cell, TRP, and/or beam for PDSCH transmission is illustrated. In the case of NC-JT, a PDSCH is transmitted to a UE 1335 for each cell, TRP, and/or beam, and individual precoding may be applied to each PDSCH. Each cell, TRP, and/or beam may transmit, to the UE, different PDSCHs or different PDSCH layers, so as to improve throughput compared to transmission via a single cell, TRP, and/or beam. In addition, each cell, TRP, and/or beam may repeatedly transmit the same PDSCH to the UE, so as to improve reliability compared to transmission via a single cell, TRP, and/or beam. For convenience of description, hereinafter, a cell, a TRP, and/or a beam are collectively referred to as a TRP.

In this case, various radio resource allocations may be considered for the PDSCH transmission, for example, a case 1340 where frequency and time resources used in multiple TRPs are all the same, a case 1345 where frequency and time resources used in multiple TRPs do not overlap, and a case 1350 where frequency and time resources used in multiple TRPs partially overlap.

For support of NC-JT, pieces of DCIs of various forms, structures, and relationships may be considered to simultaneously allocate multiple PDSCHs to one UE.

Figure 14:
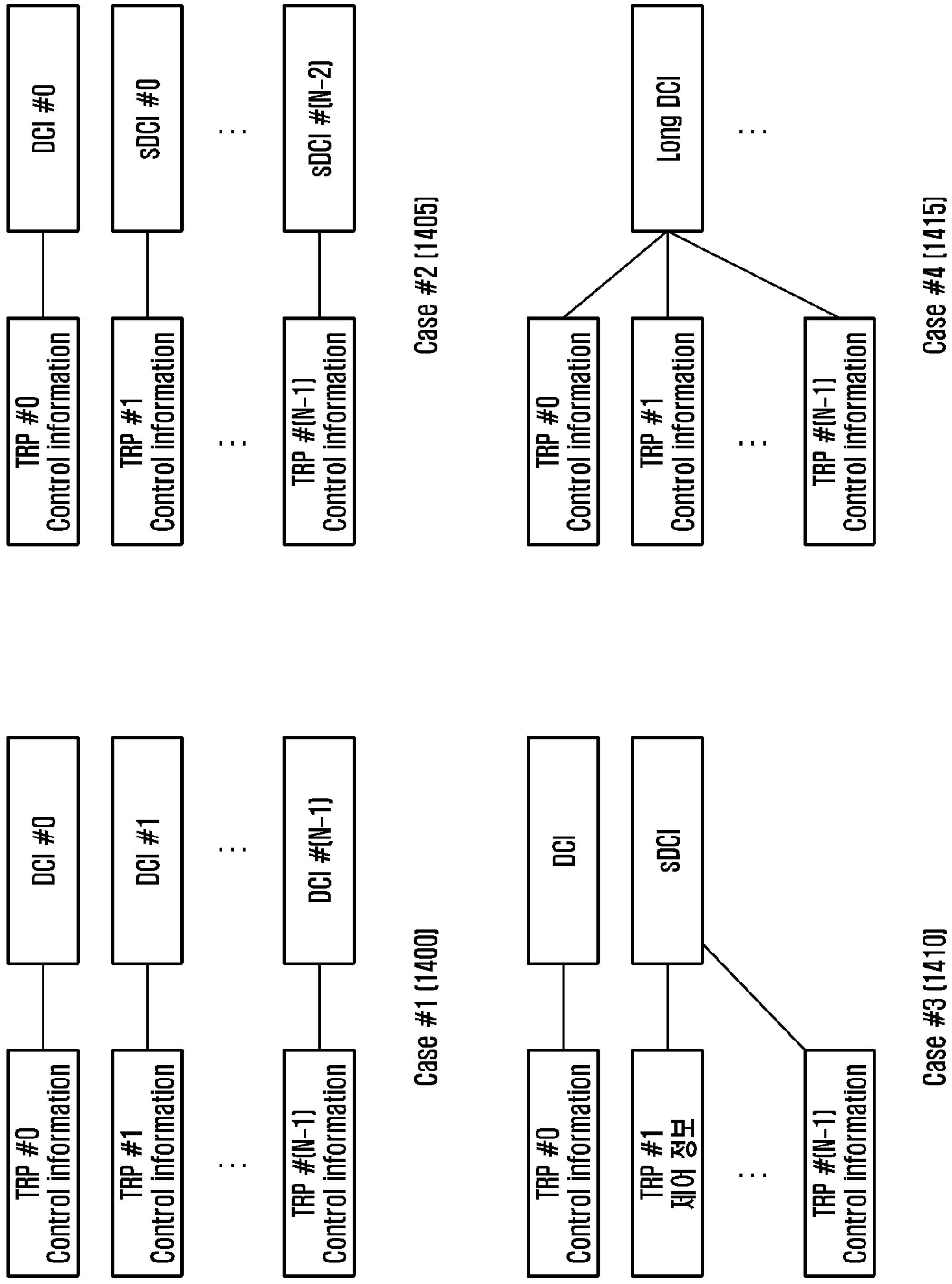
FIG. 14 illustrates an example of a configuration of DCI for NC-JT in which each TRP transmits a different PDSCH or a different PDSCH layer to a terminal in a wireless communication system.

FIG. 14 illustrates an example of a configuration of DCI for NC-JT in which each TRP transmits a different PDSCH or a different PDSCH layer to a UE in a wireless communication system.

Referring to FIG. 14, case #1 1400 is an example in which, while N−1 different PDSCHs are transmitted from N−1 additional TRPs (TRP #1 to TRP #(N−1)) in addition to a serving TRP (TRP #0) used during single PDSCH transmission, control information regarding the PDSCHs transmitted from the N−1 additional TRPs is transmitted independently from control information regarding the PDSCH transmitted from the serving TRP. In other words, a UE may obtain control information regarding the PDSCHs transmitted from the different TRPs (TRP #0 to TRP #(N−1)), via independent pieces of DCI (DCI #0 to DCI #(N−1)). Formats of the independent pieces of DCI may be the same as or different from each other, and payloads of the pieces of DCI may also be the same as or different from each other. In case #1 described above, control of each PDSCH or the degree of freedom of allocation may be fully guaranteed, but reception performance may deteriorate due to an occurrence of coverage difference for each piece of DCI when each piece of DCI is transmitted in the different TRPs.

Case #2 1405 shows an example in which, while N−1 different PDSCHs are transmitted from N−1 additional TRPs (TRP #1 to TRP #(N−1)) in addition to a serving TRP (TRP #0) used during single PDSCH transmission, each of pieces of control information (DCI) for PDSCHs of the N−1 additional TRPs is transmitted, and each of the pieces of DCI is dependent on control information regarding a PDSCH transmitted from the serving TRP.

For example, DCI #0 that is control information regarding a PDSCH transmitted from the serving TRP (TRP #0) includes all information elements of DCI format 1_0, DCI format 1_1, and DCI format 1_2, but shortened DCI (sDCI) (sDCI #0 to sDCI #(N-2)) that is control information regarding PDSCHs transmitted from cooperative TRPs (TRP #1 to TRP #(N−1)) may include some of the information elements of DCI format 1_0, DCI format 1_1, and DCI format 1_2. Accordingly, since the sDCI transmitting the control information regarding the PDSCHs transmitted from the cooperative TRPs has a small payload compared to normal DCI (nDCI) transmitting the control information regarding the PDSCH transmitted from the serving TRP, it is possible for the sDCI to include reserved bits compared to the nDCI.

In case #2 described above, control of each PDSCH or the degree of freedom of allocation may be limited depending on the content of an information element included in the sDCI, but reception performance of the sDCI is excellent compared to nDCI, and thus, a probability in which a coverage difference for each piece of DCI occurs may be reduced.

Case #3 1410 shows an example in which, while N−1 different PDSCHs are transmitted from N−1 additional TRPs (TRP #1 to TRP #(N−1)) in addition to a serving TRP (TRP #0) used during single PDSCH transmission, one piece of control information regarding the PDSCHs of the N−1 additional TRPs is transmitted and the DCI is dependent on control information regarding a PDSCH transmitted from the serving TRP.

For example, DCI #0 that is control information regarding a PDSCH transmitted from the serving TRP (TRP #0) includes all information elements of DCI format 1_0, DCI format 1_1, and DCI format 1-2, and in the case of control information regarding PDSCHs transmitted from cooperative TRPs (TRP #1 to TRP #(N−1)), it is possible to collect only some of the information elements of DCI format 1_0, DCI format 1_1, and DCI format 1_2 in one piece of secondary DCI (sDCI) and transmit the same. For example, the sDCI may include at least one piece of information from among pieces of HARQ-related information, such as frequency domain resource allocation, time domain resource allocation, or an MCS of the cooperative TRPs. In addition, information not included in the sDCI, such as a BWP indicator or a carrier indicator, may follow DCI (DCI #0, nDCI) of the serving TRP.

In case #3 1410, control of each PDSCH or the degree of freedom of allocation may be limited depending on the content of an information element included in the sDCI, but it is possible to adjust reception performance of the sDCI, and the complexity of DCI blind decoding of the UE may be reduced compared to case #1 1400 or case #2 1405.

Case #4 1415 is an example in which, while N−1 different PDSCHs are transmitted from N−1 additional TRPs (TRP #1 to TRP #(N−1)) in addition to a serving TRP (TRP #0) used during single PDSCH transmission, control information regarding the PDSCHs transmitted from the N−1 additional TRPs is transmitted on the same DCI (long DCI) as control information regarding a PDSCH transmitted from the serving TRP. In other words, the UE may obtain, through a single piece of DCI, the control information regarding the PDSCHs transmitted from the different TRPs (TRP #0 to TRP #(N−1)). In case #4 1415, the complexity of DCI blind decoding of the UE may not be increased, but control of a PDSCH or the degree of freedom of allocation may be low, for example, the number of cooperative TRPs may be limited, according to long DCI payload restriction.

In the description and embodiments of the disclosure below, case #1 1400, case #2 1405, and case #3 1410, in which one or more pieces of DCI (PDCCHs) are used to support NC-JT, may be distinguished as multiple PDCCH (multi-PDCCH or multiple-DCI, M-DCI)-based NC-JT, and case #4 1415, in which a single piece of DCI (PDCCH) is used to support NC-JT, may be distinguished as single PDCCH-based NC-JT. In the multiple PDCCH-based PDSCH transmission, a CORESET in which DCI of a serving TRP (TRP #0) is scheduled and a CORESET in which pieces of DCI of cooperative TRPs (TRP #1 to TRP #(N−1)) are scheduled may be distinguished. A method for distinguishing CORESETs may include a method of distinguishing CORESETs via a higher layer indicator for each CORESET, a method of distinguishing CORESETs via a beam configuration for each CORESET, or the like. In addition, in the single PDCCH-based NC-JT, a single piece of DCI schedules a single PDSCH having multiple layers instead of scheduling multiple PDSCHs, and the multiple layers may be transmitted from multiple TRPs. In this case, a connection relationship between a layer and a TRP transmitting the layer may be indicated via a TCI indication regarding the layer.

In embodiments of the disclosure, a "cooperative TRP" may be replaced by any one of various terms, such as a "cooperative panel", or a "cooperative beam", when actually applied.

In embodiments of the disclosure, the phrase "when NC-JT is applied" may be variously interpreted depending on a situation, for example, "when a UE simultaneously receives one or more PDSCHs from one BWP", "when a UE simultaneously receives PDSCHs based on two or more TCI indications from one BWP", and "when a PDSCH received by a UE is associated with at least one DMRS port group", but one expression is used for convenience of description.

In the disclosure, a radio protocol structure for NC-JT may be variously used depending on a TRP deployment scenario. For example, when there is no or small backhaul delay between cooperative TRPs, a method (CA-like method) using a structure based on MAC layer multiplexing is possible. On the other hand, when the backhaul delay between the cooperative TRPs is too large to be ignored, for example, at least 2 ms of time is required to exchange information, such as CSI, scheduling, and HARQ-ACK, between the cooperative TRPs, a method (DC-like method) of ensuring robust characteristics against delay by using an independent structure for each TRP from an RLC layer is possible.

The UE supporting C-JT/NC-JT may receive, from a higher layer configuration, C-JT and/or NC-JT-related parameters or setting values, and configure an RRC parameter of the UE, based on the above. For the higher layer configuration, the UE may use a UE capability parameter, for example, tci-StatePDSCH. In this case, the UE capability parameter, for example, tci-StatePDSCH, may define TCI states for the purpose of PDSCH transmission, and the number of TCI states may be configured to be 4, 8, 16, 32, 64, or 128 in FR1, and may be configured to be 64 or 128 in FR2, and among the configured number, up to 8 states that may be indicated by 3 bits of a TCI field of DCI may be configured through an MAC CE message. The maximum number 128 denotes a value indicated by maxNumberConfiguredTCIstatesPerCC in the tci-StatePDSCH parameter included in capability signaling of the UE. As such, a series of configuration processes from a higher layer configuration to an MAC CE configuration may be applied to a beamforming indication or beamforming change command for at least one PDSCH in one TRP.

A multi-DCI (or multi-PDCCH)-based multi-TRP transmission method for NC-JT transmission is described.

In NC-JT based on multiple PDCCHs, at the time of transmitting DCI for PDSCH scheduling of each TRP, there may be a CORESET or search space differentiated for each TRP. The CORESET or search space for each TRP can be configured as at least one of the following cases.

- Configuration of higher layer index for each CORESET: CORESET configuration information configured as a higher layer may include an index value, and a TRP that transmits a PDCCH in the corresponding CORESET may be distinguished by an index value for each configured CORESET. That is, in a set of CORESETs with the same higher layer index value, the same TRP may be considered to transmit a PDCCH, or a PDCCH for scheduling a PDSCH of the same TRP may be considered to be transmitted. The index for each CORESET described above may be named as CORESETPoolIndex, and for CORESETs having the same CORESETPoolIndex value configured, a PDCCH may be considered to be transmitted from the same TRP. In the case of a CORESET where a CORESETPoolIndex value is not configured, a default value of CORESETPoolIndex may be considered to be configured, and the above-described default value may be 0.
- In the disclosure, if the type of CORESETPoolIndex of each of multiple CORESETs included in PDCCH-Config, which is higher layer signaling, exceeds 1, that is, if each CORESET has a different CORESETPoolIndex, the UE may consider that a base station can use the multi-DCI-based multi-TRP transmission method.
- In contrast, in the disclosure, if the type of CORESETPoolIndex of each of multiple CORESETs included in PDCCH-Config, which is higher layer signaling, is one, that is, if all CORESETs have the same CORESETPoolIndex of 0 or 1, the UE may consider that the base station performs transmission by using a single TRP rather than using the multi-DCI-based multi-TRP transmission method.
- Multiple PDCCH-Config configuration: Multiple PDCCH-Configs are configured within one BWP, and each PDCCH-Config may include a PDCCH configuration for each TRP. In other words, a list of CORESETs for each TRP and/or a list of search spaces for each TRP may be configured in one PDCCH-Config, and one or more CORESETs and one or more search spaces included in one PDCCH-Config may be considered to correspond to a specific TRP.
- CORESET beam/beam group configuration: A TRP corresponding to the corresponding CORESET may be distinguished through a beam or beam group configured for each CORESET. For example, if the same TCI state is configured in multiple CORESETs, the corresponding CORESETs may be considered to be transmitted through the same TRP, or a PDCCH for scheduling a PDSCH of the same TRP may be considered to be transmitted in the corresponding CORESETs.
- Search space beam/beam group configuration: A beam or beam group is configured for each search space, and therefore, a TRP for each search space may be distinguished. For example, if the same beam/beam group or TCI state is configured in multiple search spaces, a PDCCH may be considered to be transmitted in the corresponding search space through the same TRP, or a PDCCH for scheduling a PDSCH of the same TRP may be considered to be transmitted in the corresponding search space.

By distinguishing a CORESET or search space for each TRP, as described above, PDSCH and HARQ-ACK information classification for each TRP is possible, and therefore, independent HARQ-ACK codebook generation for each TRP and independent PUCCH resource use are possible.

The above configuration may be independent for each cell or BWP. For example, two different CORESETPoolIndex values may be configured for a PCell, while no CORESETPoolIndex value may be configured for a specific SCell. In this case, NC-JT transmission is configured in the PCell, while it may be considered that NC-JT transmission is not configured in the SCell for which no CORESETPoolIndex value is configured.

PDSCH TCI state activation/deactivation MAC-CE applicable to the multi-DCI-based multi-TRP transmission method may follow FIG. 12B. When the UE has not received a configuration of CORESETPoolIndex for each of all CORESETs in PDCCH-Config which is higher layer signaling, the UE may ignore a CORESET Pool ID field 1255 in a corresponding MAC-CE 1250. When the UE may support the multi-DCI-based multi-TRP transmission method, that is, when each CORESET in PDCCH-Config which is higher layer signaling of the UE has a different CORESETPoolIndex, the UE may activate a TCI state in DCI included in a PDCCH transmitted in CORESETs having a CORESETPoolIndex value equal to a value of the CORESET Pool ID field 1255 in the corresponding MAC-CE 1250. For example, when the value of the CORESET Pool ID field 1255 in the corresponding MAC-CE 1250 is 0, the TCI state in the DCI included in the PDCCH transmitted from CORESETs having CORESETPoolIndex of 0 may follow activation information of the corresponding MAC-CE.

When the UE has received a configuration to use the multi-DCI-based multi-TRP transmission method from the base station, that is, when the type of CORESETPoolIndex for each of multiple CORESETs included in PDCCH-Config, which is higher layer signaling, exceeds 1, or when each CORESET has a different CORESETPoolIndex, the UE may be aware that the following restrictions exist for PDSCHs scheduled from a PDCCH in each CORESET having two different CORESETPoolIndex values.

1) If a PDSCH indicated from a PDCCH in each CORESET having two different CORESETPoolIndex values completely or partially overlaps, the UE may apply TCI states indicated by respective PDCCHs to different CDM groups, respectively. That is, two or more TCI states may not be applied to one CDM group.
2) If a PDSCH indicated from a PDCCH in each CORESET having two different CORESETPoolIndex values completely or partially overlaps, the UE may expect that the actual number of front loaded DMRS symbols, the actual number of additional DMRS symbols, the actual location of the DMRS symbol, and a DMRS type is not different for each PDSCH.
3) The UE may expect that a bandwidth indicated from a PDCCH in each CORESET having two different CORESETPoolIndex values is the same and a subcarrier spacing is also the same.
4) The UE may expect that each PDCCH completely includes information on a PDSCH scheduled from a PDCCH in each CORESET having two different CORESETPoolIndex values.

Next, a single DCI (single PDCCH)-based multi-TRP transmission method for NC-JT transmission is described.

In the single DCI-based multi-TRP transmission method, PDSCHs transmitted by multiple TRPs may be scheduled with one DCI. In this case, the number of TCI states may be used as a method for indicating the number of TRPs transmitting a corresponding PDSCH. In other words, if the number of TCI states indicated by the DCI scheduling the PDSCH is 2, it may be considered as a single PDCCH-based NC-JT transmission, and if the number of TCI states is 1, it may be considered as a single TRP transmission. TCI states indicated in the above DCI may correspond to one or two TCI states among TCI states activated by an MAC-CE. If the TCI states of the DCI correspond to two TCI states activated by the MAC-CE, a correspondence relationship is established between a TCI codepoint indicated in the DCI and the TCI states activated by the MAC-CE, and this may be when the number of TCI states activated by the MAC-CE that correspond to the TCI codepoint is 2.

For another example, if at least one codepoint among all codepoints in a TCI state field in DCI indicates two TCI states, the UE may consider that the base station may perform transmission based on the single DCI-based multi-TRP method. In this case, at least one codepoint indicating two TCI states within the TCI state field may be activated through an improved PDSCH TCI state activation/deactivation MAC-CE.

Figure 15:
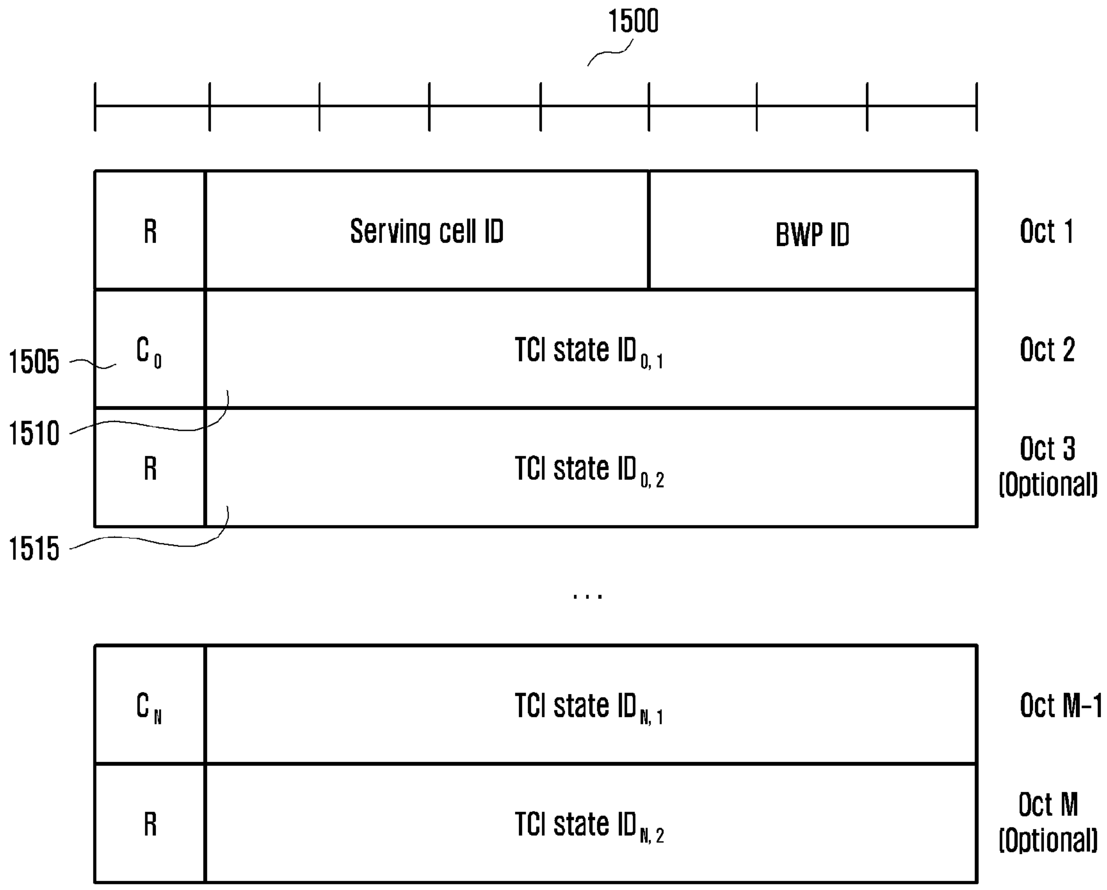
FIG. 15 illustrates an example of an improved PDSCH TCI state activation/deactivation MAC-CE structure.

FIG. 15 illustrates an example of an improved PDSCH TCI state activation/deactivation MAC-CE structure. The meaning of each field in a corresponding MAC CE and a value which can be configured for each field are as follows.

BWP ID: This field indicates a DL BWP for which the MAC CE applies as the codepoint of the DCI bandwidth part indicator field as specified in TS 38.212 [9]. The length of the BWP ID field is 2 bits;

$C_i$: This field indicates whether the octet containing TCI state $ID_{i,2}$ is present. If this field is set to "1", the octet containing TCI state $ID_{i,2}$ is present. If this field is set to "0", the octet containing TCI state $ID_{i,2}$ is not present;

TCI state $ID_{i,j}$: This field indicates the TCI state identified by TCI-StateId as specified in TS 38.331 [5], where i is the index of the codepoint of the DCI Transmission configuration indication field as specified in TS 38.212 [9] and TCI state $ID_{i,j}$ denotes the j-th TCI state indicated for the i-th codepoint in the DCI Transmission Configuration Indication field. The TCI codepoint to which the TCI States are mapped is determined by its ordinal position among all the TCI codepoints with sets of TCI state $ID_{i,j}$ fields, i.e. the first TCI codepoint with TCI state $ID_{0,1}$ and TCI state $ID_{0,2}$ shall be mapped to the codepoint value 0, the second TCI codepoint with TCI state $ID_{1,1}$ and TCI state $ID_{1,2}$ shall be mapped to the codepoint value 1 and so on. The TCI state $ID_{i,2}$ is optional based on the indication of the Ci field. The maximum number of activated TCI codepoint is 8 and the maximum number of TCI states mapped to a TCI codepoint is 2.

R: Reserved bit, set to "0".

In FIG. 15, if a value of a $C_0$ field 1505 is 1, a corresponding MAC-CE may include a TCI state $ID_{0,2}$ field 1515 in addition to a TCI state $ID_{0,1}$ field 1510. This indicates that TCI state $ID_{0,1}$ and TCI state $ID_{0,2}$ are activated for a 0th codepoint of a TCI state field included in DCI, and if a base station indicates the corresponding codepoint to a UE, the UE may receive an indication of two TCI states. If the value of the $C_0$ field 1505 is 0, the corresponding MAC CE is unable to include the TCI state $ID_{0,2}$ field 1515, and this indicates that one TCI state corresponding to TCI state $ID_{0,1}$ is activated for the 0th codepoint of the TCI state field included in the DCI.

The above configuration may be independent for each cell or BWP. For example, a PCell may have up to two activated TCI states corresponding to one TCI codepoint, while a specific SCell may have up to one activated TCI state corresponding to one TCI codepoint. In this case, NC-JT transmission is configured in the PCell, while it may be considered that NC-JT transmission is not configured in the SCell described above.

Next, a method of distinguishing single-DCI (S-DCI)-based multi-TRP PDSCH repetitive transmission schemes will be described. The UE may receive, from the base station, an indication of different S-DCI-based multi-TRP PDSCH repetitive transmission schemes (e.g., time division multiplexing (TDM), frequency division multiplexing (FDM), and spatial division multiplexing (SDM)), according to a value indicated by a DCI field and a higher layer signaling configuration. Table 22 below indicates a method of distinguishing between single or multi-TRP-based schemes indicated to a UE, according to a value of a specific DCI field and a higher layer signaling configuration.

TABLE 22

| Combination | Number of TCI states | Number of CDM groups | RepetitionNumber configuration and indication condition | Regarding repetitionScheme configurations | Transmission scheme indicated to UE |
|---|---|---|---|---|---|
| 1 | 1 | ≥1 | Condition 2 | Not configured | Single-TRP |
| 2 | 1 | ≥1 | Condition 2 | Configured | Single-TRP |
| 3 | 1 | ≥1 | Condition 3 | Configured | Single-TRP |
| 4 | 1 | 1 | Condition 1 | Configured or not configured | Single-TRP TDM scheme B |
| 5 | 2 | 2 | Condition 2 | Not configured | Multi-TRP SDM |
| 6 | 2 | 2 | Condition 3 | Not configured | Multi-TRP SDM |
| 7 | 2 | 2 | Condition 3 | Configured | Multi-TRP SDM |
| 8 | 2 | 1 | Condition 3 | Configured | Multi-TRP FDM scheme A/ FDM scheme B/ TDM scheme A |
| 9 | 2 | 1 | Condition 1 | Not configured | Multi-TRP TDM scheme B |

In Table 22 above, each column is described as below.

Number of TCI states (column 2): This indicates the number of TCI states indicated by a TCI state field in DCI, and may be 1 or 2.

Number of CDM groups (column 3): This indicates the number of different CDM groups of DMRS ports indicated by an antenna port field in the DCI. The number may be 1, 2, or 3.

repetitionNumber configuration and indication condition (column 4): One of three conditions may be configured depending on whether repetitionNumber is configured for all time domain resource allocation (TDRA) entries which may be indicated by a time domain resource allocation field in the DCI, and whether an actually indicated TDRA entry includes a configuration for repetitionNumber.

Condition 1: When at least one of all TDRA entries which may be indicated by the time domain resource allocation field includes the configuration for repetitionNumber, and the TDRA entry indicated by the time domain resource allocation field in the DCI includes the configuration for repetitionNumber greater than 1

Condition 2: When at least one of all TDRA entries which may be indicated by the time domain resource allocation field includes the configuration for repetitionNumber, and the TDRA entry indicated by the time domain resource allocation field in the DCI does not include the configuration for repetitionNumber Condition 3: When all TDRA entries which may be indicated by the time domain resource allocation field do not include the configuration for repetitionNumber Regarding repetitionScheme configuration (column 5): This indicates whether repetitionScheme, which is higher layer signaling, is configured. Repetition-Scheme, which is higher layer signaling, may be configured with one of "tdmSchemeA", "fdmSchemeA", and "fdmSchemeB".

Transmission scheme indicated to UE (column 6): This indicates single or multi-TRP schemes indicated according to each combination (column 1) represented in Table 22 above.

single-TRP: This indicates single TRP-based PDSCH transmission. If the UE has received a configuration of pdsch-AggegationFactor in higher layer signaling PDSCH-config, the UE may receive scheduling of single TRP-based PDSCH repetitive transmission as many times as the configured number of times. Otherwise, the UE may receive scheduling of single TRP-based PDSCH single transmission.

Single-TRP TDM scheme B: This indicates PDSCH repetitive transmission based on time resource division in single TRP-based slots. According to the above-described condition 1 regarding repetitionNumber, the UE repeatedly receives a PDSCH on a time domain as many times as the number of slots of the number of times of repetitionNumber greater than 1, configured in a TDRA entry indicated by a time domain resource allocation field. In this case, a starting symbol and symbol length of a PDSCH indicated by a TDRA entry are equally applied for each slot by the number of times of repetitionNumber, and the same TCI state is applied for each PDSCH repetitive transmission. The corresponding scheme is similar to a slot aggregation scheme in that PDSCH repetitive transmission is performed between slots on a time resource, but is different from the slot aggregation scheme in that whether to indicate repetitive transmission is dynamically determined based on a time domain resource allocation field in DCI.

Multi-TRP SDM: This indicates a multi-TRP-based spatial resource division PDSCH transmission scheme. This is a method of separately receiving a layer from each TRP, and although the multi-TRP SDM is not a repetitive transmission scheme, the reliability of PDSCH transmission may be increased since transmission may be performed by increasing the number of layers and thus decreasing a coding rate. The UE may apply two TCI state indicated through a TCI state field in DCI to two CDM groups indicated by the base station, respectively, so as to receive a PDSCH.

Multi-TRP FDM scheme A: This indicates a multi-TRP-based frequency resource division PDSCH transmission scheme, and although this scheme is not repetitive transmission like the multi-TRP SDM since there is one PDSCH transmission location (occasion), a frequency resource amount is increased to decrease a coding rate, and thus transmission reliability may be high. In the case of multi-TRP FDM scheme A, two TCI states indicated through a TCI state field in DCI may be respectively applied to frequency resources that do not overlap each other. When a PRB bundling size is determined to be wideband and in a case where the number of RBs indicated by a frequency domain resource allocation field is N, the UE performs reception by applying a first TCI state to first ceil (N/2) RBs, and applying a second TCI state to remaining floor (N/2) RBs. Here, ceil(.) and floor(.) are operators indicating rounding up and rounding down of a first decimal point. When the PRB bundling size is determined to be 2 or 4, the UE performs reception by applying the first TCI state to PRGs in even turns and applying the second TCI state to PRGs in odd turns.

Multi-TRP FDM scheme B: This indicates a multi-TRP-based frequency resource division PDSCH repetitive transmission scheme, and a PDSCH may be repeatedly transmitted at each of two PDSCH transmission locations (occasions). In the case of multi-TRP FDM scheme B, like multi-TRP FDM scheme A, the UE may apply two TCI states indicated through a TCI state field in DCI to frequency resources that do not overlap each other, respectively. When a PRB bundling size is determined to be wideband and in a case where the number of RBs indicated by a frequency domain resource allocation field is N, the UE performs reception by applying a first TCI state to first ceil (N/2) RBs, and applying a second TCI state to remaining floor (N/2) RBs. Here, ceil(.) and floor(.) are operators indicating rounding up and rounding down of a first decimal point. When the PRB bundling size is determined to be 2 or 4, the UE performs reception by applying the first TCI state to PRGs in even turns and applying the second TCI state to PRGs in odd turns.

Multi-TRP TDM scheme A: This indicates a PDSCH repetitive transmission scheme in a multi-TRP-based time resource division slot. The UE has two PDSCH transmission locations (occasions) in one slot, and a first reception location may be determined based on a starting symbol and symbol length of a PDSCH indicated through a time domain resource allocation field in DCI. A starting symbol at a second reception location of the PDSCH may be a location to which a symbol offset is applied by higher layer signaling StartingSymbolOffsetK from a last symbol of a first transmission location, and a transmission location may be determined by a symbol length indicated therefrom. If StartingSymbolOffsetK, which is higher layer signaling, is not configured, the symbol offset may be considered to be 0.

Multi-TRP TDM scheme B: This indicates a PDSCH repetitive transmission scheme between multi-TRP-based time resource division slots. The UE has one PDSCH transmission location (occasion) within one slot, and may receive repetitive transmission based on a starting symbol and symbol length of the same PDSCH during slots equal to the number of times of repetitionNumber indicated through a time domain resource allocation field in DCI. If repetitionNumber is 2, the UE may receive PDSCH repetitive transmission of a first and a second slot by applying a first and a second TCI state, respectively. If repetitionNumber is greater than 2, the UE may use different TCI state application methods depending on higher layer signaling tciMapping which is configured. If tciMapping is configured as cyclicMapping, the first and the second TCI state are applied to a first and a second PDSCH transmission location, respectively, and such a TCI state application method is equally applied to remaining PDSCH transmission locations. If tciMapping is configured as sequenticalMapping, the first TCI state is applied to a first and a second PDSCH transmission location and the second TCI state is applied to a third and a fourth PDSCH transmission location, and such a TCI state application method is equally applied to remaining PDSCH transmission locations.

Hereinafter, for the sake of descriptive convenience, a cell, a transmission point, a panel, a beam, and/or a transmission direction which can be distinguished through an upper layer/L1 parameter such as a TCI state or spatial relation information, a cell ID, a TRP ID, or a panel ID may be described as a TRP, a beam, or a TCI state as a whole. Therefore, when actually applied, a TRP, a beam, or a TCI state may be appropriately replaced with one of the above terms.

In the following description of the disclosure, upper layer signaling may refer to signaling corresponding to at least one signaling among the following signaling, or a combination of one or more thereof.

- MIB
- System information block (SIB) or SIB X (X=1, 2, . . . )
- Radio resource control (RRC)
- Medium access control (MAC) control element (CE)

In addition, L1 signaling may refer to signaling corresponding to at least one signaling method among signaling methods using the following physical layer channels or signaling, or a combination of one or more thereof.

- PDCCH
- DCI
- UE-specific DCI
- Group common DCI
- Common DCI
- Scheduling DCI (for example, DCI used for the purpose of scheduling downlink or uplink data)
- Non-scheduling DCI (for example, DCI not used for the purpose of scheduling downlink or uplink data)
- PUCCH
- Uplink control information (UCI)

Hereinafter, determining priority between A and B may be variously described as, for example, selecting an entity having a higher priority according to a predetermined priority rule and performing an operation corresponding thereto, or omitting or dropping operations regarding an entity having a lower priority.

As used herein, the term "slot" may generally refer to a specific time unit corresponding to a transmit time interval (TTI), may specifically refer to a slot used in a 5G NR system, or may refer to a slot or a subframe used in a 4G LTE system.

Hereinafter, the above examples may be described through several embodiments, but they are not independent of each other, and one or more embodiments may be applied simultaneously or in combination.

An M-TRP technique in which a UE performs communication through multiple transmission and reception nodes has been standardized through 3GPP Rel-16 as a common technique capable of satisfying conflicting requirements between a URLLC service requiring high reliability and an eMBB service requiring a high transmission rate and, thereafter, a method of applying the technology to various channels, such as a PDCCH, a PDSCH, a PUSCH, and a PUCCH has been presented through Rel-17. The M-TRP technique is divided into two techniques, such as a single DCI technique (S-DCI) for controlling transmission and reception of multiple nodes through one piece of control information and a multiple control information technique (M-DCI) for separately transmitting information on respective nodes. The S-DCI technique is a technique suitable to be implemented in a network having a relatively simple structure in which only one of multiple nodes performs UE control, and is also a technique suitable to be used by a cell and a base station responsible for performing communication in a small area. On the other hand, it is expected that the M-DCI technique used in a situation in which multiple nodes perform UE control will be mainly used in a network which provides communication in a relatively wide area and in which a distance between the respective nodes is great.

As a UE communication technique corresponding to a multiple transmission and reception node communication technique, standardization of a multi-panel-based communication technique has been partially carried out, and additional standardization is expected to proceed in the future. The multi-panel-based communication technique is a technique in which a UE performs communication through multiple antenna arrays which can operate independently. In this case, the total transmission power can be increased through independent and cooperative operations between the respective arrays, or communication through a better beam can be achieved.

In the case of the S-DCI scheme, one TRP acts as a main TRP and controls all UL transmissions of the UE, and in the case of the M-DCI scheme, each TRP or multiple TRPs control UL transmission of the UE that they receive. In the case of the S-DCI scheme, a TRP that controls UL transmission collects channel information for all uplinks of the UE and information necessary for UL scheduling, and controls UL transmission for each TRP of the UE, based on the information. In the case of the S-DCI scheme, since one TRP is required to collect all pieces of UL channel information, the complexity of operations for supporting measurement and reporting of the UE and sharing channel information between TRPs increases, but one TRP can secure better UL performance by controlling UL transmission of the UE by comprehensively considering all channel conditions.

On the other hand, in the case of the M-DCI scheme, each TRP acquires only UL channel information for a case where UL transmission of the UE reaches the TRP itself and then controls the UL transmission of the UE, based on the information, and may thus control m-TRP UL transmission of the UE through a simple operation compared to the S-DCI scheme. However, since each TRP performs independent control on each UL transmission, the UE may be requested to simultaneously transmit ULs for multiple TRPs, and this may be perceived as a UL transmission collision by the UE in some cases.

In 3GPP RAN1, as a scheme of reducing transmission and reception load of control information used for beam control and simplifying the operations of the UE and the base station to reduce total complexity, the use of a common beam may be defined, and the common beam may operate in a manner of designating a common transmission configuration indication (TCI) state (common TCI state).

In the use of the common beam, the base station transmits, to the UE, information on beams commonly used for transmission and reception of one or more channels or signals in the form of a TCI index and a TCI state. The UE may acquire information on the TCI state from the received beam control information and, when the acquired TCI state value is different from a common TCI state value that the UE remembers, may change the common TCI value to the acquired TCI state value and notify the base station that the TCI state value has been successfully received, through transmission of an ACK signal. The common TCI state value modified through the above process is applied to subsequent transmission and reception of a channel and a signal.

Figure 16:
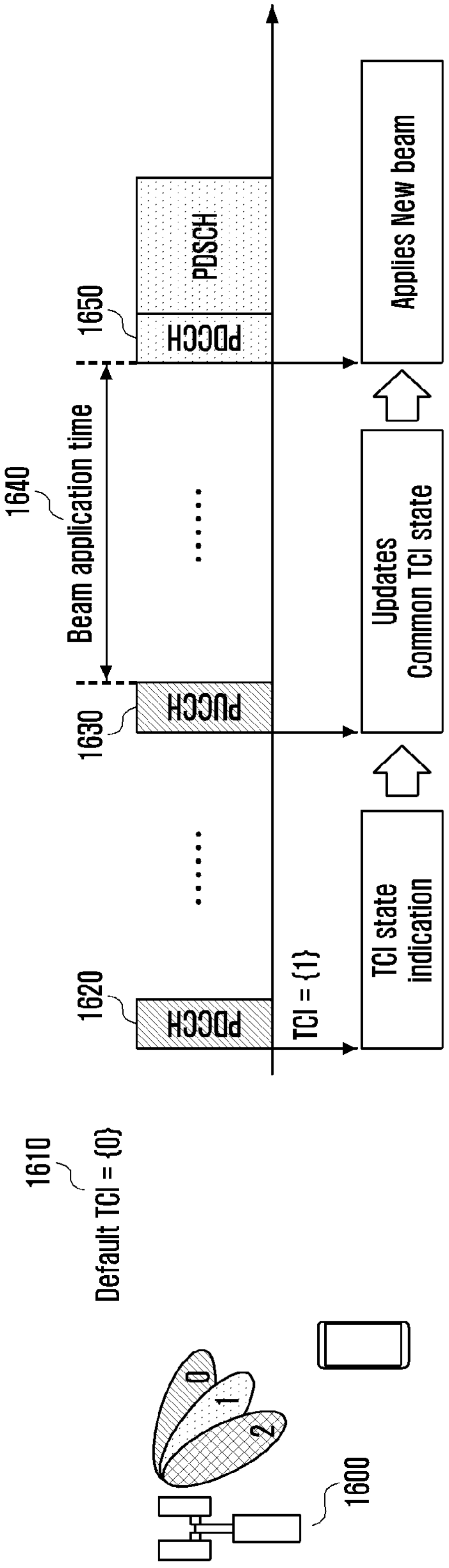
FIG. 16 illustrates an example of controlling a transmission and reception beam based on a common TCI state according to embodiments of the disclosure.

FIG. 16 illustrates an example of controlling a transmission and reception beam based on a common TCI state according to embodiments of the disclosure. Referring to FIG. 16, as an example of application of a common TCI state, transmission and reception beams of one or more of a physical downlink control channel (PDCCH), a physical downlink shared channel (PDSCH), a physical uplink control channel (PUCCH), and a physical uplink shared channel (PUSCH) may be controlled by a designated common TCI state. In the example of FIG. 16, it is assumed that a base station configures candidate beams represented by three TCI indexes {0, 1, 2} for a UE (1600) and that the beam represented by TCI index 0 is configured as an initial use beam (1610). In the above example, the operations of the base station and the UE may include a first operation (1620) in which the base station transmits {TCI=1}, which is a new TCI index, through the PDCCH and the UE receives {TCI=1}, a second operation (1630) in which the UE identifies control information transmitted on the PDCCH, identifies conversion of a transmission and reception beam into a beam indicated by TCI index=1, and reports acknowledgement (ACK) on the PUCCH to the base station, and a third operation (1650) of applying the new beam to communication between the base station and the UE after a beam application time 1640.

The common beam-based communication technique may support UE beam control of the base station in the manner exemplified above in a case where the UE performs communication with a single TRP, and have the benefit of reducing the complexity of beam forming and control of the base station and the UE and reducing the amount of beam control information by using a single beam. Further, there is another advantage that beam control of a control channel such as a PDCCH is performed through dynamic control information (DCI) transmitted through the PDCCH, and thus beam reliability of the control channel can be secured in an environment in which the channel changes rapidly.

However, in the case of an m-TRP system in which the UE performs communication with multiple TRPs, it may be difficult to apply the common beam-based communication technique. When the UE performs communication through multiple transmission and reception nodes, in a general case, communication between the UE and each node is performed through different beams, and the base station transmits beam information for each TRP or information on multiple beams to the UE in the form of multiple pieces of TCI state information.

Figure 17:
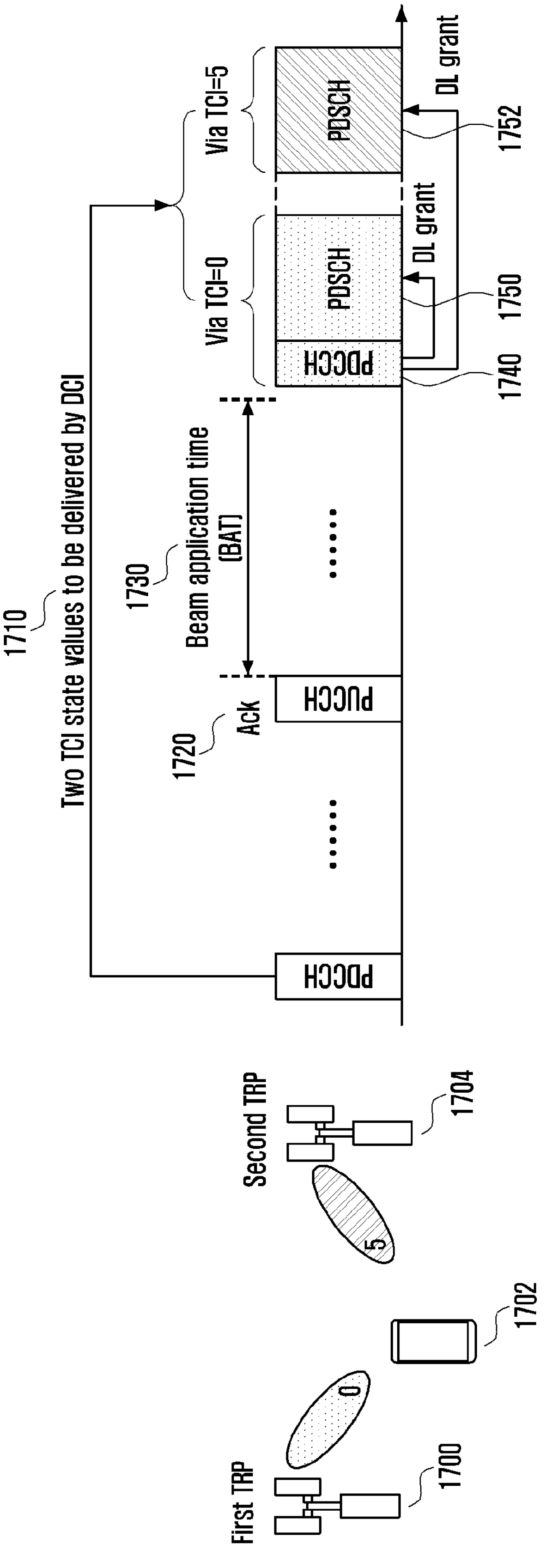
FIG. 17 illustrates an example of controlling a transmission and reception beam based on a common TCI state in an m-TRP system according to embodiments of the disclosure.

FIG. 17 illustrates an example of controlling a transmission and reception beam based on a common TCI state in an m-TRP system according to embodiments of the disclosure.

For example, referring to FIG. 17, a UE 1702 may perform communication with two TRPs 1700 and 1704. In this case, an example is shown in which in the m-TRP system, a first TRP 1700 schedules PDSCH transmission (1752) associated with the first TRP 1700 and PDSCH transmission (1752) associated with a second TRP 1704 through one PDCCH 1740. As such, when one TRP indicates the UE to receive two PDSCH channels transmitted from different TRPs through transmission of one PDCCH channel, the UE is required to receive one TCI state value for reception of a PDCCH channel and one PDSCH channel, and another TCI state value for reception of the remaining PDSCH channels. In this case, the UE 1702 receives a TCI state value of 0 for the first TRP 1700 and a TCI state value of 5 for the second TRP 1704 through DCI 1710 on the PDCCH, and transmits an ACK 1720 for TCI states and then applies the indicated TCI state after a beam application time

1730. The UE 1702 receives a PDCCH 1740 and a PDSCH 1750 from the first TRP 1700 by applying a TCI state value of 0, and receives the PDSCH 1752 from the second TRP 1704 by applying a TCI state value of 5.

Figure 18:
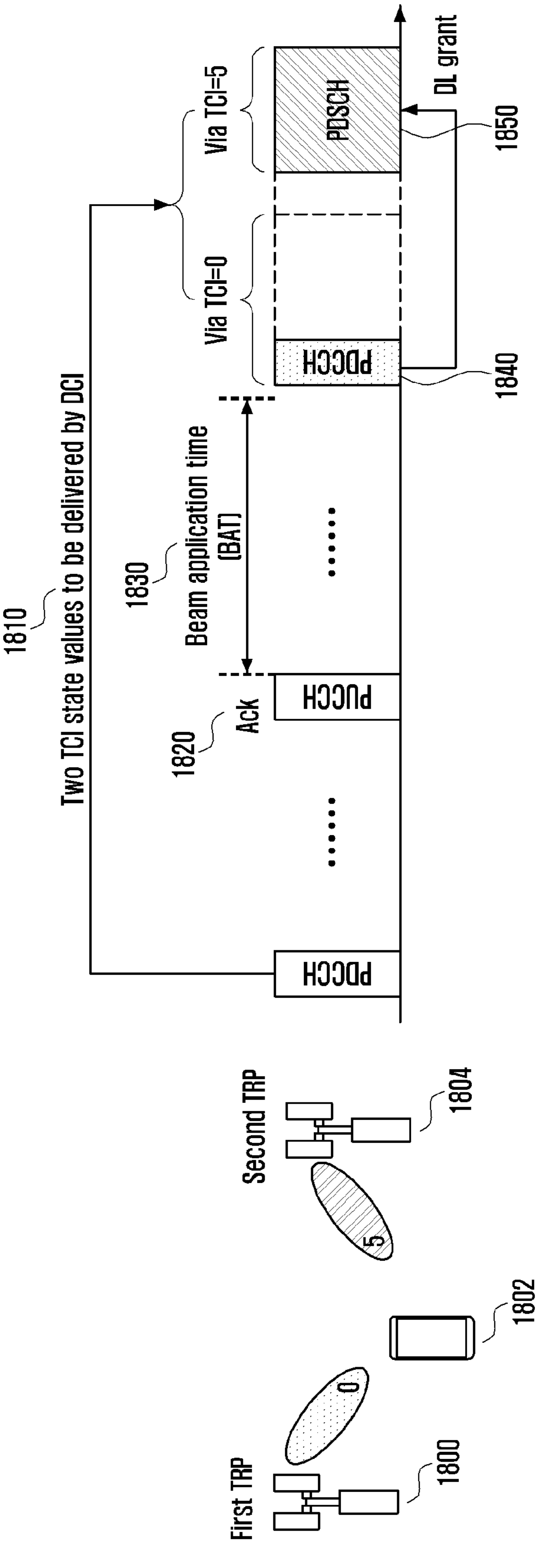
FIG. 18 illustrates another example of controlling a transmission and reception beam based on a common TCI state in an m-TRP system according to embodiments of the disclosure.

FIG. 18 illustrates another example of controlling a transmission and reception beam based on a common TCI state in an m-TRP system according to embodiments of the disclosure.

For example, referring to FIG. 18, a UE 1802 may perform communication with two TRPs 1800 and 1804. In this case, when one TRP (a first TRP) 1800 indicates the UE to receive a PDSCH 1850 transmitted from another TRP (a second TRP) 1804 through PDCCH transmission 1840, the UE 1802 is required to receive one TCI state value for PDCCH reception and another TCI state value for PDSCH reception. The UE 1802 receives a TCI state value of 0 for the first TRP 1800 and a TCI state value of 5 for the second TRP 1804 through DCI 1810 on a PDCCH, and transmits an ACK 1820 for TCI states and then applies the indicated TCI state value after a beam application time 1830. The UE 1800 receives a PDCCH 1840 from the first TRP 1800 by applying a TCI state value of 0, and receives a PDSCH 1850 from the second TRP 1804 by applying a TCI state value of 5.

As shown in the above example, when the UE operates in the m-TRP system, the existing common TCI state-based beam control technique of performing beam control through one TCI state value cannot support multi-node communication.

In solving the above problem, the disclosure proposes a method which defines a common TCI state for each TRP and configures additional information relatinged to indicate the update of a common TCI state of which TRP by beam control information transmitted through the resource for a CORESET.

Figure 19:
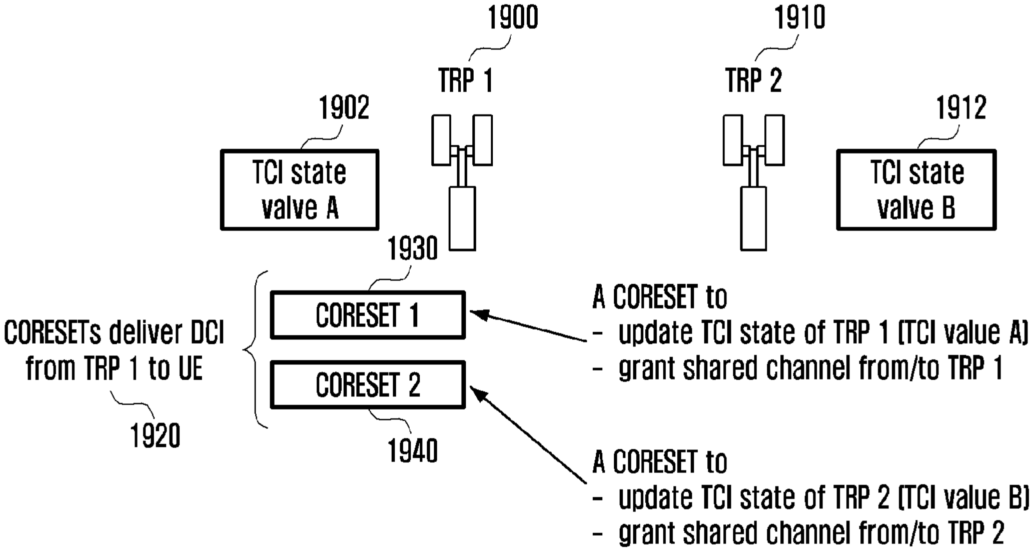
FIG. 19 illustrates an example of controlling a transmission and reception beam based on a CORESET in an m-TRP system according to embodiments of the disclosure.

FIG. 19 illustrates an example of controlling a transmission and reception beam based on a CORESET in an m-TRP system according to embodiments of the disclosure. FIG. 19 illustrates common TCI per TRP, a CORESET, and CORESET allocation for common TCI indication for each TRP. In the above example, a network may allocate a different common TCI state for each TRP. Specifically, TCI state value A 1902, which is a common TCI state, may be applied to a first TRP 1900, and TCI state value B 1912, which is a common TCI state, may be applied to a second TRP 1910. The network may define information on a radio resource which is used when each TRP desires to transmit DCI through a PDCCH, through CORESET allocation for each TRP. In addition, when a base station transmits a TCI state index included in the DCI to a UE, the UE may be aware of which value should be updated depending on the CORESET through which the TCI state index has been indicated, among two common TCI state values configured for each two TRPs.

Referring to FIG. 19, while two CORESETs 1930 and 1940 are allocated to the first TRP 1900, no CORESET is allocated to the second TRP 1910, and thus the UE may be aware that there is no PDCCH transmission by the second TRP 1910. Alternatively, it may be understood that the UE is required to always perform reception by using a beam corresponding to TCI state value A during PDCCH reception. When the UE has received DCI 1920 through a first CORESET 1930, the UE may be aware that a TCI state index included in the DCI corresponds to information for updating TCI state value A 1902 which is a common TCI state of the first TRP 1900. In addition, when the UE has received a PDCCH 1920 through a second CORESET 1940 and the PDCCH 1920 includes the TCI state index, the UE recognizes that the TCI state index is an indicator for updating a common TCI state of the second TRP 1910, that is, a value of TCI state value B 1912. That is, the UE may be aware that the common TCI state of the second TRP 1910 is modified, through control information transmission from the first TRP 1900. In addition, when DCI for scheduling a PDSCH or a PUSCH has been received through the second CORESET 1940, the UE recognizes that a beam corresponding to TCI state value B is required to be used to receive or transmit the PDSCH or PUSCH.

Figure 20:
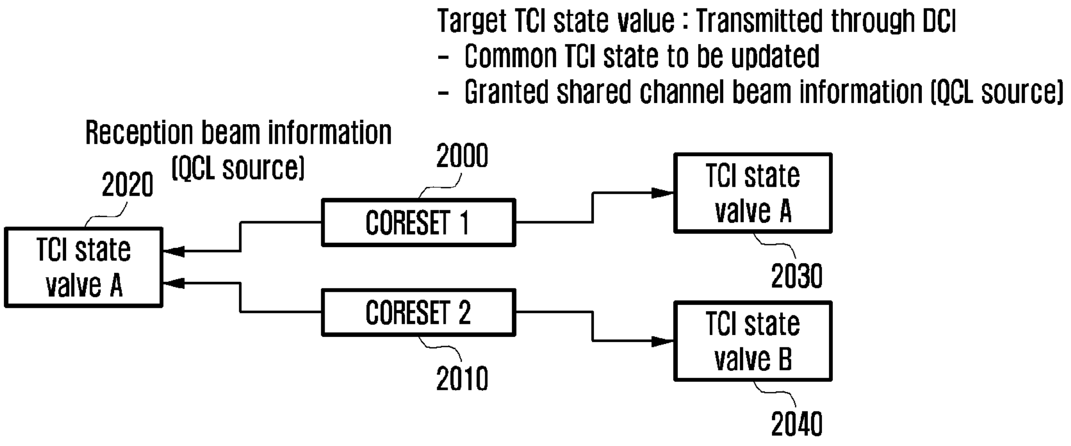
FIG. 20 illustrates another example of controlling a transmission and reception beam based on a CORESET in an m-TRP system according to embodiments of the disclosure.

FIG. 20 illustrates another example of controlling a transmission and reception beam based on a CORESET in an m-TRP system according to embodiments of the disclosure. FIG. 20 illustrates an example of another configuration of common TCI state allocation for each TRP proposed by the disclosure. The overall operation is similar to the example of FIG. 19, but differs from the method in FIG. 19 in that in configuring TCI state information (configuring an RRC or activating an MAC CE), TCI state information is configured regardless of a TRP. In the example of FIG. 20, a UE is allocated two CORESETs 2000 and 2010 and may also be allocated two common TCI states, which are TCI state value A 2030 and TCI state value B 2040. In the above example, the UE is allocated TCI state value A as beam information (QCL source) for both CORESETs (2020), so that when the two CORESETs are received, the UE may use a beam corresponding to TCI state value A. In addition, in the example of FIG. 20, target TCI state values for a first CORESET 2000 and a second CORESET 2010 are configured differently to be A 2030 and B 2040, respectively.

When the UE has received a PDCCH for scheduling a PDSCH or a PUSCH through the first CORESET 2000, the UE performs reception of the PDSCH or transmission of the PUSCH through a beam corresponding to TCI state value A, and in addition, when the PDCCH transmits a TCI state index, the UE updates TCI state value A by using the transmitted TCI state index. As an example of the opposite case, when the UE has received a PDCCH for scheduling a PDSCH or a PUSCH through the second CORESET 2010, the UE performs reception of the PDSCH or transmission of the PUSCH through a beam corresponding to TCI state value B, and in addition, when the PDCCH has transmitted a TCI state index, the UE updates TCI state value B by using the transmitted TCI state index.

That is, FIGS. 19 and 20 are examples of different control information configuration methods for the same UE and TRP operation.

Figure 21:
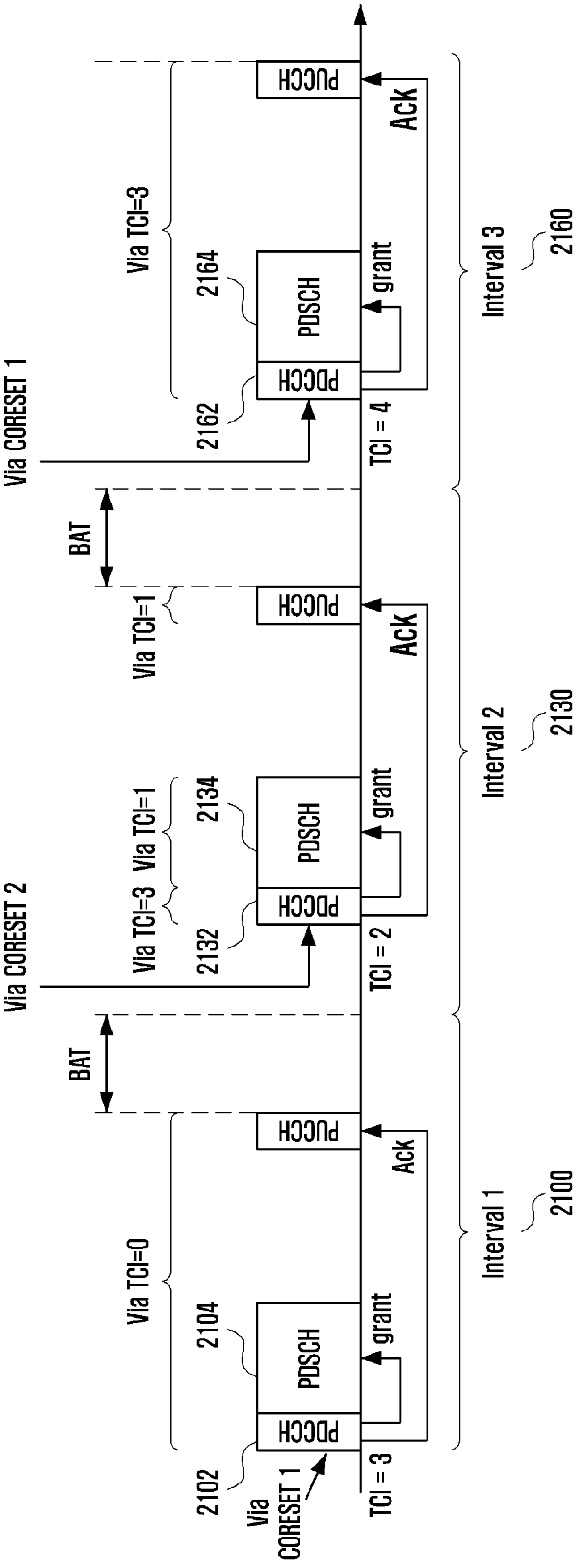
FIG. 21 illustrates an example of controlling a transmission and reception beam based on a CORESET in an m-TRP system according to embodiments of the disclosure.

FIG. 21 illustrates an example of controlling a transmission and reception beam based on a CORESET in an m-TRP system according to embodiments of the disclosure. FIG. 21 illustrates an example of updating of a common TCI state through DCI on a PDCCH in a situation where a common TCI state and a common TCI state indication technique are configured as shown in FIGS. 19 and 20. FIG. 21 assumes that as an initial configuration value, TCI state value A={TCI=0} and TCI state value B={TCI=1} are configured, and describes an example of a beam control method of a UE divided into interval 1 2100, interval 2 2130, and interval 3 2160 for convenience of description.

In interval 1 2100,

1. The UE performs PDCCH reception through TCI state value A, that is, TCI=0 (2102).
2. Since the PDCCH schedules a PDSCH and has been received through a first CORESET, the UE performs PDSCH reception through TCI state value A, that is, TCI=0 (2104).

3. Since the PDCCH has transmitted TCI index {TCI=3}, the UE updates TCI state value A to {TCI=3} according to the above indications.

In interval 2 2130,

1. The UE performs PDCCH reception through new TCI state value A, that is, TCI=3, updated by interval 1 2100 (2132).
2. Since the PDCCH schedules a PDSCH and has been received through CORESET 2, the UE performs PDSCH reception through TCI state value B, that is, TCI=1 (2134).
3. Since the PDCCH has transmitted TCI index {TCI=2}, the UE updates TCI state value B to {TCI=2} according to the above indications.

In interval 3 2160,

1. The UE performs PDCCH reception through TCI state value A, that is, TCI=3, which has been updated by interval 1 2100 and has not been changed by interval 2 2130 (2162).
2. Since the PDCCH schedules a PDSCH and has been received through CORESET 1, the UE performs PDSCH reception through TCI state value A, that is, TCI=3 (2164).
3. Since the PDCCH has transmitted TCI index {TCI=4}, the UE updates TCI state value A to {TCI=4} according to the above indications.

Figure 22:
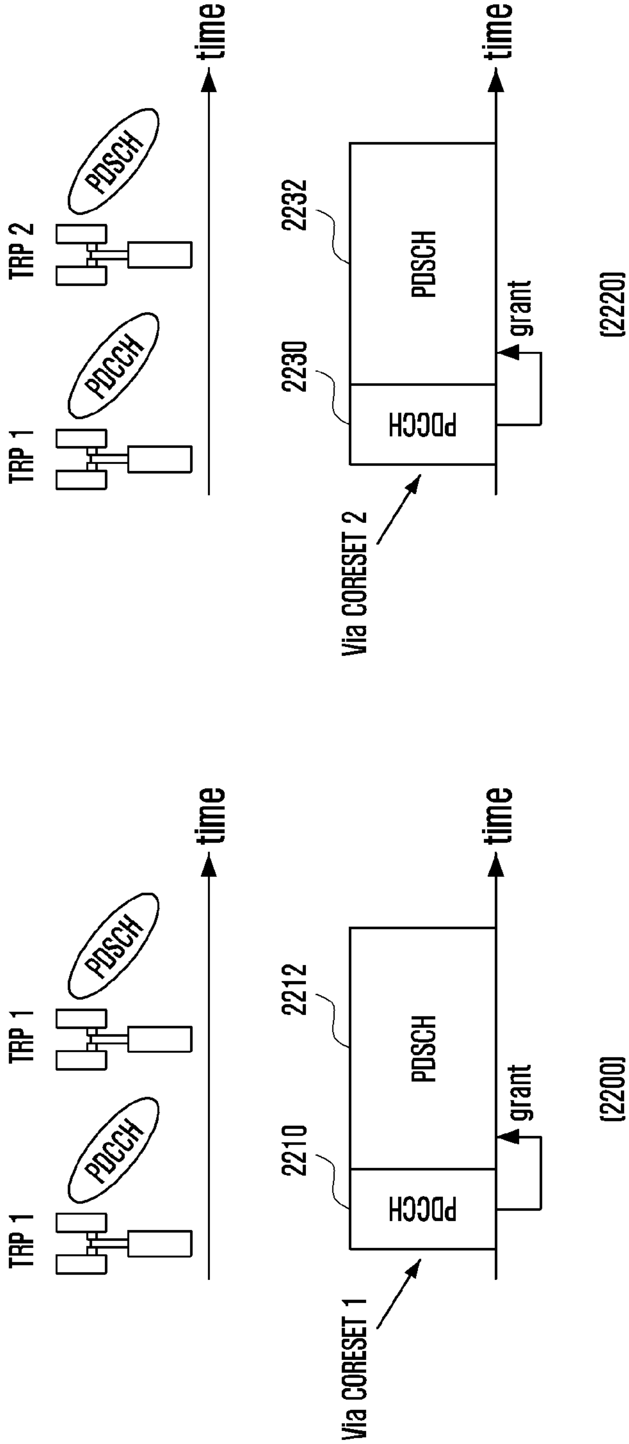
FIG. 22 illustrates another example of controlling a transmission and reception beam based on a CORESET in an m-TRP system according to embodiments of the disclosure.

FIG. 22 illustrates another example of controlling a transmission and reception beam based on a CORESET in an m-TRP system according to embodiments of the disclosure. FIG. 22 illustrates an example of scheduling an m-TRP operation through DCI when using a TCI state indication and update technique proposed by the disclosure. In FIG. 22, it is assumed that the relationship between a TRP and a CORESET and a TCI state is established as shown in FIG. 19 or FIG. 20. For example, a UE may receive information on the relationship between a TRP, a CORESET, and/or a TCI state through higher layer signaling, or the UE may receive a channel or a signal for each TRP, based on TCI state activation and indication for each CORESET without higher layer signaling.

Reference numeral 2200 illustrates a case where a PDCCH for scheduling a PDSCH is received through a first CORESET. The UE receives the PDCCH by using the first CORESET (2210), and the UE uses a beam corresponding to TCI state value A used for PDCCH reception to receive the PDSCH (2212), and this may correspond to a case where the PDCCH and PDSCH are transmitted from the same TRP. For example, the UE may receive DCI for scheduling a PDSCH through CORESET 1. In this case, since the DCI has been received through the first CORESET, the UE may expect that the PDSCH is to be received in a first TRP associated with the first CORESET. In addition, since the DCI has been received through the first CORESET, the UE may use a beam corresponding to TCI state value A associated with the first CORESET to receive the PDSCH.

On the other hand, reference numeral 2220 illustrates a case where a PDCCH for scheduling a PDSCH is received through a second CORESET. The UE receives the PDCCH by using the second CORESET (2230), and the UE performs PDSCH reception by using a beam corresponding to TCI state value B different from the beam used for PDCCH reception (2232). That is, the beams used for PDCCH reception and PDSCH reception are different from each other. For example, the UE may receive DCI for scheduling a PDSCH through the second CORESET. In this case, since the DCI has been received through the second CORESET, the UE may expect that the PDSCH is to be received in a second TRP associated with the second CORESET. In addition, the UE may use the beam corresponding to TCI state value B associated with the second CORESET to receive the PDSCH.

Through such a configuration and operation, an m-TRP operation in which a PDCCH and a PDSCH are transmitted through different TRPs may be supported.

Figure 23:
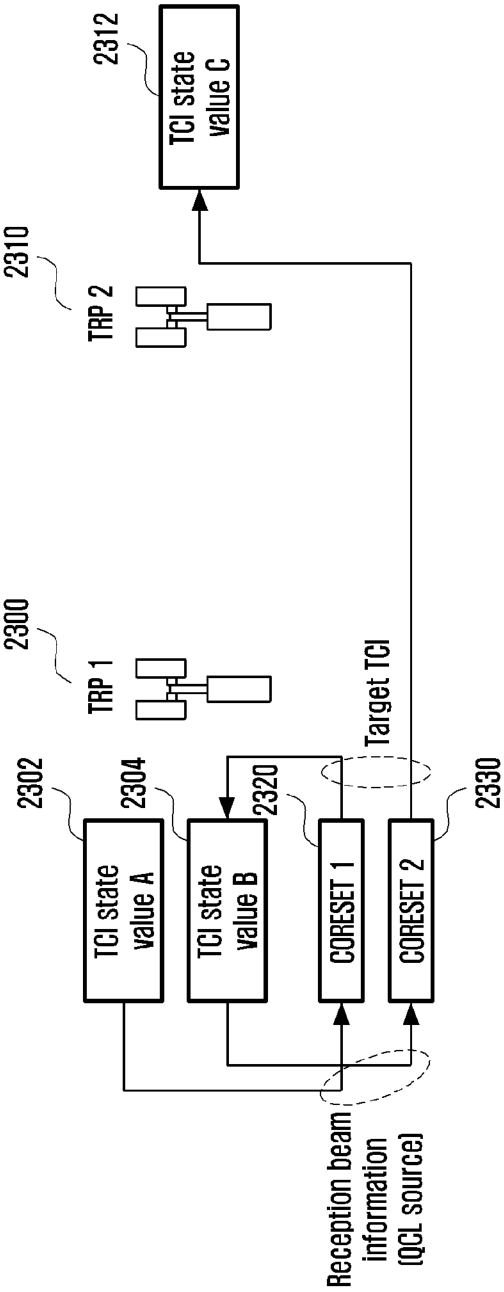
FIG. 23 illustrates another example of controlling a transmission and reception beam based on a CORESET in an m-TRP system according to embodiments of the disclosure.

FIG. 23 illustrates another example of controlling a transmission and reception beam based on a CORESET in an m-TRP system according to embodiments of the disclosure. FIG. 23 illustrates another example of a common TCI state configuration for each TRP. As shown in FIG. 23, two or more TRP common TCI states or TRP specific TCI states may be allocated to one TRP, and a different number of TCI states may be allocated to each TRP. In addition, a TRP-specific TCI state which is not updated through a CORESET or DCI, such as TCI state vale A 2302, may be configured. TCI state value A 2302 indicating a reception beam of a first CORESET 2320 cannot be updated through a PDCCH/DCI, and therefore, updating is required to be performed through other signaling such as RRC signaling or an MAC CE. That is, transmission and reception of a PDCCH through the first CORESET 2320 is performed through a default beam, and the PDCCH received through the first CORESET 2320 received by the default beam may schedule a PDSCH or a PUSCH transmitted and received by a TRP-specific beam rather than the default beam, and updating of the TRP-specific beam may also be indicated.

Referring to FIG. 23, a UE may receive configuration information from a base station. The configuration information may include information on the relationship between a TCI state value and a CORESET, and include at least one of information on the relationship between a TCI state value and a TRP or information on the relationship between a CORESET and a TRP. For example, two common TCI state values (TCI state values A and B 2302 and 2304) may be configured in a first TRP 2300, and one common TCI state value (TCI state value C 2312) may be configured in a second TRP 2310 and, in addition, the first CORESET 2320 and a second CORESET 2330 may be configured in the first TRP 2300, and a CORESET may not be configured in the second TRP 2310.

For example, the UE may receive DCI by using a beam corresponding to TCI state value A in the first CORESET 2320. In this case, when the DCI includes information indicating a TCI state, the UE may update TCI state value B 2304 associated with the first CORESET 2320, based on the DCI. Alternatively, TCI state value B 2304 associated with the first TRP 2300 may be updated. For another example, the UE may receive DCI by using a beam corresponding to TCI state value B 2304 in the second CORESET 2330. In this case, when the DCI includes information indicating a TCI state, the UE may update TCI state value C 2312 associated with the second CORESET 2330, based on the DCI, or may update TCI state value C 2312 associated with the second TRP 2310.

Figure 24:
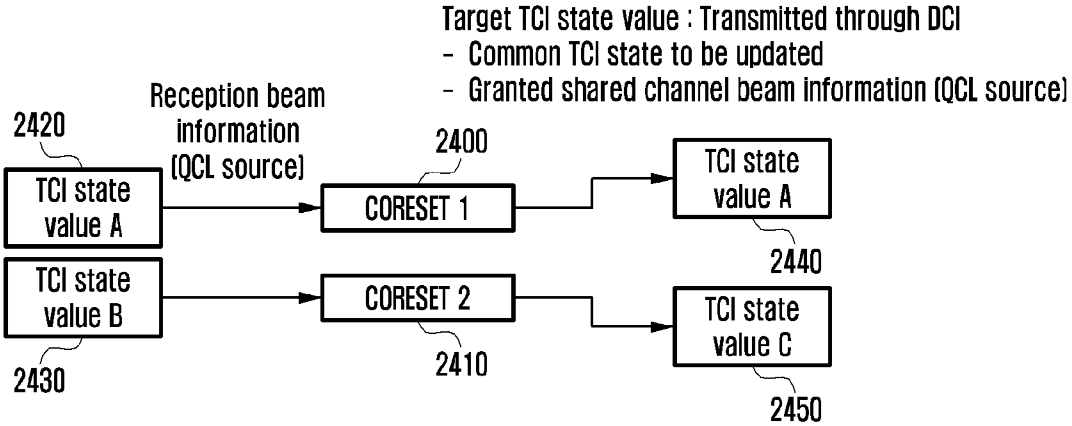
FIG. 24 illustrates another example of controlling a transmission and reception beam based on a CORESET in an m-TRP system according to embodiments of the disclosure.

FIG. 24 illustrates another example of controlling a transmission and reception beam based on a CORESET in an m-TRP system according to embodiments of the disclosure. FIG. 24 is an example of configuring the example of FIG. 23 according to a scheme of configuring a common TCI state for each CORESET without a scheme such as a TRP-specific TCI state. For example, a UE may receive DCI from a first CORESET 2400 by using a beam corresponding to TCI state value A 2420. In this case, when the DCI includes information indicating a TCI state, the UE may update TCI state value A associated with the first CORESET 2400 to the indicated TCI state value. For another example, the UE may receive DCI from a second CORESET 2410 by using a beam corresponding to TCI state value B 2430. In this case, when the DCI includes information indicating a TCI state, the UE may update TCI state value C 2450 associated with the second CORESET 2410.

Figure 25:
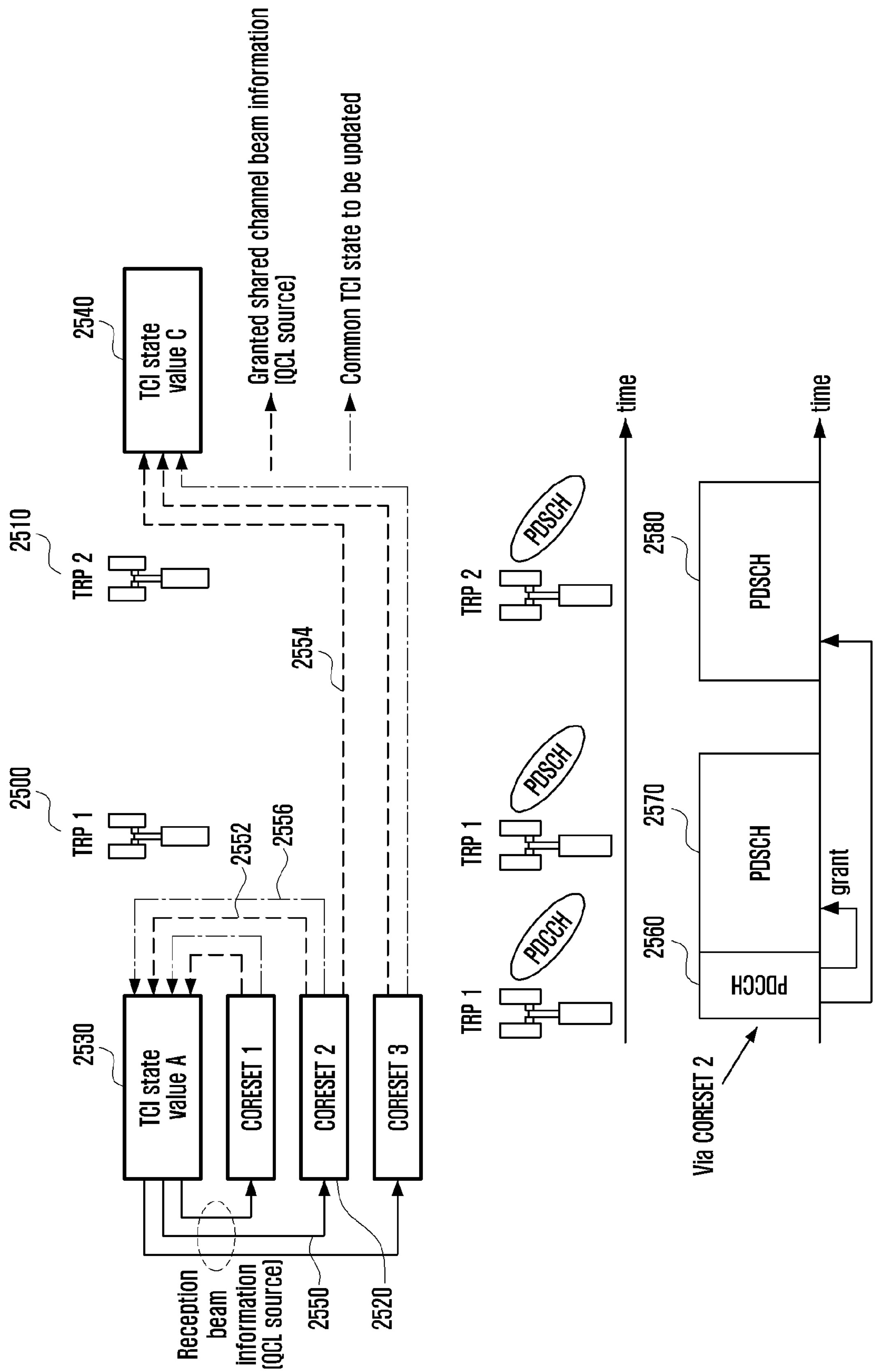
FIG. 25 illustrates another example of controlling a transmission and reception beam based on a CORESET in an m-TRP system according to embodiments of the disclosure.

FIG. 25 illustrates another example of controlling a transmission and reception beam based on a CORESET in an m-TRP system according to embodiments of the disclosure. FIG. 25 illustrates an example of a method for configuring a common TCI state for each TRP and a target TCI state for each CORESET by distinguishing the same into two concepts such as 1) TCI information of a scheduled shared channel, and 2) a common TCI state to be updated. For example, when a PDCCH is transmitted or received between a first TRP 2500 and a UE through a second CORESET 2520 and a PDSCH is scheduled through the PDCCH, the UE receives the PDCCH through a beam corresponding to TCI state value A (2550), and PDSCHs 2570 and 2580 scheduled through the PDCCH are received from the first TRP 2500 and a second TRP 2510 through two beams corresponding to TCI state value A and TCI state value C 2530 and 2540, respectively (2552 and 2554). On the other hand, when the PDCCH has transmitted a TCI state index, updating of a common TCI state through the index is performed only for TCI state value A (2556). That is, when the PDCCH received through a specific CORESET indicates a transmission and reception beam of a PDSCH or a PUSCH of the UE and indicates a common TCI state to be updated, different TCI state values may be indicated.

Figure 26:
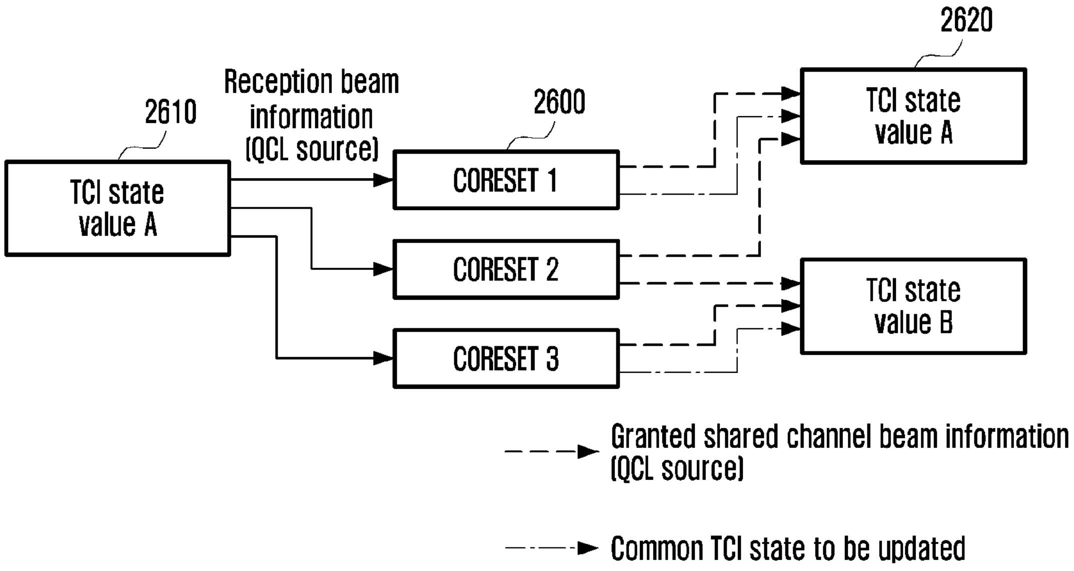
FIG. 26 illustrates another example of controlling a transmission and reception beam based on a CORESET in an m-TRP system according to embodiments of the disclosure.

FIG. 26 illustrates another example of controlling a transmission and reception beam based on a CORESET in an m-TRP system according to embodiments of the disclosure. FIG. 26 illustrates an example of implementing the example of FIG. 25 according to a scheme of configuring a TCI state for each CORESET rather than configuring a TCI state for each TRP. For example, a UE may receive a PDCCH, based on TCI state value A 2610 in a first CORESET 2600, and when the PDCCH received in the first CORESET 2600 transmits a TCI state index, updating of a common TCI state through the index is performed for TCI state value A 2620. In addition, a transmission and reception beam of a PDSCH or a PUSCH scheduled through the PDCCH may follow TCI state value A 2620. For another example, when the PDCCH received through a second CORESET transmits a TCI state index, updating of the common TCI state through the index may be performed for TCI state value A or TCI state value B, and when the TCI state index indicates multiple TCI states, the indicated respective TCI states may indicate updates to TCI state value A and TCI state value B, respectively. In this example, the updating of the common TCI state and the transmission and reception beam of the scheduled data channel are related to the same TCI state value, but depending on a configuration, different TCI state values may be indicated in indicating the transmission and reception beam of the PDSCH or the PUSCH of the UE and a common TCI state to be updated.

Each example of FIGS. 19 to 26 is not a replacement, and at least one example may be used in combination thereof.

Figure 27:
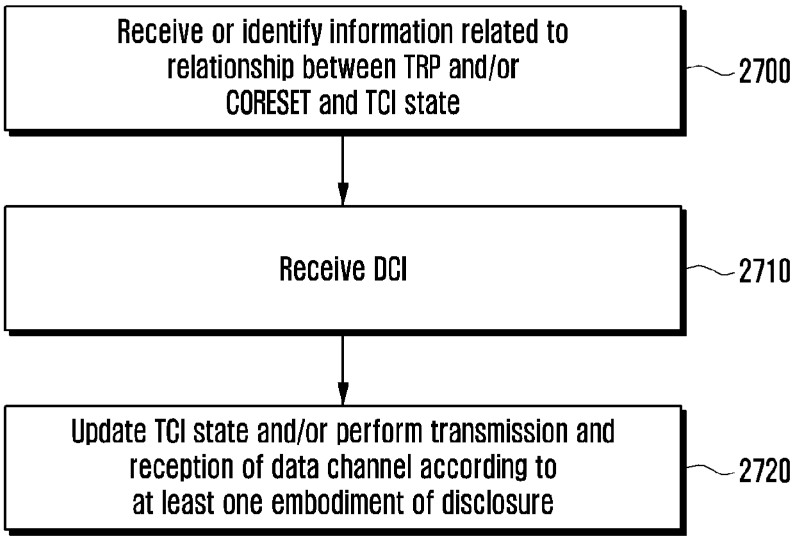
FIG. 27 illustrates an example of an operation of a terminal for performing an embodiment of the disclosure.

FIG. 27 illustrates an example of an operation of a UE for performing an embodiment of the disclosure. According to FIG. 27, a UE receives or identifies configuration information related to a TCI state update and/or a transmission and reception beam configuration of a data channel. The configuration information may include information on the relationship between a TRP and/or a CORESET and a TCI state, such as at least one of information on CORESET allocation for each TRP according to at least one embodiment of the disclosure described above, information on a common TCI state value required to be updated depending on the CORESET in which DCI indicating a TCI state index is transmitted and received, and information on whether the indicated TCI state value is applied to a data channel scheduled by DCI indicating a TCI state index, depending on the CORESET in which the DCI is transmitted and received (2700). Through the information, the UE may identify one or more CORESETs configured in relation to each specific TRP, and it is also possible that a relevant CORESET is not configured for a specific TRP.

The UE may receive DCI on a specific CORESET, and the DCI may include a TCI state index (2710). Based on the specific CORESET, the UE may identify whether a common TCI state for a TRP associated with the specific CORESET is required to be updated according to the indicated TCI state index, whether a common TCI state associated with the specific CORESET is required to be updated, or whether the indicated TCI state index is required to be applied to a data channel (PDSCH and/or PUSCH) scheduled by the DCI.

The UE performs an operation according to at least one embodiment of the disclosure according to the received DCI (2720). Specifically, the UE may update the common TCI state according to the indicated TCI state index, or may transmit or receive the data channel by using a beam according to the TCI state index according to the indicated TCI state index. In managing multiple common TCI states, the UE may update a common TCI state for which an update is indicated, and maintain an existing value for a common TCI state for which an update is not indicated. In addition, the UE may receive an indication through the same PDCCH so as to update all of the multiple common TCI states.

The above-described drawings illustrate an exemplary method that may be implemented according to the principle of the disclosure, and various changes may be made to the method shown in the flowchart herein. For example, although shown as a series of operations, various operations in each drawing may overlap, occur in parallel, occur in a different order, or occur multiple times. In another example, an operation may be omitted or replaced with another operation.

Figure 28:
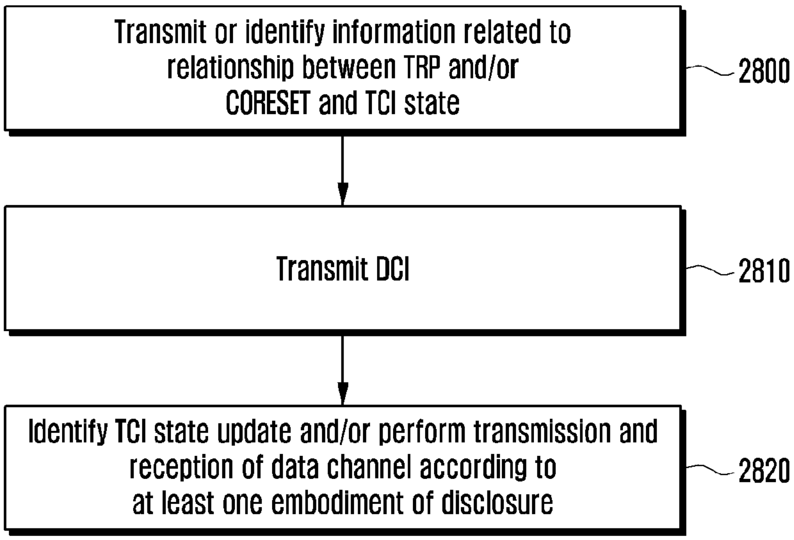
FIG. 28 illustrates an example of an operation of a base station for performing an embodiment of the disclosure.

FIG. 28 illustrates an example of an operation of a base station for performing an embodiment of the disclosure. According to FIG. 28, a base station transmits or identifies configuration information related to a TCI state update and/or a transmission and reception beam configuration of a data channel. The configuration information may include information on the relationship between a TRP and/or a CORESET and a TCI state, such as at least one of information on CORESET allocation for each TRP according to at least one embodiment of the disclosure described above, information on a common TCI state value required to be updated depending on the CORESET in which DCI indicating a TCI state index is transmitted and received, and information on whether the indicated TCI state value is applied to a data channel scheduled by DCI indicating a TCI state index, depending on the CORESET in which the DCI is transmitted and received (2800). A UE having received the information may identify one or more CORESETs configured in relation to each specific TRP, and it is also possible that a relevant CORESET is not configured for a specific TRP.

The base station may transmit DCI on a specific CORESET to the UE, and the DCI may include a TCI state index (2810). Based on the specific CORESET, whether a common TCI state for a TRP associated with the specific CORESET is required to be updated according to the indicated TCI state index, whether a common TCI state associated with the specific CORESET is required to be updated, or whether the indicated TCI state index is required to be applied to a data channel (PDSCH and/or PUSCH) scheduled by the DCI may be identified.

The base station performs an operation according to at least one embodiment of the disclosure according to the received DCI (2820). Specifically, the base station may identify that the common TCI state has been updated with the indicated TCI state index, or may transmit or receive a data channel by using a beam according to the TCI state index according to the indicated TCI state index.

The above-described drawings illustrate an exemplary method that may be implemented according to the principle of the disclosure, and various changes may be made to the method shown in the flowchart herein. For example, although shown as a series of operations, various operations in each drawing may overlap, occur in parallel, occur in a different order, or occur multiple times. In another example, an operation may be omitted or replaced with another operation.

Figure 29:
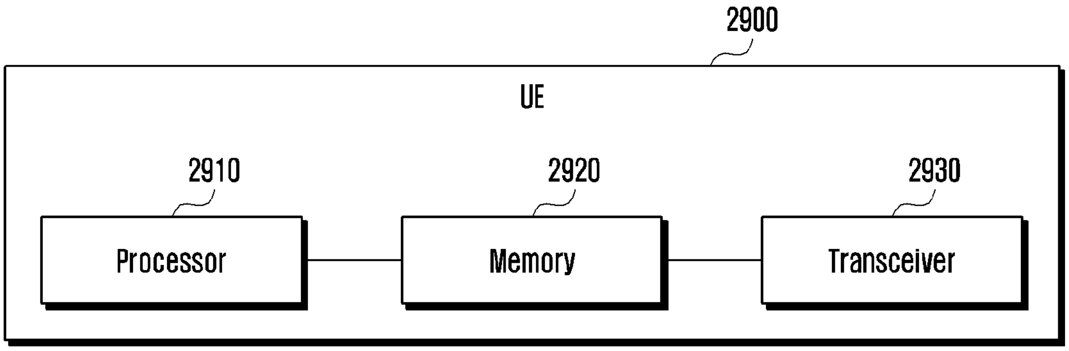
FIG. 29 illustrates a structure of a UE according to embodiments of the disclosure.
Figure 30:
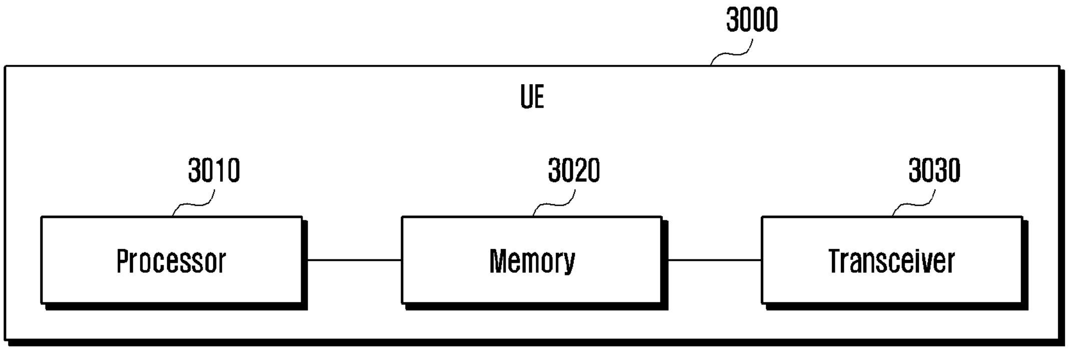
FIG. 30 illustrates a structure of a base station according to embodiments of the disclosure.

FIG. 29 illustrates a configuration of a UE according to embodiments of the disclosure. Referring to FIG. 30, a UE may include a processor 2910, a memory 2920, and a transceiver 2930.

The processor 2910 may control overall operations of the UE. For example, the processor 2910 may transmit and receive a signal through the transceiver 2930. In addition, the processor 2910 may perform functions of a protocol stack required by communication standards. To this end, the processor 2910 may include at least one processor. In addition, the processor 2910 may control the UE to perform operations according to the various embodiments described above.

The memory 2920 may store data such as a basic program, an application program, and configuration information for the operation of the UE. The memory 2920 may include a volatile memory, a non-volatile memory, or a combination of the volatile memory and the non-volatile memory. The memory 2920 may provide stored data according to a request of the processor 2910.

The transceiver 2930 may perform functions for transmitting or receiving a signal through a wired channel or a wireless channel. For example, the transceiver 2930 may perform a conversion function between a baseband signal and a bit stream according to a physical layer standard of a system. For example, at the time of data transmission, the transceiver 2930 may generate complex symbols by encoding and modulating transmission bit streams. In addition, at the time of data reception, the transceiver 2930 may restore a reception bit stream through demodulation and decoding of a baseband signal. In addition, the transceiver 2930 may up-convert a baseband signal into a radio frequency (RF) band signal and then transmit the RF band signal through an antenna, and down-convert the RF band signal received through the antenna into the baseband signal. To this end, the transceiver 2930 may include a transmission filter, a reception filter, an amplifier, a mixer, an oscillator, a digital-to-analog convertor (DAC), an analog-to-digital convertor (ADC), and the like. In addition, the transceiver 2930 may include an antenna unit. The transceiver 2930 may include at least one antenna array including multiple antenna elements. In terms of hardware, the transceiver 2930 may include a digital circuit and an analog circuit (e.g., a radio frequency integrated circuit (RFIC)). The digital circuit and the analog circuit may be implemented in one package. In addition, the transceiver 2930 may include multiple RF chains. In addition, the transceiver 2930 may transmit or receive a signal. To this end, the transceiver 2930 may include at least one transceiver.

FIG. 30 illustrates a configuration of a base station according to embodiments of the disclosure. Referring to FIG. 13, a base station may include a processor 3010, a memory 3020, and a transceiver 3030.

The processor 3010 may control overall operations of the base station. For example, the processor 3010 may transmit and receive a signal through the transceiver 3030. In addition, the processor 3010 may perform functions of a protocol stack required by communication standards. To this end, the processor 3010 may include at least one processor. In addition, the processor 3010 may control the base station to perform operations according to the various embodiments described above.

The memory 3020 may store data such as a basic program, an application program, and configuration information for the operation of the base station. The memory 3020 may include a volatile memory, a non-volatile memory, or a combination of the volatile memory and the non-volatile memory. The memory 3020 may provide stored data according to a request of the processor 3010.

The transceiver 3030 may perform functions for transmitting or receiving a signal through a wired channel or a wireless channel. For example, the transceiver 3030 may perform a conversion function between a baseband signal and a bit stream according to a physical layer standard of a system. For example, at the time of data transmission, the transceiver 3030 may generate complex symbols by encoding and modulating transmission bit streams. In addition, at the time of data reception, the transceiver 3030 may restore a reception bit stream through demodulation and decoding of a baseband signal. In addition, the transceiver 3030 may up-convert a baseband signal into a radio frequency (RF) band signal and then transmit the RF band signal through an antenna, and down-convert the RF band signal received through the antenna into the baseband signal. To this end, the transceiver 3030 may include a transmission filter, a reception filter, an amplifier, a mixer, an oscillator, a digital-to-analog convertor (DAC), an analog-to-digital convertor (ADC), and the like. In addition, the transceiver 3030 may include an antenna unit. The transceiver 3030 may include at least one antenna array including multiple antenna elements. In terms of hardware, the transceiver 3030 may include a digital circuit and an analog circuit (e.g., a radio frequency integrated circuit (RFIC)). The digital circuit and the analog circuit may be implemented in one package. In addition, the transceiver 3030 may include multiple RF chains. In addition, the transceiver 3030 may transmit or receive a signal. To this end, the transceiver 3030 may include at least one transceiver.

It should be appreciated that the embodiments and the terms used therein are not intended to limit the technological features set forth herein to particular embodiments and the disclosure includes various changes, equivalents, and/or alternatives for a corresponding embodiment. With regard to the description of the drawings, similar reference numerals may be used to designate similar or relevant elements. A singular form of a noun corresponding to an item may include one or more of the items, unless the relevant context clearly indicates otherwise. As used herein, each of such phrases as “A or B,” “at least one of A and B,” “at least one of A or B,” “A, B, or C,” “at least one of A, B, and C,” and “at least one of A, B, or C” may include all possible combinations of the items enumerated together in a corresponding one of the phrases. Such terms as "a first," "a second," "the first," and "the second" may be used to simply distinguish a corresponding element from another, and does not limit the elements in other aspect (e.g., importance or order). If an element (e.g., a first element) is referred to, with or without the term "operatively" or "communicatively", as "coupled with/to" or "connected with/to" another element (e.g., a second element), it means that the element may be coupled/connected with/to the other element directly (e.g., wiredly), wirelessly, or via a third element.

As used in various embodiments of the disclosure, the term "module" may include a unit implemented in hardware, software, or firmware, and may be interchangeably used with other terms, for example, "logic," "logic block," "component," or "circuit". The "module" may be a single integrated component, or a minimum unit or part thereof, adapted to perform one or more functions. For example, according to an embodiment, the "module" may be implemented in the form of an application-specific integrated circuit (ASIC).

According to an embodiment, methods according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each element (e.g., a module or a program) of the above-described elements may include a single entity or multiple entities, and some of the multiple entities may be separately disposed in any other element. According to various embodiments, one or more of the above-described elements or operations may be omitted, or one or more other elements or operations may be added. Alternatively or additionally, a plurality of elements (e.g., modules or programs) may be integrated into a single element. In such a case, according to various embodiments, the integrated element may still perform one or more functions of each of the plurality of elements in the same or similar manner as they are performed by a corresponding one of the plurality of elements before the integration. According to various embodiments, operations performed by the module, the program, or another element may be carried out sequentially, in parallel, repeatedly, or heuristically, or one or more of the operations may be executed in a different order or omitted, or one or more other operations may be added.

The invention claimed is:

1. A method performed by a terminal in a communication system, the method comprising:

identifying whether a transmission configuration indicator (TCI) state for a physical downlink control channel (PDCCH) in a control resource set (CORESET) corresponds to a first TCI state or a second TCI state based on configuration information on the CORESET, wherein the first TCI state and the second TCI state correspond to common TCI states;

receiving, from a base station, downlink control information (DCI) scheduling downlink data on the PDCCH in the CORESET based on the identified TCI state;

receiving, from the base station, downlink data based on the identified TCI state; and determining whether to update the first TCI state or the second TCI state based on the CORESET, wherein the first TCI state is updated, in case that the CORESET corresponds to a first CORESET.

2. The method of claim 1, wherein the first TCI state is updated based on a TCI state index indicated by the DCI and the second TCI state is not updated.

3. The method of claim 2, further comprising:

receiving, from the base station, a medium access control (MAC) control element (CE) activating the TCI state index.

4. The method of claim 2, wherein in case that the CORESET corresponds to a second CORESET, the second TCI state is updated based on the TCI state index indicated by the DCI and the first TCI state is not updated.

5. A method performed by a base station in a communication system, the method comprising:

transmitting, to a terminal, configuration information on a control resource set (CORESET), wherein the configuration information is associated with whether a transmission configuration indicator (TCI) state for the CORESET corresponds to a first TCI state or a second TCI state, and the first TCI state and the second TCI state correspond to common TCI states;

transmitting, to the terminal, downlink control information (DCI) scheduling downlink data on a physical downlink control channel (PDCCH) in the CORESET; and transmitting, to the terminal, downlink data associated with the TCI state, wherein the first TCI state or the second TCI state is updated based on the CORESET, and wherein the first TCI state is updated, in case that the CORESET corresponds to a first CORESET.

6. The method of claim 5, wherein the first TCI state is updated based on a TCI state index indicated by the DCI and the second TCI state is not updated.

7. The method of claim 6, further comprising:

transmitting, to the terminal, a medium access control (MAC) control element (CE) activating the TCI state index.

8. The method of claim 6, wherein in case that the CORESET corresponds to a second CORESET, the second TCI state is updated based on the TCI state index indicated by the DCI and the first TCI state is not updated.

9. A terminal in a communication system, the terminal comprising:

at least one transceiver;

at least one processor communicatively coupled to the at least one transceiver; and at least one memory, communicatively coupled to the at least one processor, storing instructions executable by the at least one processor individually or in any combination to cause the terminal to:

identify whether a transmission configuration indicator (TCI) state for a physical downlink control channel (PDCCH) in a control resource set (CORESET) corresponds to a first TCI state or a second TCI state based on configuration information on the CORESET, wherein the first TCI state and the second TCI state correspond to common TCI states, receive, from a base station, downlink control information (DCI) scheduling downlink data on the PDCCH in the CORESET based on the identified TCI state, receive, from the base station, downlink data based on the identified TCI state, and determine whether to update the first TCI state or the second TCI state based on the CORESET, wherein the first TCI state is updated, in case that the CORESET corresponds to a first CORESET.

10. The terminal of claim 9, wherein the first TCI state is updated based on a TCI state index indicated by the DCI and the second TCI state is not updated.

11. The terminal of claim 10, wherein the instructions further cause the terminal to receive, from the base station, a medium access control (MAC) control element (CE) activating the TCI state index.

12. The terminal of claim 10, wherein in case that the CORESET corresponds to a second CORESET, the second TCI state is updated based on the TCI state index indicated by the DCI and the first TCI state is not updated.

13. A base station in a communication system, the base station comprising:

at least one transceiver;

at least one processor communicatively coupled to the at least one transceiver; and at least one memory, communicatively coupled to the at least one processor, storing instructions executable by the at least one processor individually or in any combination to cause the base station to:

transmit, to a terminal, configuration information on a control resource set (CORESET), wherein the configuration information is associated with whether a transmission configuration indicator (TCI) state for the CORESET corresponds to a first TCI state or a second TCI state, and the first TCI state and the second TCI state correspond to common TCI states, transmit, to the terminal, downlink control information (DCI) scheduling downlink data on a physical downlink control channel (PDCCH) in the CORESET, and transmit, to the terminal, downlink data associated with the TCI state, wherein the first TCI state or the second TCI state is updated based on the CORESET, and wherein the first TCI state is updated, in case that the CORESET corresponds to a first CORESET.

14. The base station of claim 13, wherein the first TCI state is updated based on a TCI state index indicated by the DCI and the second TCI state is not updated.

15. The base station of claim 14, wherein the instructions further cause the base station to transmit, to the terminal, a medium access control (MAC) control element (CE) activating the TCI state index.

16. The base station of claim 14, wherein in case that the CORESET corresponds to a second CORESET, the second TCI state is updated based on the TCI state index indicated by the DCI and the first TCI state is not updated.

* * * * *